United States Patent [19]
Yamamoto et al.

[11] Patent Number: 6,151,190
[45] Date of Patent: *Nov. 21, 2000

[54] REMOVABLE DISK STORAGE APPARATUS AND DEVICE FOR ACCESSING THE RECORDING MEDIUM SUPPORTED THEREIN

[75] Inventors: Kazuyuki Yamamoto, Kanagawa; Toshio Mamiya, Tokyo; Takashi Yamada, Kanagawa; Kazuo Takahashi, Tokyo; Eiji Oshima, Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,692

[22] Filed: Aug. 26, 1997

[30] Foreign Application Priority Data

| Aug. 26, 1996 | [JP] | Japan | 8-224266 |
| Aug. 26, 1996 | [JP] | Japan | 8-244276 |
| Aug. 26, 1996 | [JP] | Japan | 8-244302 |
| Aug. 26, 1996 | [JP] | Japan | 8-244303 |
| Nov. 29, 1996 | [JP] | Japan | 8-334810 |

[51] Int. Cl.$^7$ .................................................. G11B 17/04
[52] U.S. Cl. ..................................... 360/99.06; 360/99.02
[58] Field of Search ............................. 360/97.01, 99.02, 360/99.03, 99.06, 99.07, 105, 106

[56] References Cited

U.S. PATENT DOCUMENTS

| 4,571,648 | 2/1986 | Barski | 360/105 |
| 4,870,518 | 9/1989 | Thompson et al. | 360/97.01 |
| 5,636,095 | 6/1997 | McGrath et al. | 360/133 |
| 5,699,210 | 12/1997 | Thompson et al. | 360/99.06 |
| 5,708,541 | 1/1998 | Erpelding | 360/104 |
| 5,724,216 | 3/1998 | Iftikar et al. | 360/99.06 X |
| 5,831,795 | 11/1998 | Ma et al. | 360/105 |

*Primary Examiner*—William R. Korzuch
*Attorney, Agent, or Firm*—Ronald P. Kananen; Rader, Fishman & Grauer

[57] ABSTRACT

In a removable disk storage apparatus, a reading/writing head can be stably and reliably moved so as to correspond to an information recording medium. A rotation supporting member for supporting the reading/writing head is formed of a rotary arm and an elastic supporting member fitted to a tip end portion of the rotary arm for supporting the reading/writing head. The rotary arm member is formed by bending it so that it should be dogleg-shaped. The elastic supporting body is fixed on a tip end portion of a bent portion thereof in the extended direction in which the elastic supporting body is bent. The rotary arm is inserted into a disk cartridge substantially straight with its tip end being faced to the disk cartridge, and then supported by a ramp on a center line thereof.

30 Claims, 31 Drawing Sheets

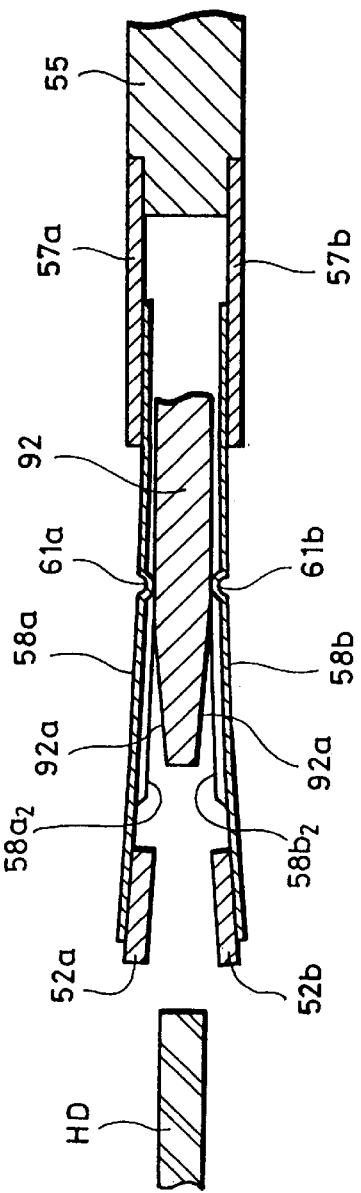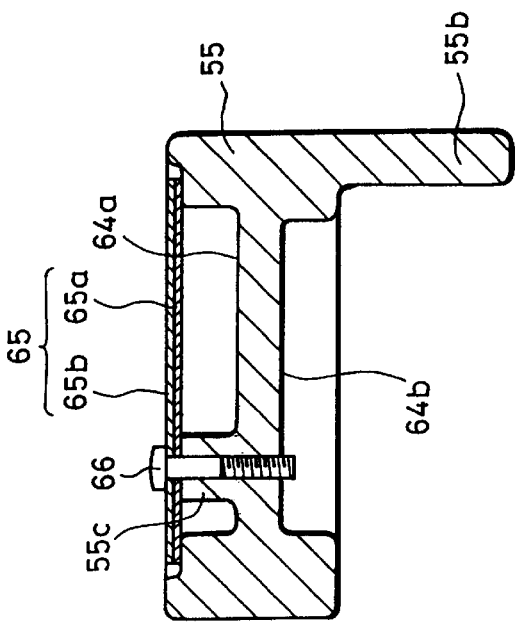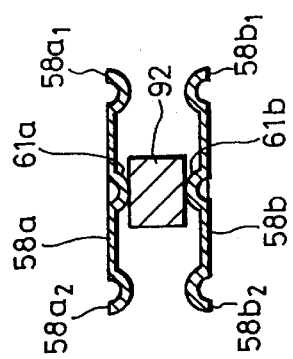

REMOVABLE DISK STORAGE APPARATUS AND DEVICE FOR ACCESSING THE RECORDING MEDIUM SUPPORTED THEREIN

BACKGROUND OF THE INVENTION

The present invention relates to a large-capacity storage apparatus for use in an information processing apparatus and particularly to a disk storage apparatus employing a hard disk as a disk-like recording medium both sides of which data can be read from and/or written in, and a rotation actuator.

A disk storage apparatus 101 having an arrangement shown in FIGS. 33, 34 has been proposed as a high-speed large-capacity disk apparatus such as, typically, a removable hard disk apparatus related to the present invention. A disk cartridge 120 having an arrangement shown in FIG. 35 has been proposed as a disk cartridge accommodating a hard disk as a recording medium for use in the above disk storage apparatus 101.

As shown in FIG. 33, the disk storage apparatus 101 is formed of, as main mechanical elements, a disk rotating mechanism 104 equipped in a disk cartridge loading portion 103 having an insertion slot 103a at a front surface of a front half portion side of a main chassis 102 and a reading/writing head mechanism 105 disposed at a rear half portion side of the main chassis 102.

The disk rotating mechanism 104 is mounted on a sub-chassis (not shown) disposed below the main chassis 102 so as to be lifted up and down thereby and so that a spindle motor 108 having a chucking magnet 107 should be projected by a predetermined height or lower from an opening 106 formed through a bottom surface center portion of the disk cartridge loading portion 103.

In order to downsize the apparatus 101, the reading/writing head mechanism 105 is positioned on the rear half portion side of the main chassis 102 and in the vicinity of the disk cartridge loading portion 103. The reading/writing head mechanism 105 has a reading/writing head (hereinafter referred to as an R/W head) H attached through a suspension 112 formed of a plate spring at a tip end of an actuator arm 111 pivotally supported by a shaft 109 and rotated by an actuator 110.

The actuator 110 of the reading/writing mechanism 105 is formed of a movable coil 110a fitted to a rear end portion of the actuator arm 111, a flat magnet 110b fixed on the main chassis 102 side so as to correspond to the movable coil 110a, and a yoke forming a magnetic circuit (not shown). The R/W heads H are a pair of upper and lower heads. Therefore, a pair of upper and lower suspensions 112a, 112b are employed as the suspension 112 fitted to the tip end portion of the actuator arm 111. Both of the suspensions 112a, 112b are fitted to the actuator arm 111 at an interval therebetween so as to be projectingly extended in the extended center line of the actuator arm 111. The R/W heads H are bonded to sliders fitted to inner surface sides of tip ends of the both suspensions 112a, 112b in the direction perpendicularly to center lines of the suspensions 112a, 112b, being opposed to each other in the vertical direction. Moreover, load bars 113 are fixed on outer surface sides of the tip ends of the both suspensions 112a, 112b so as to be projected in the direction extended from the tip ends.

The reading/writing head mechanism 105 is located in a state that the tip ends of the actuator arm 111 including the suspensions 112a, 112b are opposed to the inside of the disk cartridge loading portion 103, and is inserted into a disk cartridge 120 to be loaded. Therefore, in order to prevent the tip end of the actuator arm 11 from disturbing a hard disk housed in the disk cartridge 120, the tip end portion of the actuator arm 111 is forked, i.e., branched to upper and lower piece portions. The suspensions 112a, 112b are respectively attached to the upper and lower piece portions.

A ramp 114 which is a slide-shaped block serving as a guide for the R/W heads H is fixed on the rear half portion side of the main chassis 102 in the vicinity of the disk cartridge loading portion 103 and ahead of the actuator arm 111 so as to be opposed to an inside of the disk cartridge loading portion 103. This ramp 104 is also inserted into the disk cartridge 120 to be loaded and hence is forked, i.e., concave-shaped in order to be prevented from disturbing the hard disk. The load bars 113 at the tip ends of the suspensions 112a, 112b are brought in slidable contact with upper and lower surfaces of the ramp 114, respectively, thereby the suspensions 112a, 112b, i.e., the R/W heads H being held at an interval.

Moreover, a printed circuit board 115 mounted with a control circuit for controlling the actuator 110, a reading/writing amplifier for the R/W heads and so on is disposed on the rear half portion of the main chassis 102, being connected through a flexible wiring plate 116 to the actuator arm 111 side.

As shown in FIGS. 33, 35, the disk cartridge 120 is formed of rectangle-shaped upper and lower halves 121, 122 and a magnetic disk on both sides of which data can be read from and written in, i.e., a hard disk 124 rotatably accommodated in a disk accommodating portion 123 between the upper and lower halves 121, 122. A hub 125 made of a ferromagnetic material is fitted to a center portion of the hard disk 124 and opposed to a center aperture 126 formed through the lower half 122.

An opening portion 127 into which the tip end portion of the actuator arm 111 is inserted together with the suspensions 112a, 112b attached with the R/W heads H is formed at both of the upper and lower halves 121, 122 on the front surface side of the disk cartridge 120. A shutter 128 for opening and closing the opening portion 127 is attached to the opening portion 127. The shutter 128 is pivotally and rotatably supported by a shaft 129 of the upper half 121. When the disk cartridge 120 is not in use, the shutter 128 closes the opening portion 127 to prevent dust, fingers and so on from being inserted into the disk cartridge 120. When the disk cartridge 120 is loaded into the disk storage apparatus 101, the shutter 128 is automatically opened.

As shown in FIG. 33, when the disk cartridge 120 is loaded onto the disk storage apparatus 101, the disk cartridge 120 is horizontally inserted into the disk cartridge loading portion 103 disposed on the front half portion side of the main chassis 102 through the front surface insertion slot 103a with its opening 127 being opposed to the front surface insertion slot 103a. Initially, the shutter 128 is automatically opened by a shutter opening and closing mechanism (not shown), and hence the opening portion 127 is exposed to the outside. When the disk cartridge 120 is inserted and moved to a predetermined position, as shown in FIG. 34, a part of the actuator arm 111 from its tip end portion to the both suspensions 112a, 112b and the slide-shaped portion of the ramp 114 are moved through the opening portion 127 into the disk cartridge 120, a part of an outer periphery portion of the hard disk 124 is located in the concave portion of the ramp 114. In this state, since load bars 113 are in contact with a high position portion of the ramp 114, the suspensions 112a, 112b are held across an extended interval, thereby the R/W heads H being located across an interval which is larger than a thickness of the hard disk 124.

In this state, the spindle motor 108 of the disk rotating mechanism 104 is lifted up and projected from the opening 106 at the bottom-surface center portion of the disk cartridge loading portion 103 by a predetermined height. The spindle motor 108 attracts the hub 125 of the hard disk 124 through the center aperture 126 of the lower half 122 by an attraction magnetic force of a chucking magnet 107. Then, the spindle motor 108 and the hard disk 124 are moved integrally, i.e., the hard disk 124 is chucked by the spindle motor 108.

Then, when the spindle motor 108 is rotated and its rotation speed becomes a certain angular velocity, the actuator arm 111 is rotated in the direction toward the inside of the disk cartridge 120, i.e., in the direction toward the hard disk 124 by the actuator 110, and then the load bars 113 of the both suspensions 112a, 112b are slid down on the ramp 114 from its higher position side to its lower position side. Consequently, the R/W heads H are gradually brought into their landing states on the hard disk 124. In this landing operation, when the hard disk 124 is rotated, an aerodynamic effect produced between the hard disk 124 and a slider supporting the R/W heads H, i.e., a so-called air film produced between the surface of the rotating hard disk 124 and the slider floats the slider over the hard disk 124 across an interval of several tens of nm, and hence prevents the R/W heads H and the hard disk 124 from being in contact with each other.

In this state, the actuator arm 111 is rotated to position the R/W heads H to a predetermined track, and then information is read out from and/or written in the hard disk 124.

Since in the disk storage apparatus thus arranged the actuator arm 111 for moving the R/W head H and the ramp 114 moving the R/W head H moved close to and away from the hard disk 124 are disposed so as to be opposed to the disk cartridge loading portion 103, it is impossible to carry out a pop-up type loading and unloading operation for loading and unloading the disk cartridge 120 onto and from the disk cartridge loading portion 103, and hence, in order not to interfere with the actuator arm 111 and the ramp 114, the disk cartridge 120 must be inserted into the disk cartridge loading portion 103 with being in parallel to a bottom surface portion of the disk cartridge loading portion 103 and with an opening 127 being opened. Therefore, when the disk cartridge 120 is inserted into and ejected from the disk cartridge loading portion 103, the bottom surface portion of the disk cartridge loading portion 103 must be kept so as to be a plane having no projection.

Accordingly, the spindle motor 108 for attaching and rotating the hard disk 124 in the disk cartridge 120 on the bottom surface of the disk cartridge loading portion 103 must be lifted down from the bottom surface of the disk cartridge loading portion 103 when the disk cartridge 120 is inserted and ejected. In order to lift the spindle motor 108 up and down as described above, a supporting mechanism for supporting the spindle motor 108 must require safety and reliability, which complicates an arrangement of the supporting mechanism and increases the manufacturing costs thereof.

The actuator arm 111 is formed to be fork-shaped in order not to interfere with the hard disk and has suspensions for supporting the R/W heads H 112 fitted to its tip end portions so as to be extended in a center line thereof. Thus, the actuator arm 111 has an in-line arrangement. Since the actuator arm 111 is pivotally attached to a position in the vicinity of the disk cartridge loading portion 103 in order to downsize the disk storage apparatus, the actuator arm 111 must be inserted into the disk cartridge 120 loaded onto the disk cartridge loading portion 103 with its portion from the suspensions 112 at its tip end portions to a pivot portion thereof being inserted into the disk cartridge 120 from its side surface side. Consequently, the disk cartridge 120 must be formed with its opening portion 127 being set larger, which considerably restricts a shape of the disk cartridge and also restricts a freedom of a design of a structure. Therefore, it is difficult to manufacture a desired disk cartridge.

The ramp 114 is formed so as to be fork-shaped in order not to interfere the hard disk. Since the ramp 114 must be located away from both surfaces of the hard disk at an interval, an interval between the suspensions 112 must be spread wider, which results in that the ramp 114 is inevitably formed so as to be thick. As a result, the disk cartridge and the disk storage apparatus become thicker, which becomes a bar to downsize the disk storage apparatus.

Since the suspensions 112 are arranged in an in-line fashion relative to the actuator arm 111, the suspensions 112 are easily influenced by a torsion mode which is one of a resonance of the suspension. Therefore, there is the possibility that the R/W heads H become unstable state relative to the hard disk surfaces and hence the reading/writing operations are prevented from being carried out correctly.

Since a concave portion at the fork-shaped portion of the ramp 114 is opened toward the hard disk 124 side, in a state that the disk cartridge 120 is not loaded, when the actuator arm 111 is rotated because of some cause and then rotated backward, the suspensions 112a, 112b with the R/W heads H are inserted into and engaged with the concave portion of the ramp 114, which disables the actuator arm 111 to be further rotated backward and may damage the R/W heads H.

Since the actuator arm 111 is inserted into the disk cartridge 120, a corner of a portion of the R/W head attached with a wiring by soldering is made smaller in order to prevent it from interfering with the disk cartridge 120, a workability of wiring, soldering and so on becomes unsatisfactory.

Since the disk cartridge 120 must be inserted without interfering with the actuator arm 111, the ramp 114 and so on when it is loaded, high accuracy is required for a guide mechanism, which leads to increase of the manufacturing costs of the above-mentioned disk storage apparatus.

SUMMARY OF THE INVENTION

In view of such aspects, it is an object of the present invention to provide a disk storage apparatus which reliably and stably carries out the operations and can reduce manufacturing costs.

According to a first aspect of the present invention, a disk apparatus includes a chassis, a loading means provided on the chassis for detachably loading a disk cartridge in which a disk-like recording medium is rotatably accommodated, a rotating means for rotating the disk-like recording medium in the loaded disk cartridge, a head means for accessing to the rotated disk-like recording medium, a head moving means supported by a rotating and supporting member provided on the chassis and mounted with the head means in the vicinity of its one end portion, and a drive means for rotating the head moving means through the rotating and supporting member to move the head means to a desired position on the disk-like recording medium in the disk cartridge. The drive means, after the loading means loads the disk cartridge, inserts the head means into the disk cartridge.

According to a second aspect of the present invention, an access method of accessing a disk-like recording medium in a disk cartridge inserted into a disk apparatus by a head, comprising a loading step of loading a disk cartridge rotatably accommodating a disk-like recording medium, a rotating step of rotating the disk-like recording medium in the loaded disk cartridge, and a movement step of, after the disk cartridge is loaded in the loading step, rotating a head moving means supported by a rotation supporting member provided on a chassis and mounted with a head means in the vicinity o fits end portion to move the head means to a desired position of the disk-like recording medium in the disk cartridge.

According to a third aspect of the present invention, a head retracting method of retracting a head from a disk-like recording medium in a disk cartridge inserted into a disk apparatus includes a first movement step of rotating a head moving means supported by a rotation supporting member provided on the chassis and mounted with a head means in the vicinity of its end portion to thereby move the head means from a position over the disk-like recording medium in the direction toward an outer periphery of the disk-like recording medium, a ramp-means insertion step of inserting the ramp means for keeping two heads of the head means away from each other substantially at a position between the two heads, and a second movement step of moving the head means out of the disk cartridge while the ramp means is being located in the vicinity of a position between the two heads.

BRIEF DESCRIPTION OF THE DRAWINGS

FIG. 9 is a cross-sectional showing a main part of the information recording and reproducing mechanism of the disk recording and reproducing apparatus shown in FIG. 1 and used to explain a relationship between the rotation actuator and a ramp;

FIG. 10 is a cross-sectional view showing the rotation actuator and a ramp portion cut along a line connecting projections 61a, 61b;

FIG. 11 is a cross-sectional view showing the rotation actuator of the disk recording and reproducing apparatus shown in FIG. 1;

DESCRIPTION OF THE PREFERRED EMBODIMENTS

A disk recording and reproducing apparatus which is a disk storage apparatus according to a first embodiment of the present invention will be described with reference to the accompanying drawings. The disk recording and reproducing apparatus according to the first embodiment is one obtained by applying the present invention to a disk recording and reproducing apparatus which can record newly an information signal on a hard disk (magnetic disk) as an example of a disk-like recording medium and reproduce an information signal previously recorded on the hard disk. This disk recording and reproducing apparatus according to the first embodiment will be described in the following order.

Figure 22:
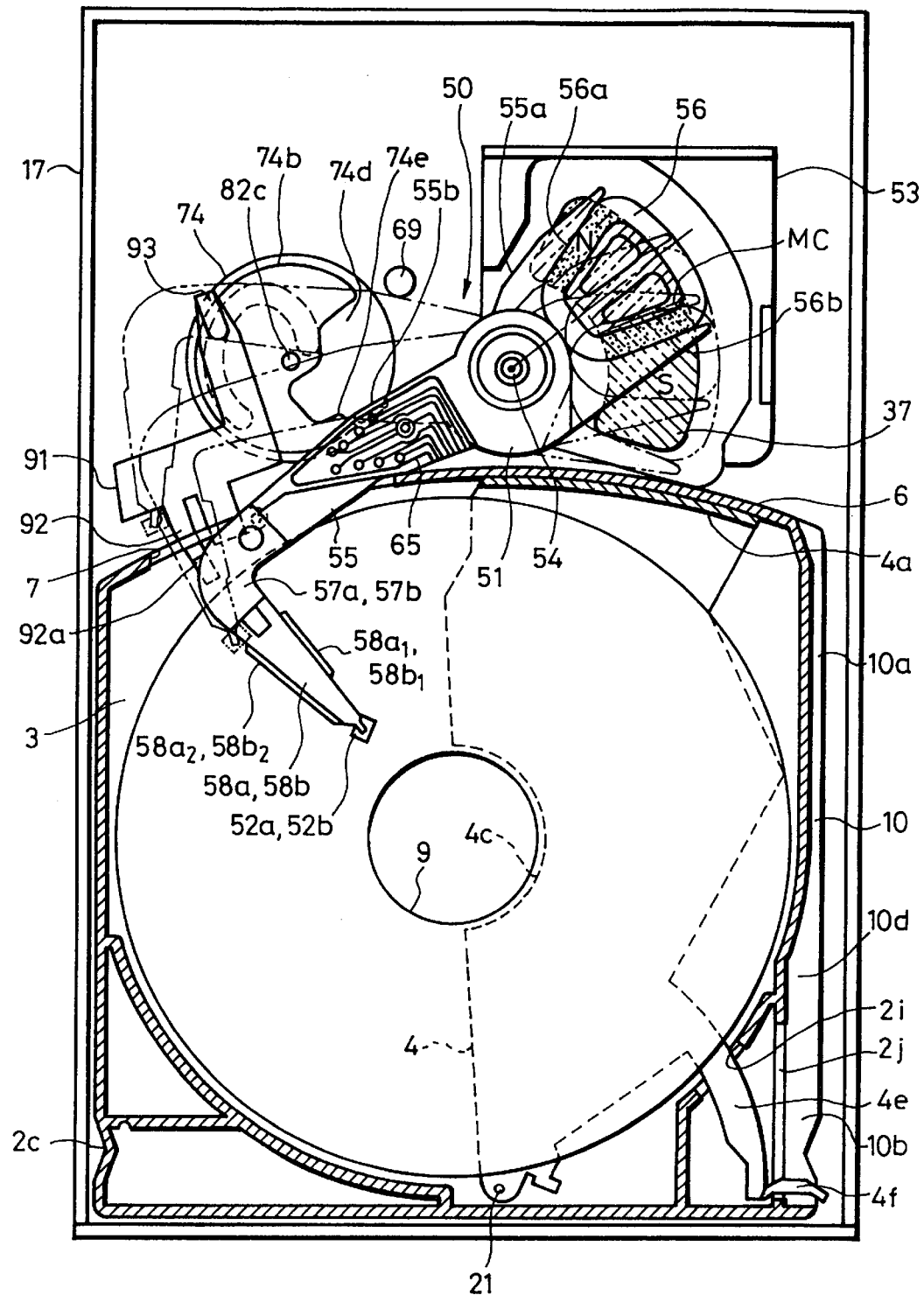
FIG. 22 is an explanatory, cross-sectional view showing the disk recording and reproducing apparatus shown in FIG. 1 while the operation of loading recording/reproducing head is being loaded.
Figure 23:
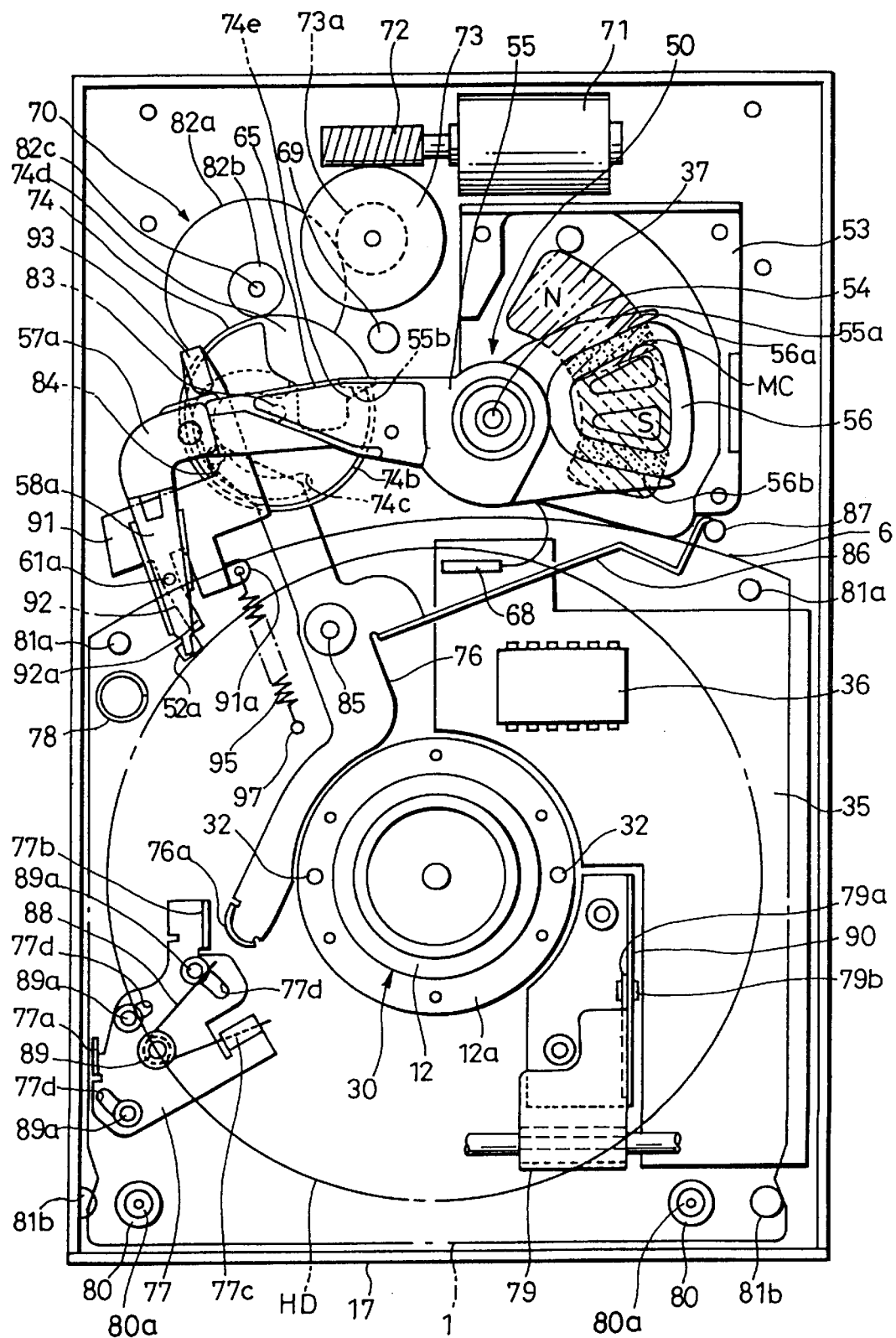
FIG. 23 is a plan view showing the disk cartridge of the disk recording and reproducing apparatus shown in FIG. 1 in an initial state that the recording/reproducing head is unloaded.
Figure 24:
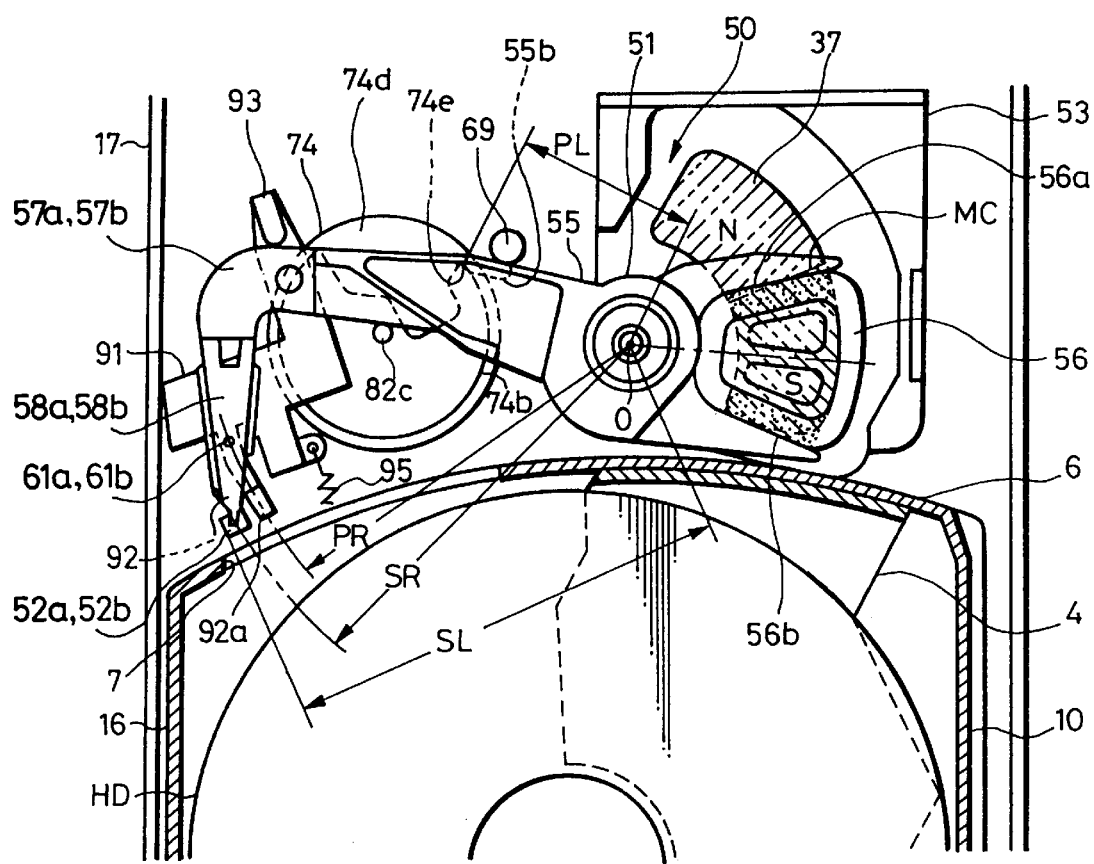
FIG. 24 is an explanatory, cross-sectional view showing a main part of the disk recording and reproducing apparatus shown in FIG. 1 while a recording/reproducing head is being unloaded.
Figure 25:
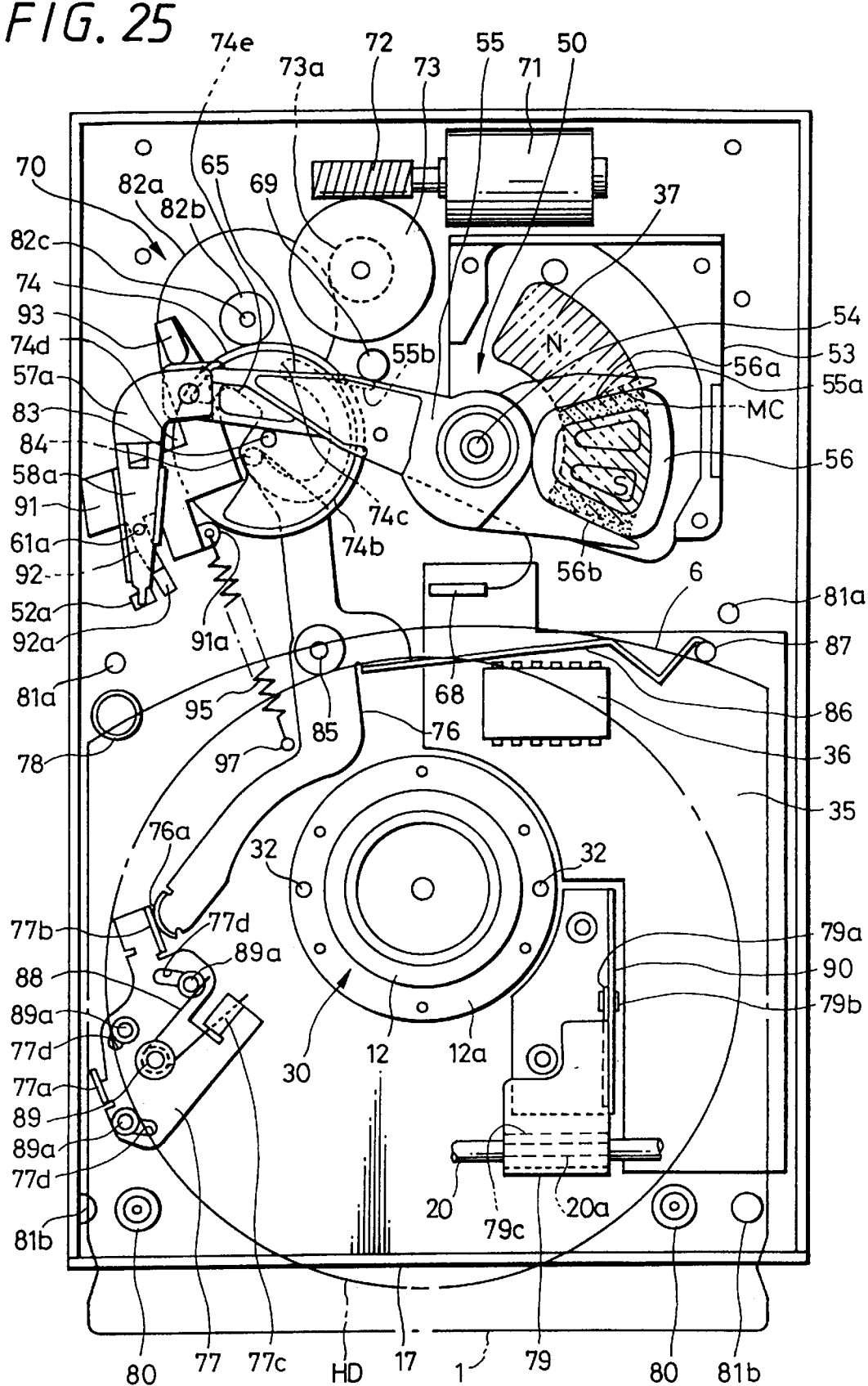
FIG. 25 is a plan view showing the disk recording and reproducing apparatus shown in FIG. 1 in a state that a disk cartridge is ejected.

[1] Arrangement of disk cartridge (FIG. 15)
[2] Outer arrangement of disk recording and reproducing apparatus (FIG. 2)
[3] Inner arrangement of disk recording and reproducing apparatus
  (3-1) Disk drive mechanism (FIG. 1)
  (3-2) Shutter opening mechanism (FIGS. 2 and 3)
  (3-3) Information recording and reproducing mechanism (FIGS. 1, 6, 12 and 13)
  (3-4) Disk drive loading mechanism (FIGS. 1, 2, 4 to 11)
[4] Operation of disk loading apparatus
  (4-1) Initial state of insertion of disk cartridge (FIG. 16)
  (4-2) State of disk cartridge before shutter is opened (FIG. 17)
  (4-3) State of disk cartridge after shutter is opened (FIG. 18)
  (4-4) Initial state of loading operation of hard disk drive (FIG. 19)
  (4-5) State during loading operation of hard disk drive (FIG. 20)
  (4-6) State of completion of loading operation of hard disk drive (FIGS. 21 to 22)
  (4-7) Initial state of unloading operation of hard disk drive (FIGS. 23 to 25)

Figure 15:
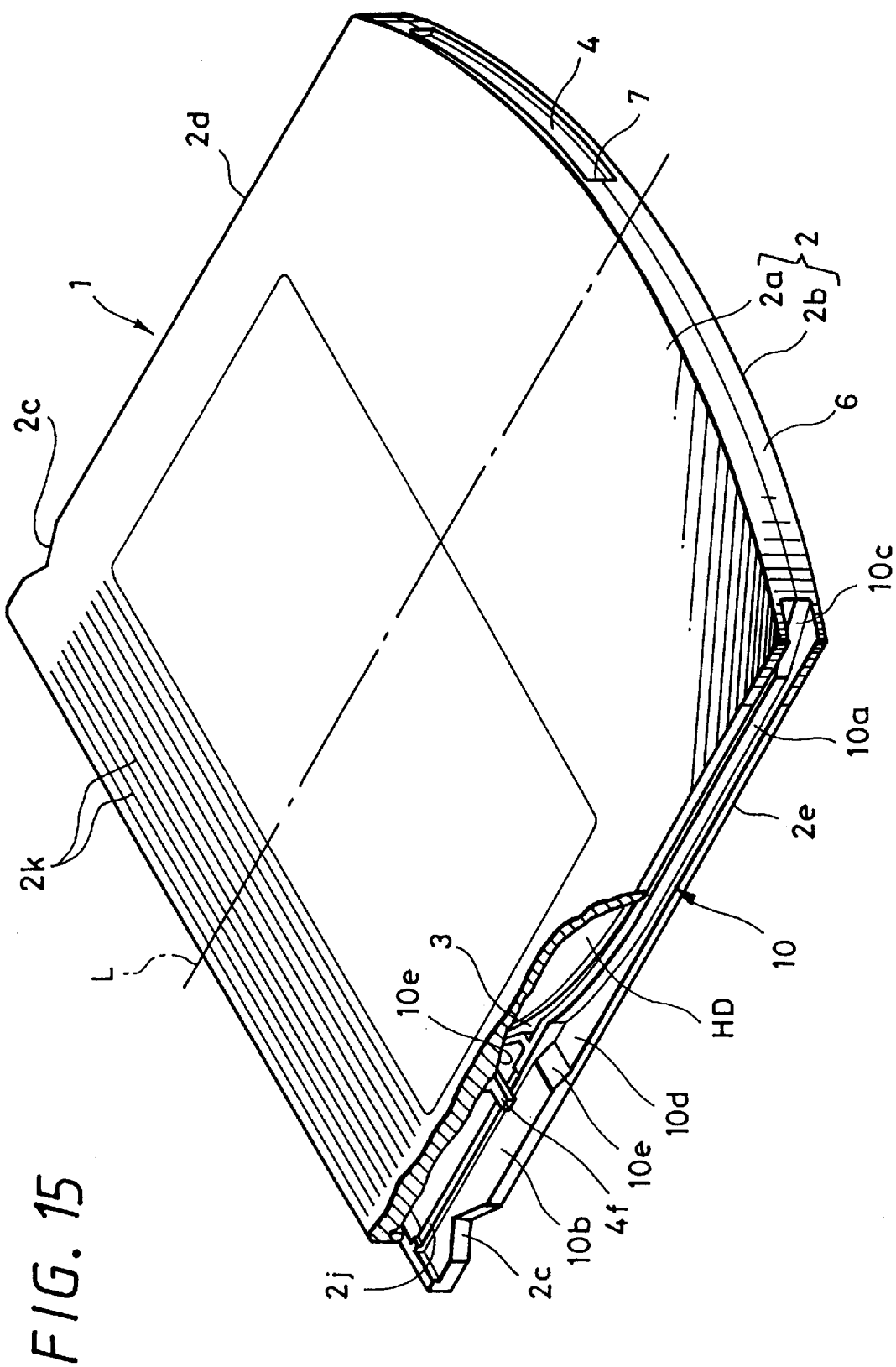
FIG. 15 is a perspective view showing a disk cartridge, partially cut away, for use in the disk recording and reproducing apparatus according to the present invention.

[1] Arrangement of Disk Cartridge (FIG. 15)

As shown in FIG. 15, a disk cartridge 1 has a disk casing 2 formed of a pair of upper and lower halves 2a, 2b joined together vertically, a hard disk (magnetic disk) HD which is one of disk-like recording media rotatably accommodated in a disk accommodation chamber 3 formed in the disk casing 2, a shutter member 4 rotatably accommodated in the disk accommodation chamber 3, a shutter spring 5 for pressing the shutter member 4 toward a surface of the disk accommodation chamber 3 and for biasing a head insertion slot 7 of the disk casing 2 in the direction in which the head insertion slot 7 is closed, and so on. The upper and lower halves 2a, 2b are joined to each other at their opening surface sides, and their contact surfaces are bonded by some suitable processing such as a supersonic processing or the like or by some fixing means such as an adhesive, fixing screws or the like. Thus, the disk cartridge 1 is integrally constructed.

The disk casing 2 of the disk cartridge 1 is formed of a thin vessel whose surface shape is substantially rectangular. The disk casing 2 has grip groove porions 2k at which a user grips the disk cartridge 1 to draw the disk cartridge 1 from the disk recording and reproducing apparatus, and grip notches 2c, 2c used for a cartridge changer apparatus to grip the disk cartridge 1. The grip notches 2c, 2c of the disk casing 2 are provided so that the cartridge changer apparatus should reliably carry out an operation for automatically drawing the disk cartridge 1 from the disk storage apparatus and an operation for automatically inserting the disk cartridge 1 thereinto. If the cartridge changer apparatus has a medium rack for accommodating the disk cartridge 1, the grip notches 2c, 2c serve so that the cartridge changer apparatus can reliably carry out the operations for drawing and inserting the disk cartridge 1 from and into the medium rack.

An offset arc portion 6 is formed at a front portion of the disk casing 2, i.e., a front portion of the disk cartridge 1 which is a side of insertion of the disk cartridge 1 into the disk recording and reproducing apparatus by offsetting a center line of a radius of curvature of the offset arc portion 6 from a center line L toward one side (left side of the disk cartridge 1 seen from its front side in FIG. 15). As a result, the length of one side surface 2d of the disk casing 2 is set shorter than that of the other side surface 2e thereof. The rectangular head insertion slot 7 extended in the horizontal direction is formed through the offset arc portion 6 on the short side surface 2d by properly notching off both of the contact portions of the upper and lower halves 2a, 2b at that portion.

Figure 16:
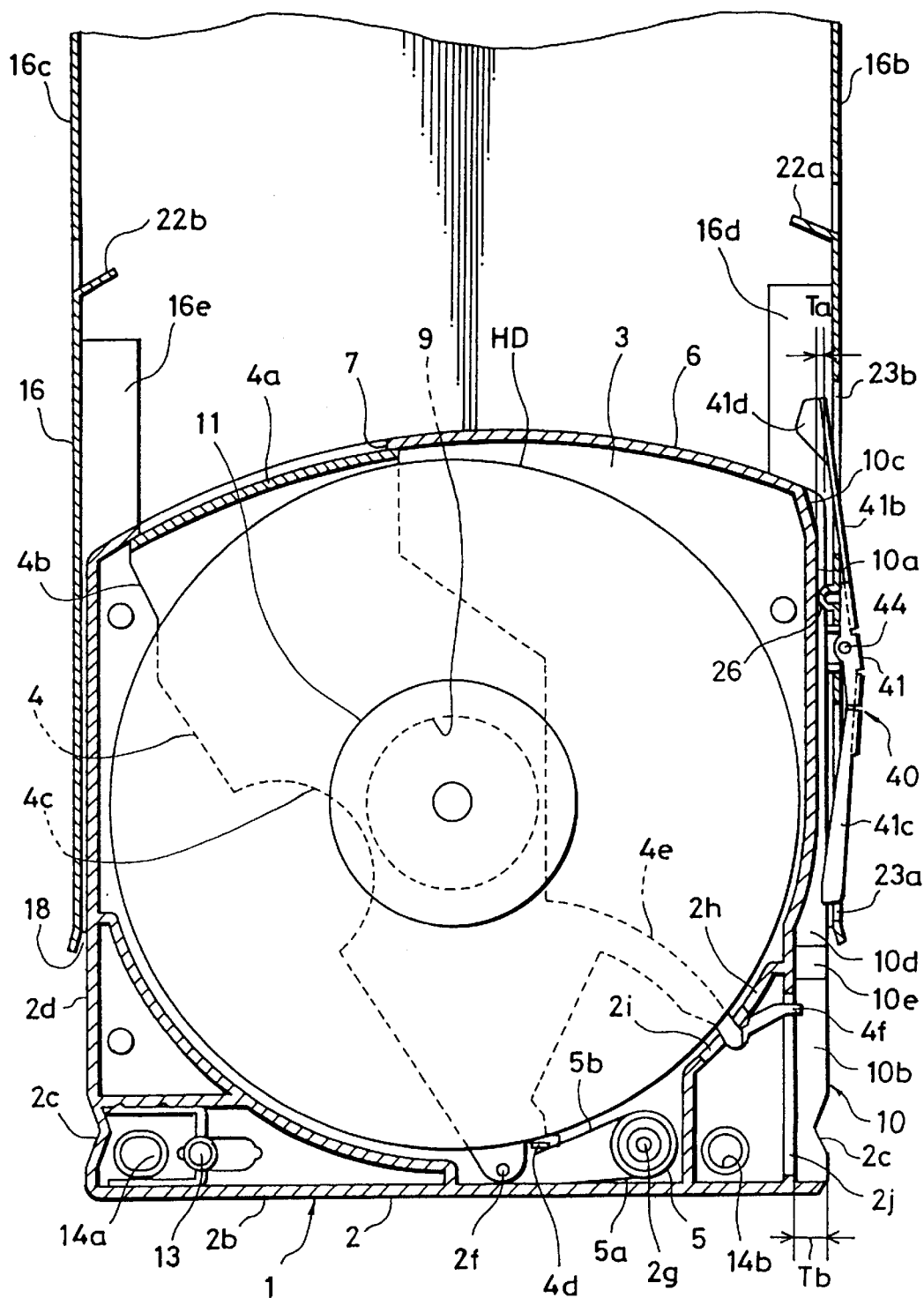
FIG. 16 is a plan view showing an initial insertion state of the disk cartridge of the disk recording and reproducing apparatus shown in FIG. 1.
Figure 17:
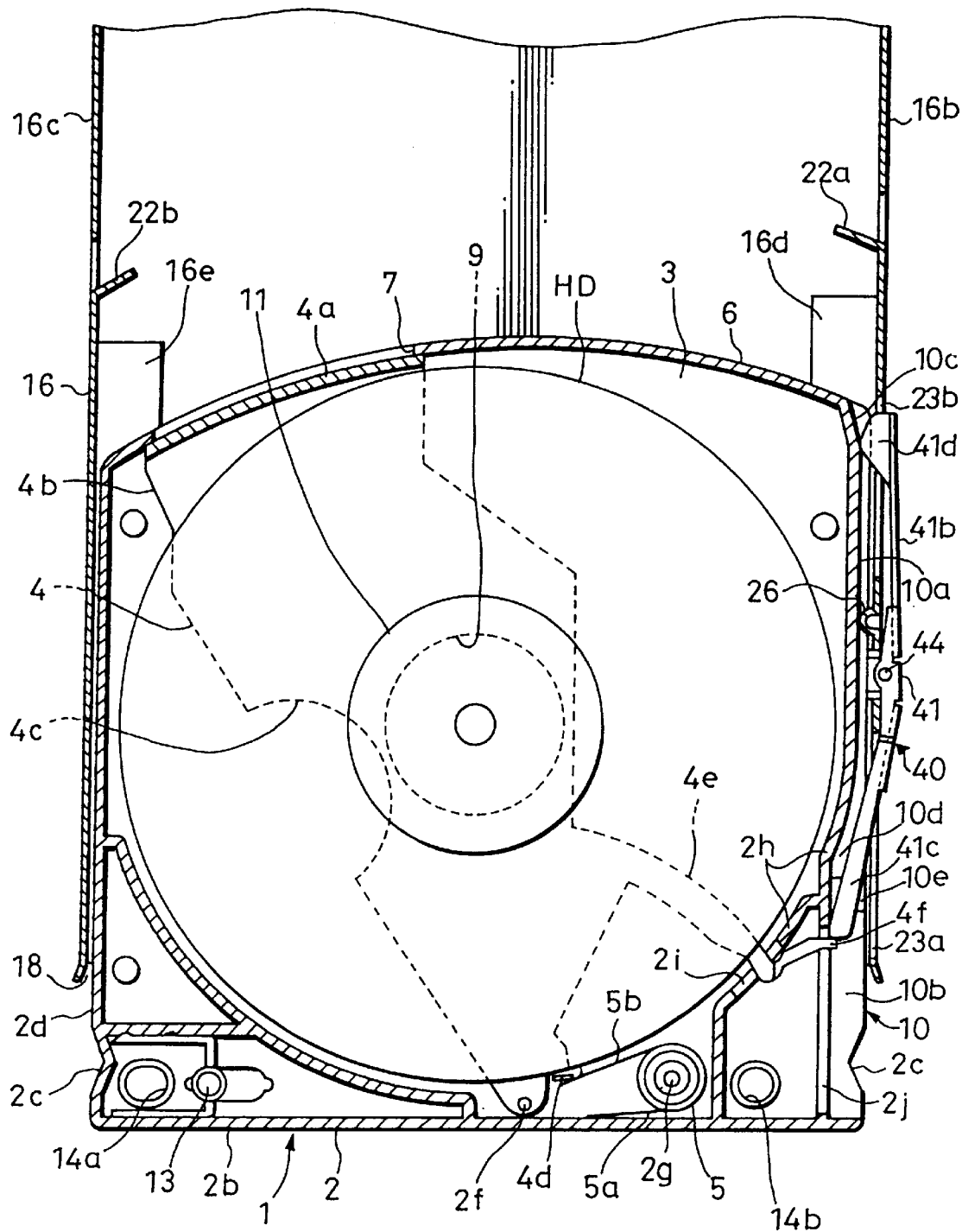
FIG. 17 is a plan view showing a state of the disk cartridge of the disk recording and reproducing apparatus shown in FIG. 1 before a shutter is opened.

A magnetic head 8 for writing a new information signal in an information recording portion of the hard disk HD accommodated in the disk accommodation chamber 3 upon the recording and for reading therefrom an information signal previously recorded on the information recording portion thereof upon the reproduction is inserted into the head insertion slot 7. As shown in FIGS. 15 to 17, the head insertion slot 7 can be opened and closed by an arc-shaped shutter plate 4a provided at a tip end portion of the shutter member 4 to be accommodated in the disk accommodation chamber 3. This shutter member 4 has, other than the shutter plate 4a, a core aperture opening and closing plate 4b for opening and closing a center core aperture 9 bored through a substantial center portion of the lower half 2b. The shutter plate 4a and the core aperture opening and closing plate 4b are integrally formed with the shutter plate 4a being provided at one end of the core aperture opening and closing plate 4b perpendicularly to the core aperture opening and closing plate 4b.

A base end portion of the shutter member 4, i.e., the other end of the core aperture opening and closing plate 4b is rotatably and pivotally supported by a fulcrum shaft 2f provided on a rear portion of the lower half 2b at a position displaced from a center toward the long side surface 2e side. When the shutter member 4 is rotated around the fulcrum shaft 2f, the shutter plate 4a is moved along an inner surface of the offset arc portion 6, and the core aperture opening and closing plate 4b is moved along the inner surface of the disk accommodation chamber 3. When the shutter member 4 is located on the side of the short side surface 2d, the shutter plate 4a closes the head insertion slot 7 and the core aperture opening and closing plate 4b closes the center core aperture 9. On the other hand, when t h e shutter member 4 is moved to the side of the long side surface 2e, the shutter plate 4a opens the head insertion slot 7 and the core aperture opening and closing plate 4b opens the center core aperture 9. Therefore, the core aperture opening and closing plate 4b of the shutter member 4 has a shutter notch 4c which allows the center core aperture 9 to be fully opened when the shutter is opened.

The shutter member 4 is constantly biased by the shutter spring 5 formed of a torsion coil in the direction in which the shutter plate 4a closes the head insertion slot 7. The shutter spring 5 is loosely engaged at its coil portion with a supporting shaft 2g provided at a position displaced further toward the long side surface 2e side as compared with the fulcrum shaft 2f of the lower half 2b. A spring piece 5a projected from one end of the coil porion of the shutter spring 5 is in contact with an inner surface of the lower half 2b. A spring piece 5b projected from the other end of the coil portion is engaged with a spring stopper piece 4d provided in the vicinity of the base end portion of the core aperture opening and closing plate 4b. In order to secure a clearance between the upper and lower halves 2a, 2b at the head insertion portion and suspensions 58a, 58b described later on and because of an arrangement for attaching the shutter member 4 biased by the shutter spring 5 and particularly the shutter plate 4a and so on, in this embodiment, a thickness of a portion, which is to be in contact with the shutter plate 4a, of the lower half 2b and a thickness of a surrounding portion thereof are made thin.

Moreover, an arc-shaped operation arm 4e projected on the opposite side of the shutter notch 4c is provided on the core aperture opening and closing plate 4b of the shutter member 4. An operation click 4f is integrally provided at the tip end portion of the operation arm 4e. The operation click 4f has a step portion set in consideration of a thickness of the hard disk HD. This step portion permits the operation click 4f to be exposed to the outside through the joint surface between the upper and lower halves 2a, 2b. Thus, the operation arm 4e of the shutter member 4 is pieced through a notch 2i provided through an arc-shaped side wall 2h formed through the rear portion of the lower half 2b, and a tip end portion of the operation click 4f continuously provided at a tip end of the operation arm 4e is exposed through a notch 2j provided through the joint surface between the upper and lower halves 2a, 2b to a guide groove 10 provided at the long side surface 2e of the disk casing 2 so as to be extended in the forward and backward direction.

The guide groove 10 has a wide portion 10a having a wide width in a thick direction (i.e., a direction in which the upper and lower halves 2a, 2b are jointed together) and provided at the front side of the disk casing 2, a narrow portion 10b provided at the rear side of the disk casing 2 and having a narrow width in the vertical direction, an introduction portion 10c inclined inward and formed at a tip end of the wide portion 10a so as to be wide, and an opening and closing operation portion 10d set between a rear portion of the wide portion 10a and a front portion of the narrow porion 10b. In the opening and closing operation portion 10d of the guide groove 10, inclined surfaces 10e, 10e are formed on the upper and lower halves 2a, 2b at portions connecting the wide portion 10a and the narrow portion n10b. The inclined surfaces 10e, 10e guide an operation piece 41c of a shutter opening lever 41 described later on, which allows the operation piece 41c to be smoothly moved from the wide portion 10a to the narrow portion 10b.

The narrow portion 10b of the guide groove 10 is formed so that its depth Tb should be set sufficiently larger than a depth Ta of the wide portion 10a (i.e., Tb>Ta). Therefore, in a state that the shutter member 4 is in its fully opened state, the operation click 4f is prevented from being considerably projected outward from the guide groove 10. A side surface of the opening and closing operation portion 10d having such a step is formed of a part of the above arc-shaped side wall 2h, and an outer surface of the side surface is smoothly continued with being arc-shaped. The operation click 4f of the shutter member 4 is located at the narrow portion 10b of the guide groove 10, and usually only the tip end portion of the operation click 4f is projected in the guide groove 10.

The hard disk HD is formed of a disk-shaped disk-like recording member whose upper and lower surfaces are signal recording surfaces where a signal is recorded in accordance with a magnetic recording system. A center core 11 attracted by a magnet of the spindle motor 12 is integrally fixed on a center portion of the hard disk HD. The center core 11 of the hard disk HD corresponds to the center core aperture 9 provided through the lower half 2b. When the center core aperture 9 is opened by rotation of the core aperture opening and closing plate 4b, the center core 11 is brought in contact with the spindle motor 12 formed integrally with a turntable and inserted through the center core aperture 9. The spindle motor 12 is formed integrally with the above ring-shaped magnet engaged with a rotation portion of the spindle motor 12. The spindle motor 12 chucks the hard disk HD by the attraction force of the magnet, thereby the spindle motor 12 and the hard disk HD being integrally rotated.

As shown in FIG. 16 and so on, an erroneous erasure preventing tab 13 for opening and closing a write-protect aperture is provided at one side of the rear portion of the disk cartridge 1. Moreover, positioning apertures 14a, 14b used for setting the disk cartridge 1 at a predetermined position of the disk recording and reproducing apparatus are respectively provided in the vicinity of the erroneous erasure preventing tab 13 and in the vicinity of the shutter spring 5 located on the opposite side of the erroneous erasure preventing aperture 13.

Though not shown, one guide groove or more extended with having arc shapes whose center is the fulcrum shaft 2f is provided on the core aperture opening and closing plate 4b of the shutter member 4. Guide pins provided at the lower half 2b are engaged with the guide grooves. The guide pins engaged with the guide grooves receive the center core 11 of the hard disk HD to reduce a friction force resulting from a sliding operation between the core aperture opening and closing plate 4b and the center core 11. Thus, the operation for opening the head insertion slot 7 and the center core aperture 9 can be carried out smoothly.

While a suitable material used for the upper and lower halves 2a, 2b having the above arrangement is a synthetic resin such as polycarbonate (PC) or the like, other synthetic resin can be employed as the above material for the upper and lower halves 2a, 2b. In this embodiment, as a material for the shutter member 4, polycarbonate PC is employed for the shutter plate 4a, while the stainless steel plate is employed for the core aperture opening and closing plate 4b. Polycarbonate (PC) is outsert-molded into the shutter plate 4a at the tip end portion of the stainless steel plate, thereby the shutter member 4 being formed integrally with the core aperture opening and closing plate 4b. However, it is needless to say that synthetic resin material such as polycarbonate (PC) or the like may be molded into the whole shutter member 4, or a metal material such as a stainless steel plate or the like may be molded into the whole shutter member 4. Moreover, when the shutter member 4 is formed by outsert-molding, other synthetic resin material such as polyacetal (POM) or the like which is excellent in a slide property may be employed other than polycarbonate (PC).

Figure 2:
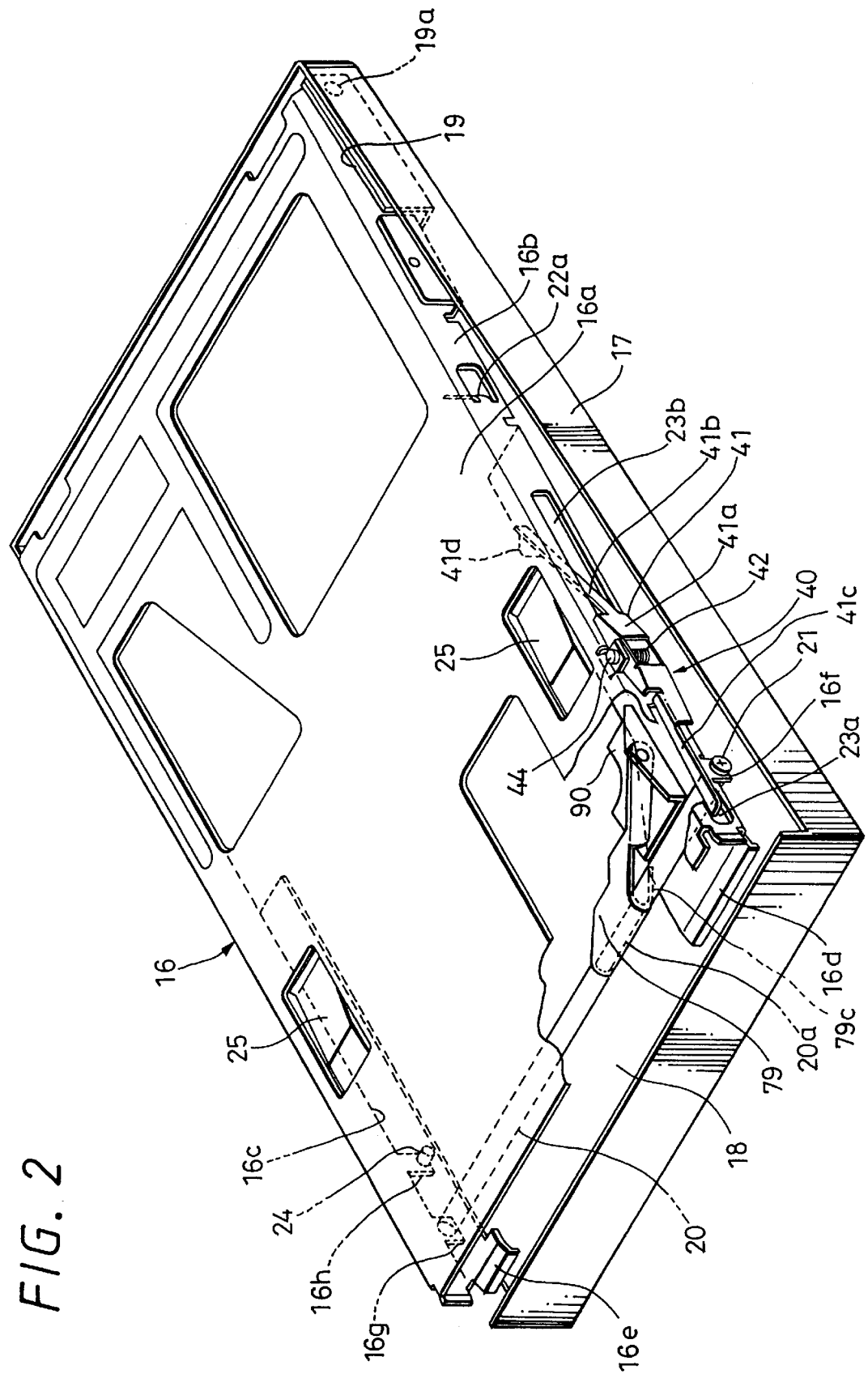
FIG. 2 is a perspective view showing the mechanical chassis and the popped cartridge holder of the disk recording and reproducing apparatus according to the embodiment of the present invention.

[2] Outer Arrangement of Disk Recording and Reproducing Apparatus (FIG. 2)

The disk recording and reproducing apparatus according to this embodiment is a pop-up type disk storage apparatus whose cartridge holder 16 onto which the disk cartridge 1 is to be loaded is inclined. FIG. 2 is a diagram showing an outer appearance of the disk recording and reproducing apparatus. The disk recording and reproducing apparatus is large enough to incorporate therein a disk drive mechanism 30, a shutter opening mechanism 40, an information recording and reproducing mechanism 50 and a disk drive loading mechanism 70 which are described later on. The disk recording and reproducing apparatus has a mechanical chassis 17 whose upper surface side is opened, a cartridge holder 16 fitted in the mechanical chassis 17 so as to be inclined and permitting a cartridge insertion slot 18 provided at its front surface to be opened and closed, and so on.

The mechanical chassis 17 is formed of a shallow rectangular casing having an opening at its upper surface. A pair of left and right supporting brackets 19, 19 for supporting both ends of a rear portion of the cartridge holder 16 so that the cartridge holder 16 can be inclined are fitted to rear-side both side portions of the mechanical chassis 17. Bearing holes are provided at rear portions of the supporting brackets 19, 19, and rotation fulcrum shafts 19a, 19a projectingly provided at both rear-portion ends of the cartridge holder 16 are rotatably engaged with the bearing holes, respectively.

The cartridge holder 16 has a rectangular upper surface plate 16a which is slightly smaller than the mechanical chassis 17 in view of a plane, side surface plates 16b, 16c continuously connected to both of left and right sides of the upper surface plate 16a, and holding plates 16d, 16e formed so as to be continuously connected to respective lower portions of the both of the side surface plates 16b, 16c and formed by bending the both of the side surface plates 16b, 16c inward with proper widths. The cartridge insertion slot 18 is provided at a front portion of a space surrounded by the above plates 16a to 16e. Accordingly the inside of the cartridge holder 16 is set as a space having substantially the same size as the disk cartridge 1. The disk cartridge 1 is inserted and drawn through the cartridge insertion slot 18, and the disk cartridge 1 is loaded onto the disk cartridge loading portion.

Shaft supporting pieces 16f, 16g are provided at lower portions of the both side surface plates 16b, 16c of the cartridge holder 16 by bending parts of the holding plates 16d, 16e downward. A holder reinforcement shaft 20 as a reinforcing member between the cartridge holding portions is stretched between the shaft supporting pieces 16f, 16g. The holder reinforcement shaft 20 is fixed at its both ends on the shaft supporting pieces 16f, 16g by fixing screws 21, 21.

Moreover, stopper pieces 22a, 22b for preventing the disk cartridge 1 from being inserted by a predetermined amount or more are provided at forward and backward direction middle portions of the cartridge holder 16 by bending parts of the side surface plates 16b, 16c inward (see FIG. 15 and so on).

Opening portions 23a, 23b extended in the forward and backward direction and located at an interval in the above direction are provided through a front portion of the one side surface plate 16b of the cartridge holder 16. A supporting piece 16h is provided at a rear portion relative to the shaft supporting piece 16g of the other side surface plate 16c of the cartridge holder 16 by bending a part of the holding plate 16e downward. An engagement pin 24 projected inward is provided on the supporting piece 16h. The engagement pin 24 forms a locking mechanism, which will be described later on, of the cartridge holder 16.

Moreover, pressing plate springs 25, 25 are fitted to front-side side portions of the upper surface plate 16a of the cartridge holder 16 so as to correspond to portions above the holding plates 16d, 16e. The pressing plate springs 25, 25 bias the disk cartridge 1 inserted into the cartridge holder 16 toward the holding plates 16d, 16e, thereby positioning the disk cartridge 1 in the height direction relative to the cartridge holder 16. A suitable material for the cartridge holder 16 is a sheet metal material such as, for example, an electrogalvanized steel plate, a stainless steel plate or the like. A metal material such as a die-casted aluminum, an aluminum plate or the like is suitable for a material of the mechanical chassis 17. However, an engineering plastic such as a polycarbonate or the like having a high mechanical strength can be employed.

Figure 1:
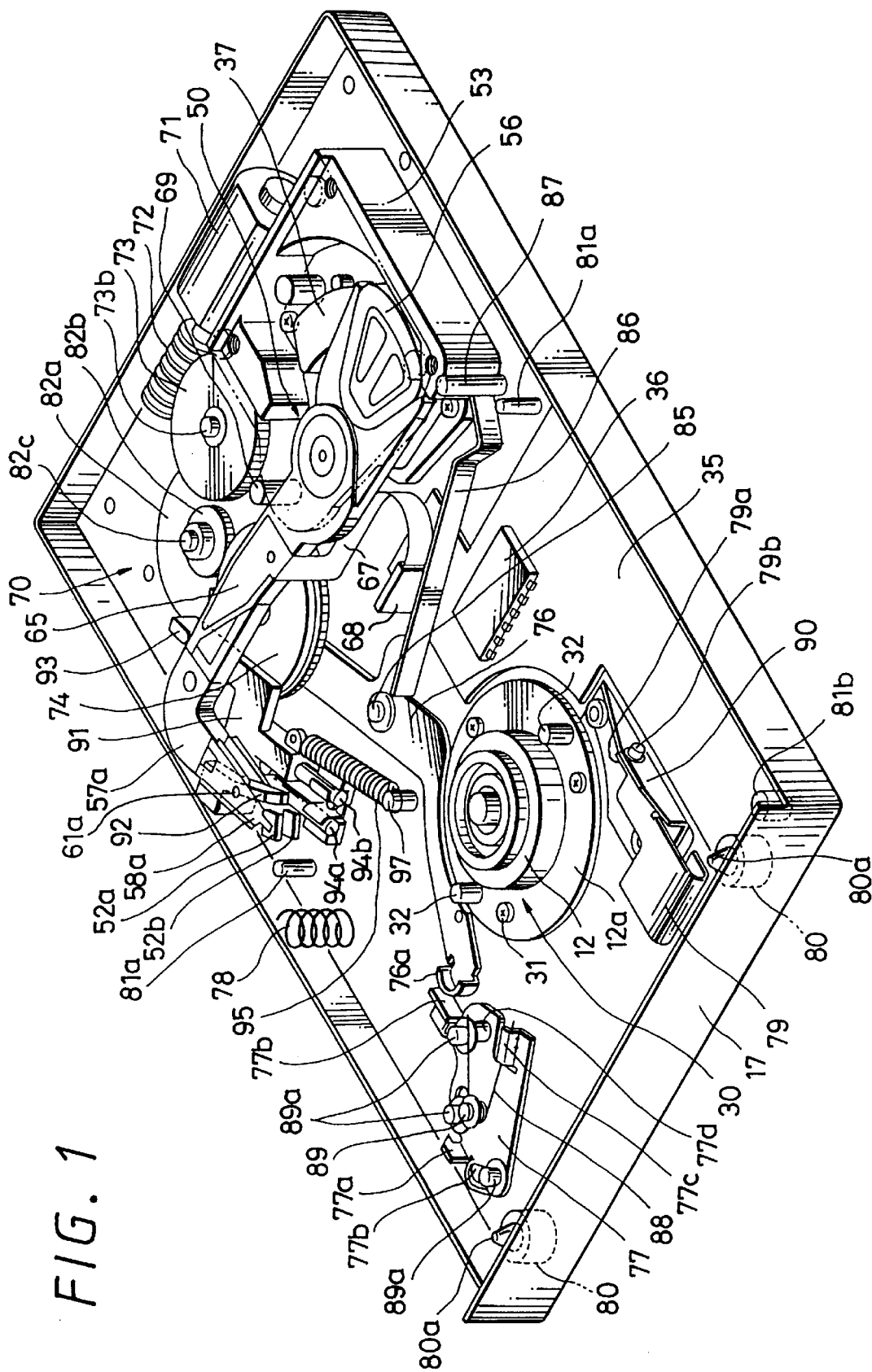
FIG. 1 is a perspective view showing appearances of a disk drive mechanism, an information recording and reproducing mechanism and a disk drive loading mechanism accommodated in a mechanical chassis of a pop-up type disk recording and reproducing apparatus which is a disk storage apparatus according to an embodiment of the present invention.

[3] Inner Arrangement of Disk Recording and Reproducing Apparatus (3-1) Disk Drive Mechanism (FIG. 1)

This disk recording and reproducing apparatus has the disk drive mechanism 30 shown in FIG. 1. The disk drive mechanism 30 has the spindle motor 12 formed integrally with the turntable for chucking the hard disk HD of the disk cartridge 1. The spindle motor 12 is mounted at a front-side center portion of the mechanical chassis 17 with being faced upward, and is fitted to and fixed on the mechanical chassis 17 by a plurality of fitting screws 31 (three screws 31 in this embodiment) whose screw portion pieced through a flange portion 12a thereof is engaged with a screw hole of the mechanical chassis 17.

A plurality of cartridge supporting pins 32 (two cartridge supporting pins 32 in this embodiment) for supporting the disk cartridge 1 at its positions in the vicinity of the center core aperture 9 are provided on the flange portion 12a of the spindle motor 12. As described above, the magnet is attached to the rotation portion of the spindle motor 12. The magnet attracts the center core 11, thereby the hard disk HD being fixed on the rotation portion by chucking. Thus, the hard disk HD is rotated by the spindle motor 12 in the disk accommodation chamber 3.

Figure 3:
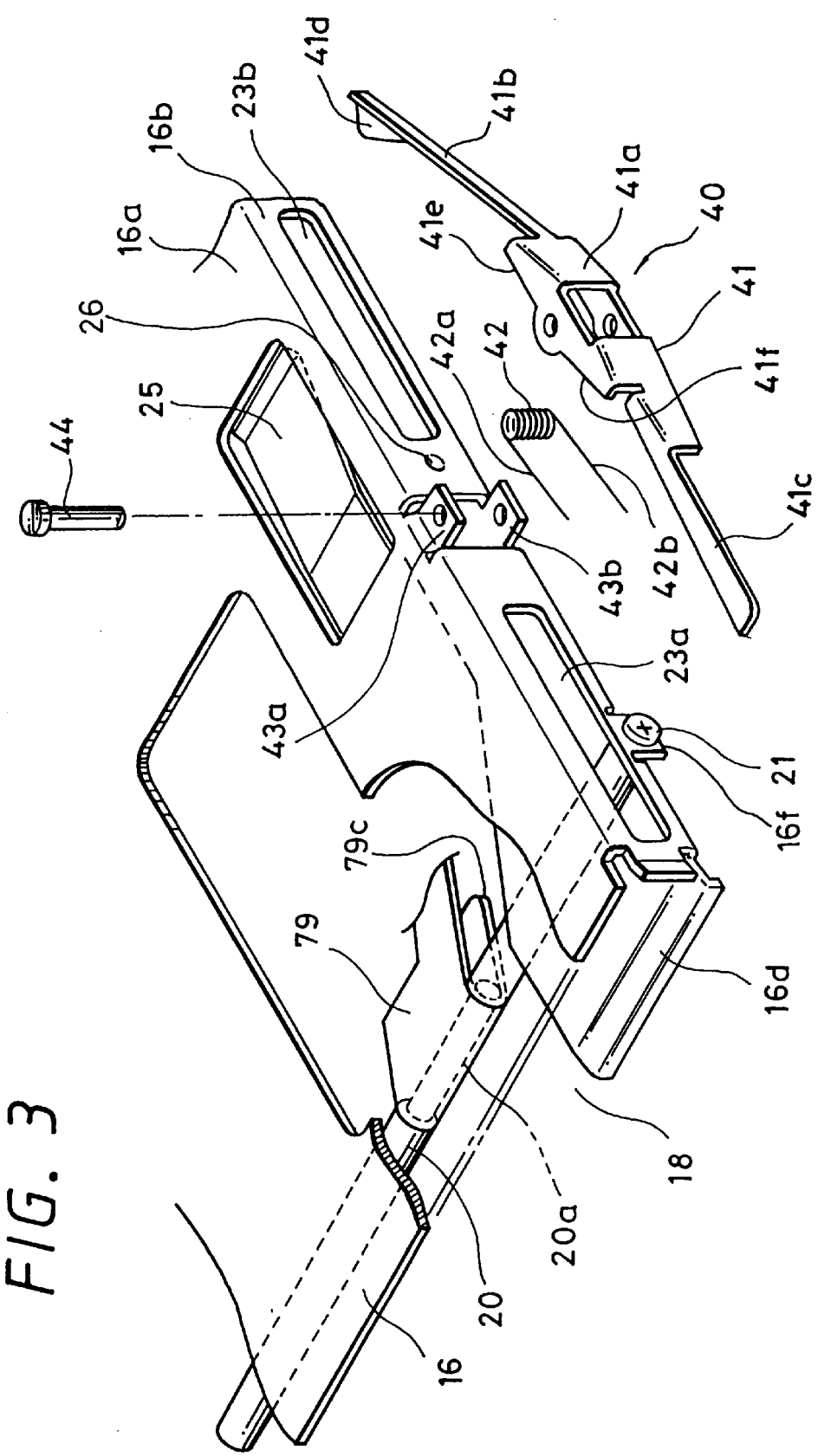
FIG. 3 is an exploded, perspective view showing a main part of the cartridge holder of the disk recording and reproducing apparatus shown in FIG. 2 in an enlarged scale.

(3-2) Shutter Opening Mechanism (FIGS. 2 and 3)

As shown in FIG. 2 and so on, the shutter opening mechanism 40 is used to open the head insertion slot 7 of the disk cartridge 1 loaded onto the cartridge holder 16 by employing a cartridge body as a trigger, being provided on the one side surface plate 16b of the cartridge holder 16. The shutter opening mechanism 40 has a shutter opening lever 41 which is a balance-shaped arm member, and a coil spring 42 which is a biasing member for biasing the shutter opening lever 41. The shutter opening lever 41 has a lever body 41a whose cross section is U-shaped, a load applied piece 41b as a following end, and an action piece 41c as an action end, the load applied piece 41b and the action piece 41c being respectively projected from both end portions of the lever body 41a in the directions opposed to each other. A contact portion 41d projected onto a movement locus of the disk cartridge 1 is provided at a tip end portion of the load applied piece 41b.

In order to attach the shutter opening lever 41 to the cartridge holder 16, a pair of pin supporting pieces 43a, 43b are provided on the side surface plate 16b by bending parts between the front and rear opening portions 23a, 23b upward and downward, respectively. The lever body 41a of the shutter opening lever 41 is located between the pin supporting pieces 43a, 43b. A shaft pin 44 is pierced through pin apertures provided through both of the pin supporting pieces 43a, 43b and pin apertures provided through the lever body 41a. The other end of the shaft pin 44 is caulked, thereby the shutter opening lever 41 being supported on one side of the cartridge holder 16 so that it can be swung in the horizontal direction.

In this state, the load applied piece 41b of the shutter opening lever 41 is opposed to the rear opening portion 23b of the cartridge holder 16, and the action piece 41c is opposed to the front opening portion 23a thereof. A coil portion of the coil spring 42 is loosely engaged with the shaft pin 44 swingingly supporting the shutter opening lever 41 at the cartridge holder 16. A spring piece 42a continuously extended from one end of the coil portion is in contact with the side surface plate 16b, and a spring piece 42b continuously extended from the other end of the coil portion is in contact with the lever body 41a. The load applied piece 41b of the shutter opening lever 41 is biased by a spring force of the coil spring 42 in the direction in which the load applied piece 41b is inserted into the opening portion 23b. As its counteraction, the action piece 41c is biased in the direction in which the action piece 41c is moved out of the opening portion 23a.

In order to limit a rotation amount of the shutter opening lever 41, a load applied side stopper portion 41e for preventing the load applied piece 41b from entering the opening portion 23b by a predetermined length or longer and an action side stopper portion 41f for preventing the action piece 41c from entering the opening portion 23a by a predetermined length or longer are provided on the inner surface of the lever body 41a. The load applied piece 41b of the shutter opening lever 41 is inserted into the wide portion 10a of the guide groove 10 through an introduction portion 10c thereof, and the action piece 41c is inserted into the narrow portion 10b of the guide groove 10 through the operation portion 10d thereof.

The load applied piece 41b of the shutter opening lever 41 serves not only as a portion applied with an operation force (load) but also to position the disk cartridge 1 in the horizontal direction, and hence the load applied piece 41b is required to have both of a certain rigidity and a certain elasticity. Therefore, in this embodiment, the load applied piece 41b is formed so as to be wide in the direction of the width of the guide groove 10, and has the contact portion 41d formed by bending a tip end portion thereof in the direction of the depth of the guide groove 10. The rigidity of the load applied piece 41b in the width direction of the guide groove 10 (the groove-width direction) is set higher than rigidity thereof in the direction of the depth of the guide groove 10 (the groove-depth direction) perpendicular to the groove-width direction, which prevents the load applied piece 41b from being easily deformed in the groove-width direction.

Since the action piece 41c of the shutter opening lever 41 serves mainly to press the operation click 4f, in this embodiment, the action piece 41c is formed by bending the shutter opening lever 41 from the vicinity of the lever body 41a in the direction of the depth of the guide groove 10 so that its horizontal-direction rigidity becomes large. Therefore, since the groove-width direction rigidity of the action piece 41c is set smaller than the rigidity thereof in the groove-depth direction, the action piece 41c is easily elastically deformed, which allows the shutter opening lever 41 to cope with vertical fluctuation of the disk cartridge 1 held by the cartridge holder 16.

On the side surface plate 16b of the cartridge holder 16 at the shutter opening mechanism 40 side, an erroneous insertion preventing projection portion 26 for preventing the disk cartridge 1 from being erroneously inserted is provided at the rear side relative to the pin supporting pieces 43a, 43b. The erroneous insertion preventing projection portion 26 is formed by expanding a part of the side surface plate 16b inward so that the part should be hemisphere-shaped. The erroneous insertion preventing projection portion 26 corresponds to the guide groove 10 of the disk cartridge 1. Therefore, only when the disk cartridge 1 is inserted with its guide groove 10 corresponding to the erroneous insertion prevention projection portion 26, can the disk cartridge 1 be completely inserted thereinto. When the guide groove 10 does not correspond to the erroneous insertion preventing projection portion 26, the disk cartridge 1 is prevented from being inserted thereinto. Thus, it is possible to determine whether or not the disk cartridge 1 is inserted properly.

As described above, since the operation click 4f of the shutter member 4 is located at the narrow portion 10b of the guide groove 10 of the disk cartridge 1 and the operation click 4f is pressed by the action piece 41c of the shutter opening lever 41, the shutter member 4 is rotated against the spring force of the shutter spring 5 to open both of the head insertion slot 7 and the center core aperture 9.

(3-3) Information Recording and Reproducing Mechanism (FIGS. 1, 6, 12 and 13)

As shown in FIG. 1 and so on, the information recording and reproducing mechanism 50 is disposed at the rear portion of the mechanical chassis 17 and has a dogleg-shaped rotation actuator 51, and a pair of upper and lower sliders 52a, 52b fitted to a tip end portion of the rotation actuator 51 so as to be able to be floated.

The rotation actuator 51 has a rotary arm 55 rotatably supported by the mechanical chassis 17, a drive coil 56 fixed on the rotary arm 55, a pair of mount plates 57a, 57b fixed on the rotary arm 55, a pair of suspensions 58a, 58b respectively fixed on the mount plates 57a, 57b, and so on. The rotary arm 55 of the rotation actuator 51 is rotatably supported on the mechanical chassis 17 by a bearing 59 engaged with and fixed on a horizontal-direction middle portion of the rotary arm 55. The rotary arm 55 has a branch portion 55a formed at one side thereof with and on which the drive coil 56 that a copper wiring is wound around is engaged and fixed.

AS shown in FIG. 9, step portions are provided on upper and lower surfaces of the tip end portion of the rotary arm 55. Base end portions of the mount plates 57a, 57b are engaged with the step portions and then fixed thereon by spot welding or caulking or by a fixing means such as an adhesive or the like, thereby the pair of mount plates 57a, 57b being disposed so as to be opposed to each other at a predetermined interval in the vertical direction. The pair of mount plates 57a, 57b are formed so as to be reversely L-shaped. Base end portions of the suspensions 58a, 58b are fixed on tip end portion inner surfaces of the mount plates 57a, 57b by spot welding or caulking or by a fixing means such as an adhesive or the like. A space formed from a portion between the tip ends of the suspensions 58a, 58b to a portion between bent portions of the mount plates 57a, 57b is made as an open space. Thus, the rotation actuator 51 is formed of the rotary arm 55, the mount plates 57a, 57b, and the suspensions 58a, 58b so as to be L-shaped when it is seen from a position over it, i.e., dogleg-shaped.

Each of the pair of suspensions 58a, 58b is formed of an elastic plate-spring-like member. Each of the pair of suspensions 58a, 58b has an opening 60 at the center of its base end portion and hence has low rigidity, thereby rigidity of the base end portion being set lower. Since the rigidity of the base end portion of each of the suspensions 58a, 58b is set lower to thereby increase flexibility of its tip end side, each of the sliders 52a, 52b attached to the tip end thereof can be inclined so that it can be easily raised and lowered in the vertical direction. As shown in FIG. 10 which is a cross-sectional view, both side edge portions of the respective suspensions 58a, 58b are bent toward the inner surface, thereby ribs $58a_1$, $58a_2$ and $58b_1$, $58b_2$ being formed. Tip end portions of the inner side ribs $58a_1$ and $58b_1$ are cut back. Since the respective inner surface side ribs $58a_1$ and $58b_1$ of the suspensions 58a, 58b are thus cut back, the ribs $58a_1$ and $58b_1$ are prevented from interfering with a ramp arm 92 and moreover the rib $58a_1$ and $58b_1$ are prevented from acting so as to interfere with other parts and portions.

Moreover, hemisphere projections 61a, 61b projected inward are provided at the middle portions of the suspensions, respectively. A ramp described later on is inserted between the projections 61a, 61b of the suspensions 58a, 58b upon the loading and unloading operations. The ramp moves the tip end sides of the suspensions 58a, 58b in the vertical direction so that the tip end sides should be moved away from each other, thereby the upper and lower sliders 52a, 52b being kept out of contact with the upper and lower surfaces of the hard disk HD, respectively. The projections 61a, 61b may be formed by expanding parts of the suspensions 58a, 58b by drawing process so that they should be hemisphere-shaped, or may be projected by outsert molding so as to hemisphere-shaped, or may be formed by other various means.

Figure 12:
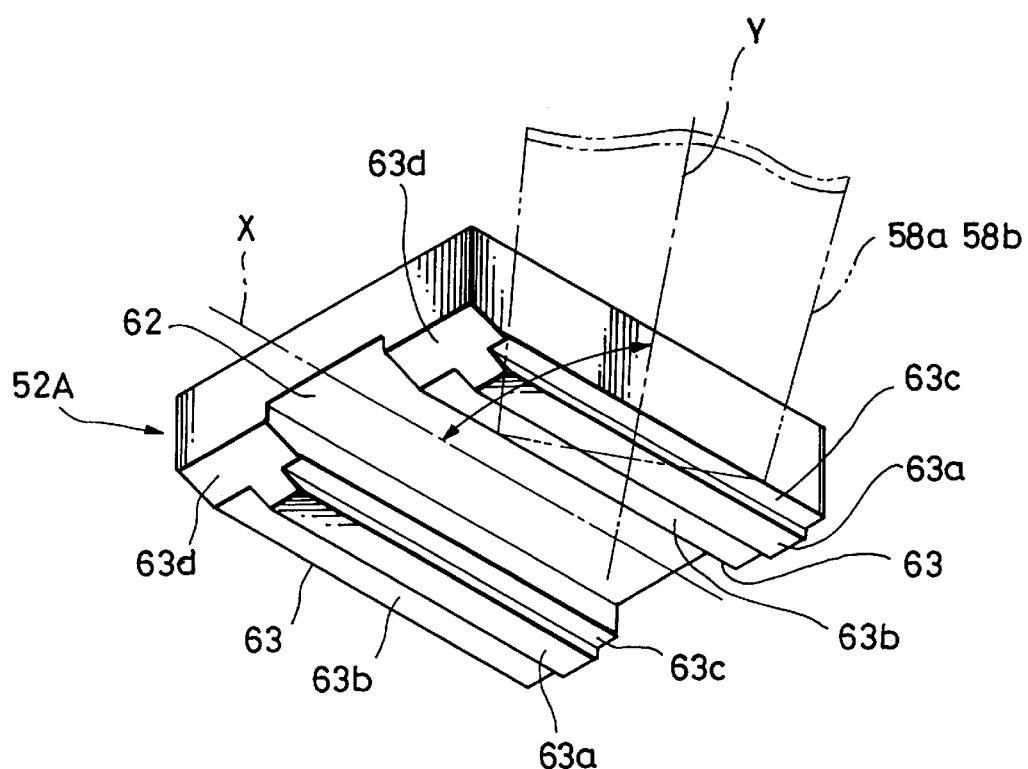
FIG. 12 is a perspective view showing an example of a slider of the information recording and reproducing mechanism of the disk recording and reproducing apparatus shown in FIG. 1.
Figure 13:
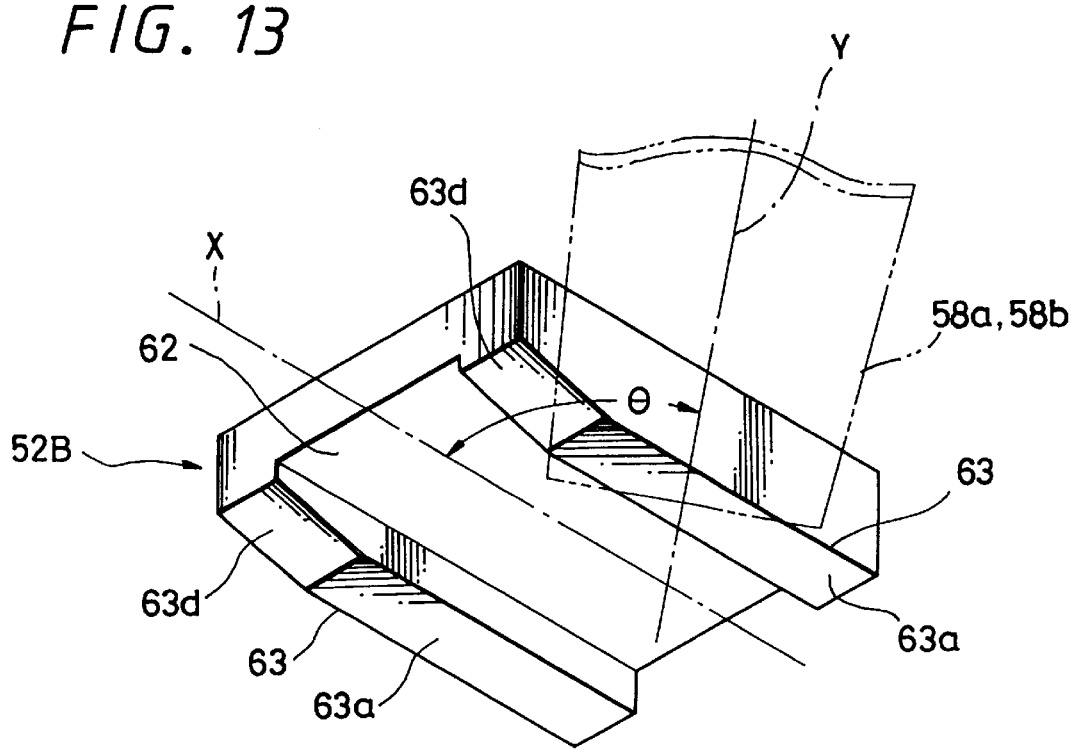
FIG. 13 is a perspective view showing another example of a slider of the information recording and reproducing mechanism of the disk recording and reproducing apparatus shown in FIG. 1.
Figure 14:
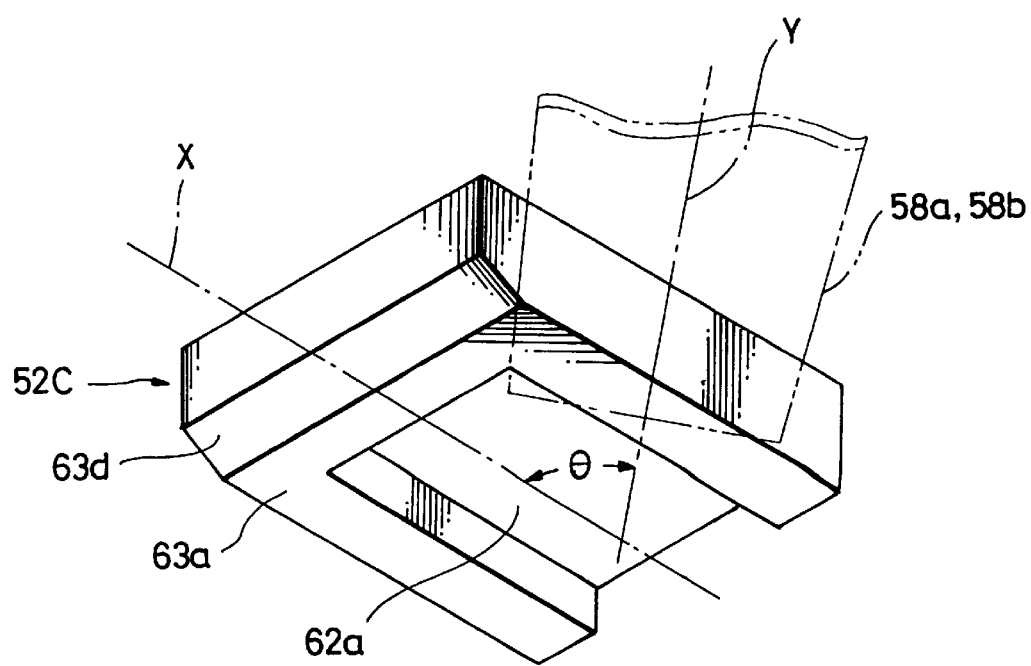
FIG. 14 is a perspective view showing further another example of a slider of the information recording and reproducing mechanism of the disk recording and reproducing apparatus shown in FIG. 1.

Each of the pair of the sliders 52a, 52b can have shapes shown in FIGS. 12 to 14. FIG. 12 shows a transverse pressure contour type slider 52A (hereinafter referred to as "TPC type slider") as an intermediate floating slider. This TPC type slider 52A has an air flowing groove 62 formed at a center of its rear surface of a block-shaped slider body so as to be extended in the forward and backward directions. The TPC type slider 52A has projecting portions 63 positioned at both sides of the air flowing groove 62. Each of the projecting portions 63 positioned on both of the sides of the projecting groove 62 has a disk opposing surface opposed to either of upper and lower surfaces of the hard disk HD, air-flowing-groove step portions 63b, 63c formed on respective sides of the disk opposing surface 63a and extended continuously in the forward and backward directions, and a tapered surface 63d formed on the rotation-direction front side of the projecting portion 63.

According to this TPC type slider 52A, it is possible to make satisfactory a constant flying height performance (hereinafter referred to as CFH performance) which indicates how a parallelism between a surface, opposed to the disk, of a slider floated over the surface of the hard disk HD and a disk surface is fluctuated depending upon a position in the disk radius direction. Moreover, it is possible to obtain less dependency upon velocity and to obtain a substantially flat characteristic regardless of whether the slider is located on an inner or outer side in the radius direction. Therefore, it is possible to stably float the slider over the disk surface.

FIG. 13 shows a catamaran type slider 52B. This catamaran type slider 52B is a basic type of the TPC type slider and has an arrangement in which each of the projecting portions 63 does not have either of the left and right air-flowing-groove step portions 63b, 63d.

Moreover, FIG. 14 shows a negative pressure type slider 52C. The negative pressure type slider 52C has a negative pressure producing grove 62a for producing a negative pressure at a rear surface of the slider, and the slider is floated over the disk surface by a difference pressure between the negative pressure and a positive pressure produced by an air bearing surface (an absolute value of the positive pressure>an absolute value of the negative pressure). The negative pressure type slider 52C has such a shape that a front side of the above air flowing groove as described above is closed, and has a negative pressure producing groove 62a formed as an opening at a portion of the slider body from its rear surface center portion to the rear side. According to the negative pressure type slider 52C, the CFH performance is satisfactory similarly to the TPC type slider 52A. Therefore, it is possible to obtain a flat CFH performance and hence to stably float the slider over the disk surface.

In each of the sliders 52A to 52C, recording and reproducing magnetic heads 8, 8 are provided at the tip end portions of the upper and lower sliders so as to be opposed to each other vertically. Each of the sliders 52A to 52C is formed so that a center line X of an air flowing groove 62 or the negative pressure producing groove 62a and a center line Y of the suspension 58a or 58b cross each other at a predetermined angle θ.

Generally speaking, in a slider, an extended direction of an air flow groove is set in parallel to an extended direction of a suspension. However, an angle θ at which they cross each other is set to about 70° in this embodiment. Since the sliders 52a, 52b are attached to the suspensions 58a, 58b at a crossing angle θ of relative to the extended direction of the suspensions 58a, 58b, it is possible to set bent angles of the sliders 52a, 52b smaller. The above crossing angle θ is not limited to 70° as set in this embodiment and can be set to a proper angle if necessity is caused.

As shown in FIG. 11, concave portions 64a, 64b are provided at a middle portion of the rotary arm 55 by reducing a thickness of the rotary arm 55 from the upper and lower surfaces thereof. The concave portions 64a, 64b serve to reduce a weight of the rotary arm 55. A flexible printed wiring board 65 is disposed on the upper surface of the rotary arm 55 so as to cover an opening of the concave portion 64a. An arm contact portion of the flexible printed wiring board 65 is bonded to the rotary arm 55 by an adhesive and further fixed on a boss portion 55c of the rotary arm 55 by a fixing screw 66.

The purpose of the above arrangement is to increase strength of the rotary arm 55 by fixing the flexible printed wiring board 65 attached at its rear side with a reinforcement plate made of aluminum or the like to thereby increase the rigidity of the rotary arm 55. This flexible printed wiring board 65 is formed by bonding a base plate 65a, which is a backing reinforcement plate made of aluminum or the like, to its one side. Since, in this embodiment, a cross section of the rotary arm 55 attached with the flexible printed wiring plate 65 with the reinforcement plate is formed so as to be box-shaped, the strength of the rotary arm 55 is increased.

Therefore, it is possible to realize both of reduction of the weight of the rotary arm 55 and increase of the strength thereof.

The flexible printed wiring plate 65 is connected to a connector 68 through a flexible cable unit 67. The connector 68 is mounted on a wiring board 35 disposed at the side of the spindle motor 12. The wiring board 35 is fixed on the mechanical chassis 17. Wrings made of conductive materials for electronic circuits are formed by printing on the wiring board 35, and electronic parts such as an amplifier 36 or the like, as shown in FIG. 1, for example, are electrically connected to this wrings for electronic circuits, thereby a control apparatus being arranged.

Figure 6:
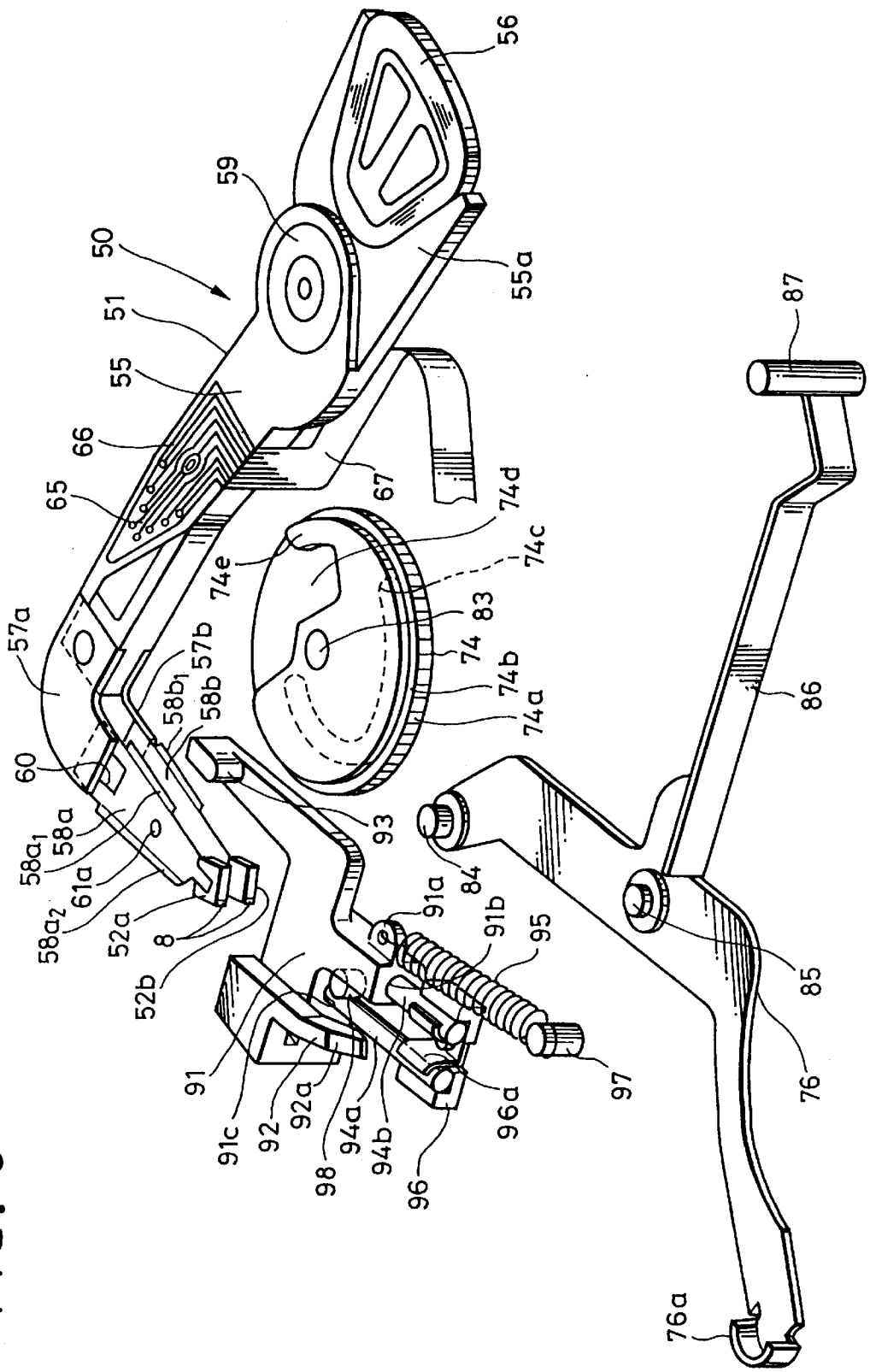
FIG. 6 is an exploded, perspective view showing a main part of an internal structure of the mechanical chassis of the disk recording and reproducing apparatus shown in FIG. 1.
Figure 19:
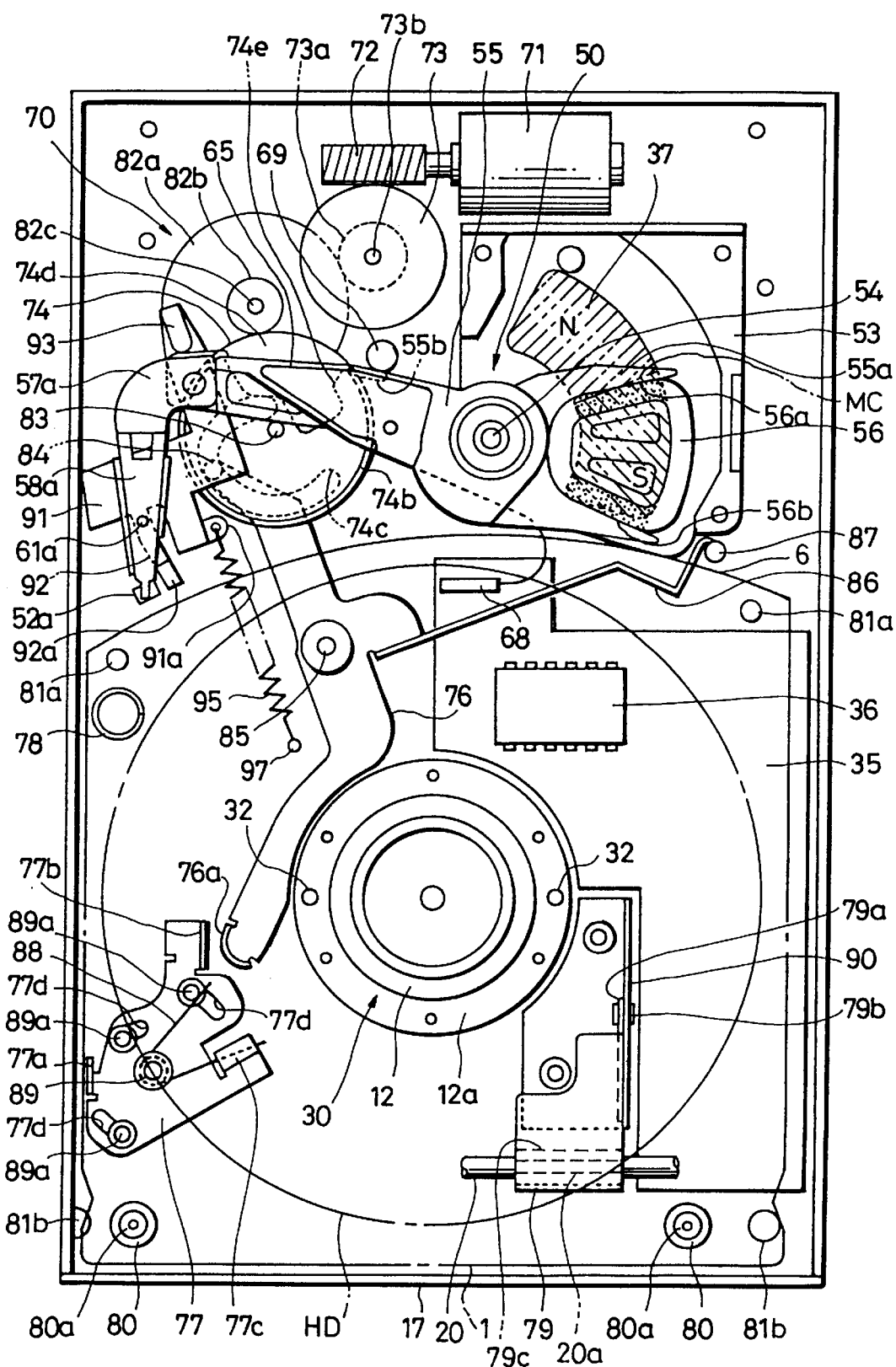
FIG. 19 is a plan view showing a state of the disk recording and reproducing apparatus shown in FIG. 1 before a recording/reproducing head is loaded.

Thus, as shown in FIGS. 6, 19 and so on, the rotation actuator 51 is bent at their mount plates 57a, 57b at an angle of about 90° and hence formed so as to have a shape of reverse L-letter which is so-called doglegged shape. In view of this doglegged shape, the rotation actuator 51 of this embodiment is called a dogleg type.

As shown in FIG. 19, for example, a flat magnet 37 formed so as to be arc-shaped is mounted and fixed on an actuator supporting stand 53 for rotatably supporting the rotation actuator 51 so as to be opposed to a rear surface of the drive coil 56. This magnet 37 has both of N and S poles magnetized in the surface direction (e.g., it is assumed that a pole closer to the spindle motor 12 is the S pole, and a pole further from the spindle motor 12 is the N pole). By adjusting a direction and an amount of a current flowing through the drive coil 56 in a magnetic field produced by the drive coil 56 and the magnet 37, a rotation position of the rotation actuator 51 is automatically controlled within a predetermined area. When the rotation actuator 51 is located out of the automatic control area, a voice coil motor of the rotation actuator 51 does not generate any torque, and the rotary arm 55 is rotated by a cam gear of the disk drive loading mechanism 70 and locked at a predetermined rotation position described subsequently.

While in this embodiment the rotary arm 55 is made of magnesium along and the mount plates 57a, 57b and the suspensions 58a, 58b are formed of stainless steel plates, they may be molded from an engineering plastic such as polycarbonate or the like having a large mechanical strength. Moreover, the rotary arm 55 and the mount plates 57a, 57b can be formed integrally by using the same material.

(3-4) Disk Drive Loading Mechanism (FIGS. 1, 2, and 4 to 11)

Other than the disk drive mechanism 30, the shutter opening mechanism 40 and the information recording and reproducing mechanism 50, the disk recording and reproducing apparatus has a disk loading mechanism 70 for loading and unloading the recording/writing heads onto and from the hard disk HD chucked by the spindle motor 12 of the disk drive mechanism 30. The disk loading mechanism 70 is disposed on the mechanical chassis 17 similarly to the disk drive mechanism 30.

As shown in FIG. 1 and so on, the disk loading mechanism 70 has a drive motor 71, a worm 72, a worm wheel 73, a cam gear 74, a ramp member 75, an eject lever 76, a holder locking member 77, a pop-up spring 78, a pop-up preventing plate 79, a positioning pin 80, a cartridge supporting pin 81a, a holder stopper 81b and so on. The drive motor 71 of the disk loading mechanism 70 is disposed behind the actuator supporting stand 53. The worm 72 is fixed on a rotation shaft of the drive motor 71. A worm wheel 73 rotatably supported by a supporting shaft 73b planted on the mechanical chassis 17 is engaged with the worm 72.

The worm wheel 73 has a load applying gear 73a formed integrally therewith. The load applying gear 73a is engaged with a mid gear 82a. The mid gear 82a has the load transmission gear 82b formed integrally therewith, and both of the mid gear 82a and the load transmission gear 82b are rotatably supported by a supporting shaft 82c planted on the mechanical chassis 17. A gear portion 74a of the cam gear 74 rotatably supported by a cam shaft 83 similarly planted on the mechanical chassis 17 is engaged with the load transmission gear 82b.

The cam gear 74 which is a rotation cam mechanism as an operation mode switching means has a gear portion 74a, a cam periphery surface 74b formed of a circular outer periphery surface formed on one surface side of the gear portion 74a, and a cam groove 74c formed on the other surface side of the gear portion 74a. A cam relief portion 74d is provided by cutting a part of the cam periphery surface 74b up to the inside as shown in FIG. 6. As a result of the fact that the cam relief portion 74d is provided, an arc-shaped cam operation end portion 74e projected in the periphery direction is formed at one end of the cam periphery surface 74b. A cam projection 55b provided on the lower portion of the rotary arm 55 of the rotation actuator 51 so as to be projected downward is in slidable contact or in contact with the cam periphery surface 74b and the cam operation end portion 74e.

The cam gear 74 permits a rotation operation of the rotation actuator 51, an operation of moving a ramp 91 for guiding the magnetic heads 8, 8 onto surfaces of a disk-like recording medium, and an operation of the eject lever 76 for ejecting the disk cartridge 1 to be switched as described later on.

Thus, a state that the cam projection 55b of the rotation actuator 51 is in slidable contact with the cam periphery surface 74b of the cam gear 74 is a state before the loading that the magnetic heads 8 are located out of the disk cartridge 1 (see FIG. 19) and an arm lock state that the whole rotation actuator 51 is located out of the disk cartridge 1 (see FIGS. 24, 25). A state that the cam projection 55b is located within the cam relief portion 74d of the cam gear 74 is a loading completed state (see FIGS. 21, 22) only in the loading completed state, the rotation position of the rotation actuator 51 can be automatically controlled by the voice coil motor formed of the drive coil 56 and the magnet 37. A state that the cam operation end portion 74e of the cam gear 74 is in contact with an inner surface of the cam projection 55b is a state during the loading that the magnetic heads 8, 8 are inserted into the disk cartridge 1 (see FIG. 20) and a state during the unloading that the magnetic heads 8, 8 are ejected from the disk cartridge 1 (see FIG. 23) that the magnetic heads 8, 8 are ejected from the disk cartridge 1.

The cam groove 74c of the cam gear 74 is formed so as to correspond to the cam periphery surface 74b and the cam relief portion 74d. Specifically, the cam groove 74c is used only when the disk cartridge 1 is ejected to the outside of the disk recording and reproducing apparatus. When the disk cartridge 1 is ejected, a locking operation of a holder lock mechanism for locking the cartridge holder 16 to the mechanical chassis 17 side is released, and the disk cartridge 1 is pushed out from the cartridge holder 16 and thereby ejected therefrom.

For this end, the cam groove 74c is formed so as to be extended in the circumference direction at the outer periphery side close to the cam periphery surface 74b, and to be bent inward in the radius direction from a position displaced by about 90° from an end thereof on the side of the cam operation end portion 74e, and to become closest to the cam shaft 83 at a position displaced by about 180° therefrom. A cam pin 84 of the eject lever 76 serving as an eject arm member is slidably engaged with the cam groove 74c.

Figure 7:
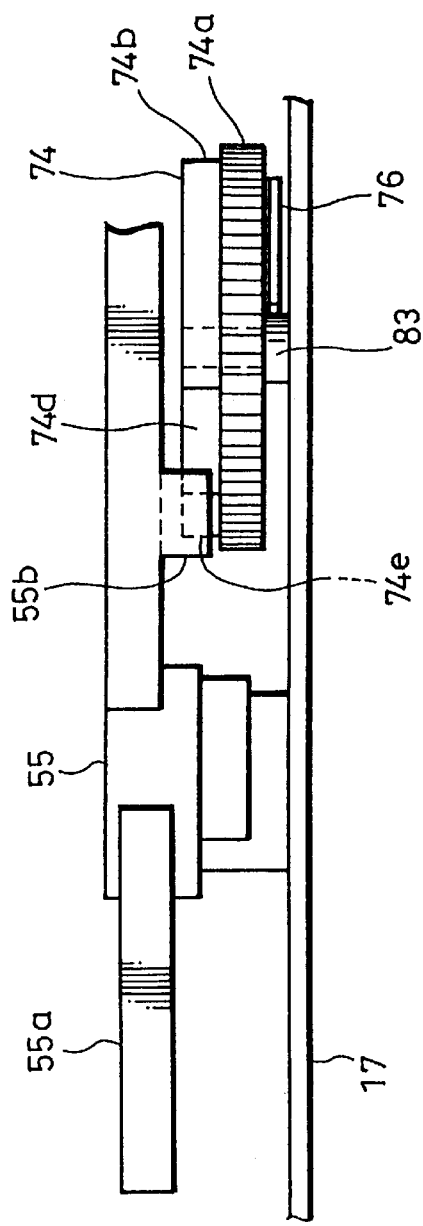
FIG. 7 is a diagram showing a main part of the disk loading mechanism of the disk recording and reproducing apparatus shown in FIG. 1 and used to explain a relationship between a cam gear and a rotary arm.
Figure 8:
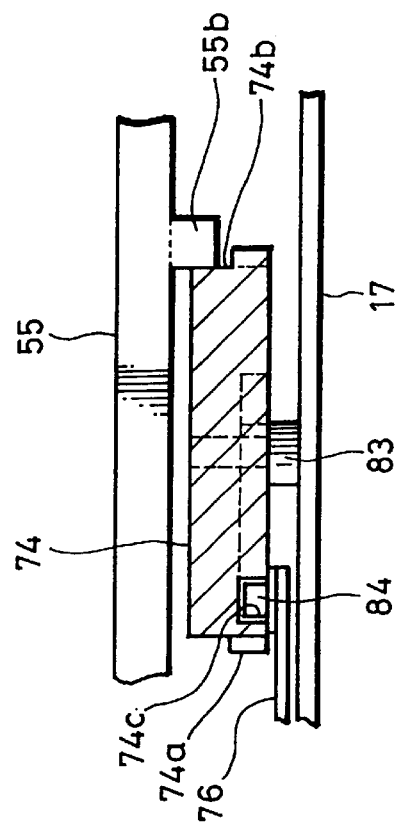
FIG. 8 is a diagram showing a main part of the disk loading mechanism of the disk recording and reproducing apparatus shown in FIG. 1 and used to explain a relationship between a cam gear and a cam pin.

The eject lever 76 is rotatably and pivotally supported at its longitudinal-direction middle portion by a shaft fulcrum shaft 85 planted on the mechanical chassis 17. The cam pin 84 is fitted to one longitudinal-direction end of the eject lever 76 so as to be projected upward, and, as shown in FIGS. 7, 8, the cam pin 84 is engaged with the cam groove 74c of the cam gear 74 so as to be located under the cam groove 74c. Moreover, a pressing portion 76a used for rotating the holder lock member 77 of the holder locking mechanism is provided at the other longitudinal-direction end of the eject lever 76.

Moreover, the eject lever 76 is formed integrally with a base end portion of the eject arm 86 in the vicinity of the fulcrum shaft 85 thereof. The eject arm 86 has a pressing pin 87 formed integrally with its tip end porion. As shown in FIG. 19 and so on, the eject lever 76 having the above arrangement is disposed with being extended backward at its cam pin 84 side and diagonally forward at its pressing portion 76a side and with the eject arm 86 being extended in the direction toward a side.

The holder locking mechanism provided so as to be opposed to the pressing portion 76a of the eject lever 76 has a coil spring 88 used for rotatably biasing the holder lock member 77. While in this embodiment the holder lock member 77 is made of a stainless steel plate, it may be molded from engineering plastic or the like having a large mechanical strength such as polycarbonate or the like.

As shown in FIG. 1 and so on, the holder locking member 77 is rotatably supported by a fulcrum shaft 89 planted on the mechanical chassis 17. The holder locking member 77 has an engagement stopper click 77a provided with its click tip end being faced backward, a pressure applied portion 77b brought in contact with the pressing portion 76a of the eject lever 76, and a coil receiving piece 77c with which one end of the coil spring 88 is engaged. Moreover, the holder locking member 77 has a plurality of arc-shaped grooves 77d, 77d extended in the periphery direction around the fulcrum shaft 89 so as to be arc-shaped, and a plurality of restriction pins 89a, 89a planed on the mechanical chassis 17 being slidably engaged with the respective arc-shaped grooves 77d, 77d.

The other end of the coil spring 88 is engaged with one of these restriction pins 89a, 89a. The holder locking member 77 is biased by a spring force of the coil spring 88 in the direction in which the pressure applied portion 77b is moved close to the pressing portion 76a of the eject lever 76. A rotation amount of the holder locking member 77 is restricted by the restriction pins 89a, 89a engaged with the arc-shaped grooves 77d, 77d so as to be within a predetermined range. The engagement stopper click 77a is engaged with the engagement pin 24 of the cartridge holder 16 in a state that the cartridge holder 16 is inserted into the mechanical chassis 17, thereby the cartridge holder 16 being locked.

Figure 5:
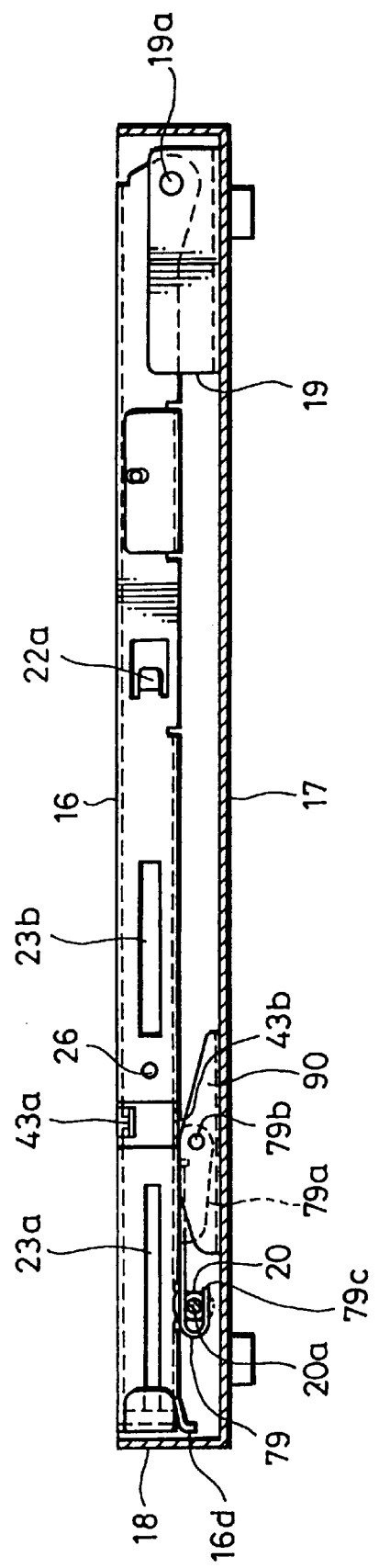
FIG. 5 is a cross-sectional view showing the disk recording and reproducing apparatus according to the embodiment of the present invention in a state that the cartridge holder is accommodated in the mechanical chassis.

The pop-up spring 78 formed of a coil spring serving as a biasing member is disposed below the cartridge holder 16. The pop-up spring 78 is compressed in a state that the cartridge holder 16 is loaded onto the mechanical chassis 17. When the locking operation of the holder locking mechanism is released, the pop-up spring 78 pops up and moves so as to be inclined, and then, as shown in FIGS. 2 and 5, raises the front side of the cartridge holder 16 by its biasing force. A raised amount of the cartridge holder 16 is restricted by a pop-up suppressing plate 79 serving as a member for restricting a pop-up operation. It is needless to say that the present invention is not limited to this embodiment and a spring member such as a plate spring or the like may be employed as the pop-up spring 78. The pup-up spring 78 may be formed of a rubber-like elastic body such as synthetic rubber or the like.

The pop-up suppressing plate 79 has its longitudinal cross section which is J-shaped, and has a bearing piece 79a provided in parallel to the direction of the J-shaped cross section thereof. A shaft pin 79b is fixed on the bearing piece 79a of the pop-up suppressing plate 79. The shaft pin 79b is rotatably supported by a supporting bracket 90. The supporting bracket 90 is fixed on the mechanical chassis 17 by some suitable fixing means such as a fitting screw or the like. Thus, the pop-up suppressing plate 79 is fitted to the mechanical chassis 17 through the supporting bracket 90 so that it can be inclined vertically so as to rise up and to fall down.

As shown in FIGS. 1 through 5, the pop-up suppressing plate 79 has a tip-end side hook portion 79c which is engaged with a small-diameter portion 20a of the above holder reinforcement shaft 20. The pop-up suppressing plate 79 restricts upward inclination (operation of rising upward) of the cartridge holder 16. The present invention is not limited to a means for inclining the cartridge holder 16 according to this embodiment, and a cam mechanism or other means can be applied to the means for inclining the cartridge holder 16. For example, it may be employed an arrangement in which a cylindrical cam having a cam groove spirally extended is rotatably provided on the mechanical chassis 17, a cam pin slidably engaged with the cam groove is provided on the cartridge holder, and the cam pin is lifted up and down by rotation of the cylindrical cam, thereby the cartridge holder being inclined.

A ramp 91 used for temporarily spreading an interval between the pair of sliders 52a, 52b is disposed in the vicinity of the tip end portion of the above rotation actuator 51 on the rear side of the mechanical chassis 17. The ramp 91 has a ramp arm 92 inserted between the pair of sliders 52a, 52b, a pressing porion 93 for pressing a rear surface side of the rotary arm 55 to thereby move the pair of sliders 52a, 52b toward the disk cartridge 1, and so on. A synthetic resin material such as polyacetal (POM) or the like is suitable for a material for the ramp 91, but other synthetic resin materials may be employed.

The ramp 91 has insertion apertures 91b, 91c bored therethrough in parallel to each other. Straight guide shafts 94a, 94b are slidably inserted into the insertion apertures 91c, 91b, respectively. Front and rear end potions of each of this pair of straight guide shafts 94a, 94b are gripped by respective paris of a bearing block 96 and a shaft pressing piece 96a from the vertical direction, thereby the straight guide shafts 94a, 94b being fixed on the mechanical chassis 17 and their both ends being supported. The ramp arm 92 is disposed above middle portions of the straight guide shafts 94a, 94b.

The ramp arm 92 is set on movement loci of the projections 61a, 61b respectively provided on the upper and lower suspensions 58a, 58b of the rotation actuator 51, and the pair of upper and lower sliders 52a, 52b are moved outside of the ramp arm 92. As shown in FIG. 9, inclined surfaces 92a are provided on the upper and lower surfaces at the tip end portion of the ramp arm 92 so that the projections 61a, 61b can be easily landed on the ramp arm 92, respectively.

One end of a coil spring 95 for biasing the ramp 91 toward the spindle motor 12 is engaged with and stopped at a spring engagement stopper piece 91a provided on the ramp 91, and the other end thereof is engaged with a receiving pin 97 fixed on the mechanical chassis 17. A forward movement of the ramp arm 91 by the coil spring 95 resulting from its spring compression force is restricted by a stopper pin 98 fixed on the mechanical chassis 17 between the pair of straight guide shafts 94a, 94b. As shown in FIG. 1 and so on, a movement amount of the rotation actuator 51 in the direction in which it is moved away from the spindle motor 12 is restricted by a stopper shaft 69 disposed on the rear surface side of the rotation actuator 51 and fixed on the mechanical chassis 17.

Moreover, a pair of the positioning pins 80, 80 and a pair of the holder stoppers 81a, 81b are provided at both side portions of the front portion of the mechanical chassis 17. A pair of cartridge supporting pins 81a, 81a are provided at both side portions of a middle portion thereof. The positioning pins 80, 80 and the cartridge supporting pins 81a, 81a position and support the disk cartridge 1 at a predetermined position. The two supporting pins 81a, 81a support both side portions of the head insertion slot 7 side of the disk casing 2 from thereunder, and the two positioning pins 80, 80 are engaged with the positioning pins 14a, 14b of the disk cartridge 1, thereby the disk cartridge 1 being positioned in the horizontal direction and in the vertical direction. The two holder stoppers 81b, 81b are excess-insertion preventing members for preventing the cartridge holder 16 from being excessively inserted into the mechanical chassis 17 by a predetermined length at a state in which the disk cartridge 1 is not inserted into the cartridge holder 16.

The disk drive mechanism 30, the shutter opening mechanism 40, the information recording and reproducing mechanism 50 and the disk loading mechanism 70, which are arranged as described above, are integrally formed. Specifically, as shown in FIG. 2, the cartridge holder 16 is inserted into and engaged with the mechanical chassis 17, and the left and right supporting brackets 19, 19 for rotatably supporting the rear end portion of the cartridge holder 16 are screwed at predetermined positions. Thus, the cartridge holder 16 is supported by the mechanical chassis 17 so that it can be inclined in the vertical direction relative to the mechanical chassis 17, and the cartridge holding portion of the cartridge holder 16 corresponds to a position above the spindle motor 12 fixed on the mechanical chassis 17.

As described above, the disk recording and reproducing apparatus according to this embodiment is arranged.

[4] Operation of Disk Loading Apparatus

An operation of the disk recording and reproducing apparatus thus arranged as described above will be described.

(4-1) Initial State of Insertion of Disk Cartridge

Figure 4:
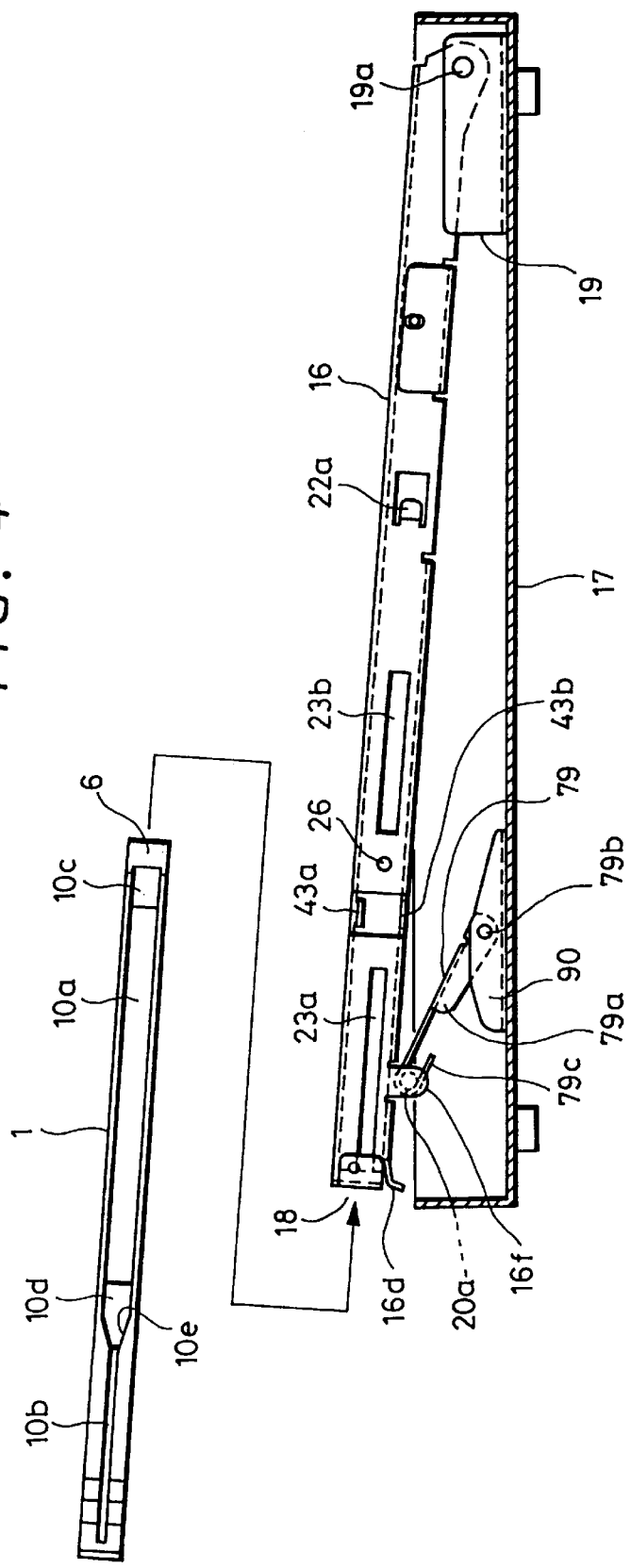
FIG. 4 is a cross-sectional view of the popped cartridge holder of the disk recording and reproducing apparatus according to the embodiment of the present invention.

As shown in FIGS. 2, 4, in a state that the front portion of the cartridge holder 16 is raised upward and pops up, the cartridge insertion slot 18 is opened and then the disk cartridge 1 can be inserted thereinto.

As shown in FIG. 16, from this state, the disk cartridge 1 is pushed and inserted into the cartridge insertion slot 18 with its offset arc portion 6 being faced to the cartridge insertion slot 18. At this time, the tip end portion of the load applied piece 41b of the shutter opening lever 41 of the shutter opening mechanism 40 provided at the side surface portion of the cartridge holder 16 is considerably inserted into the opening portion 23b by the spring force of the coil spring 42, and as a result of the action of the load applied piece 41b, the action piece 41c thereof is slightly inserted into the opening portion 23a. The contact portion 41d provided at the tip end of the load applied piece 41b of the shutter opening lever 41 is located ahead of the movement locus of the guide groove 10 provided at the side surface portion of the cartridge holder 16.

At this time, if an operator erroneously inserts the disk cartridge 1 with turning it upside down, since the erroneous insertion preventing projection 26 is projected inward in the vicinity of the pin supporting pieces 43a, 43b for swingingly supporting the shutter opening lever 41 on the side surface plate 16b on the shutter opening mechanism 40 side of the cartridge holder 16, the erroneous insertion preventing projection 26 is brought in contact with a corner portion on the side of the side surface 2d side, where no guide groove 10 is provided, of the offset arc portion 6 of the cartridge casing 2. As a result, the erroneous insertion preventing projection 26 prevents the disk cartridge 1 from being further inserted. Therefore, at the middle of the insertion operation, the operator can recognize that the disk cartridge 1 is being erroneously inserted.

If the disk cartridge 1 is erroneously inserted, the disk cartridge 1 is withdrawn from the disk recording and reproducing apparatus and inserted again thereinto after being turned upside down. If the disk cartridge 1 is inserted with its upper and lower surfaces being correctly positioned, then the offset arc portion 6 reaches the position of the erroneous insertion preventing projection 26 and then the erroneous insertion preventing projection 26 is brought into the guide groove 10 of the cartridge casing 2. Hence, the disk cartridge 1 can be further inserted.

(4-2) State of Disk Cartridge Before Shutter is Opened

A shown in FIG. 17, when the disk cartridge 1 is pushed and inserted deeply, the contact portion 41d of the shutter opening lever 41 largely inserted into the cartridge holder 16 is brought in contact with the introduction portion 10c of the guide groove 10. Then, the shutter opening lever 41 is pressed by an inclined surface of the introduction portion 10c and then rotated against the biasing force of the coil spring 42 in the clock direction in FIG. 17. Thus, the contact portion 41d of the shutter opening lever 41 is moved back into the wide portion 10a of the guide groove 10, and the action piece 41c of the shutter opening lever 41 is moved into the operation portion 10d of the guide groove 10. The action piece 41c is guided by the upper or lower inclined surface 10e and introduced to the narrow portion 10b. Then, the action piece 41c is moved further inward and then brought in contact with the operation click 4f of the shutter member 4 positioned on the front side of the narrow portionb.

(4-3) State of Disk Cartridge After Shutter is Opened

Figure 18:
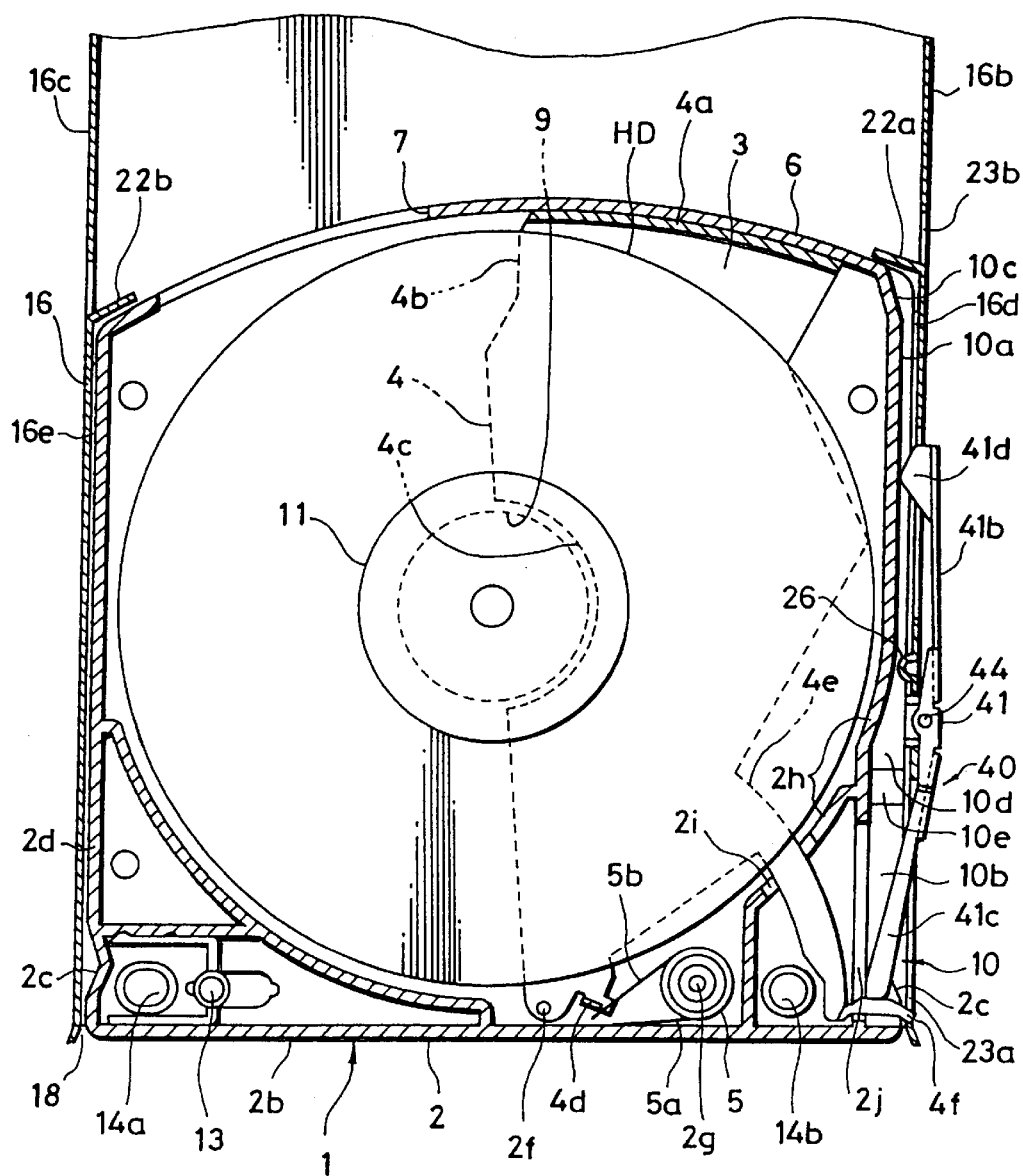
FIG. 18 is a plan view showing a state of the disk cartridge of the disk recording and reproducing apparatus shown in FIG. 1 after the shutter is opened.

Moreover, as shown in FIG. 18, when the disk cartridge 1 is further pushed to a predetermined position, the movement of the disk cartridge 1 is restricted by the left and right stopper pieces 22a, 22b of the cartridge holder 16, and the hard disk HD accommodated in the disk accommodation chamber 3 is brought to a position above the spindle motor 12 of the disk drive mechanism 30 and opposed thereto.

At this time, when the operation click 4f of the shutter member 4 is pushed by the action piece 41c of the shutter opening lever 41 of the shutter opening mechanism 40 and then moved to the rear end portion of the narrow portion 10b of the guide groove 10, the shutter member 4 is rotated around the fulcrum shaft 2f in the clockwise direction in FIG. 18. In accordance with the rotation of the shutter member 4, the shutter plate 4a and the core opening and closing plate 4b of the shutter member 4 are also moved in the same direction, thereby the head insertion slot 7 which has been closed by the shutter plate 4a and the center core aperture 9 which has been closed by the core opening and closing plate 4b being opened. Then, the operation of inserting the disk cartridge 1 into the cartridge holder 16 is finished.

(4-4) Initial State of Operation of Loading Hard Disk Drive

The front portion of the cartridge holder 16 kept in a state that the front portion thereof is projected from the mechanical chassis as shown in FIGS. 2 and 4 is pushed against the biasing force of the pop-up spring 78. This pushing operation permits the cartridge holder 16 to be inserted into the mechanical chassis 16, the two positioning pins 80, 80 of the mechanical chassis 17 to be guided to and inserted into the pair of left and right positioning apertures 14a, 14b of the disk cartridge 1 and permits the disk cartridge 1 to be mounted on the two cartridge supporting pin 81a.

As a result, the front side portion of the disk cartridge 1 is supported by the two cartridge supporting pins 81a, 81a and the rear side portion thereof is supported by the two positioning pins 80, 80, i.e., four corners thereof are supported from thereunder. Thus, the disk cartridge 1 is simultaneously positioned in the height direction and the horizontal direction.

At this time, the center core 11 of the hard disk HD accommodated in the disk cartridge 1 is attracted by the magnet of the spindle motor 12. As a result, the hard disk HD is attracted by the spindle motor 12, thereby the hard disk HD and the spindle motor 12 being rotatable integrally. If the spindle motor 12 is driven, the hard disk HD is rotated together with the spindle motor 12.

As shown in FIG. 19, after the cartridge holder 16 is pushed into the mechanical chassis 17, an operation switch provided so as to be operated in the interlocking relation with the above pushing operation is operated or an operation start switch manually operated is operated, thereby the drive motor 71 being rotated. When the rotation of the drive motor 71 is started, a rotation force of the worm 72 fixed on the rotation shaft thereof is transmitted from the worm wheel 73 engaged with the drive motor 71 through the load applied gear 73a, the mid gear 82a and the load transmission gear 82b to the gear portion 74a and further to the cam gear 74.

At this time, the whole part of the rotation actuator 51 of the information recording and reproducing mechanism 50 is located outside of the disk cartridge 1 by the operation of the cam gear 74. The upper and lower sliders 52a, 52b fitted to the tip end portion of the rotation actuator 51 bent at the portion of the mount plates 57a, 57b so as to be dogleg-shaped are located outside of the head insertion slot 7 opened by the opening operation of the shutter plate 4a.

Specifically, since the outer end of the cam projection 55b provided at the rotary arm 55 of the rotation actuator 51 is in contact with the cam periphery surface 74b of the cam gear 74, and the stopper shaft 69 is positioned at the outside of the rotary arm 55, the rotation actuator 51 is gripped by the cam projection 55b and the stopper shaft 69, thereby being locked. Since the ramp 91 is pulled toward the spindle motor 12 side by the spring force of the coil spring 91 and its ramp arm 92 is located between the upper and lower suspensions 58a, 58b, as shown in FIG. 9, the projections 61a, 61b of the suspensions 58a, 58b brings the sliders 52a, 52b away from each other. Moreover, the ramp 91 is in contact with the stopper pin 98, thereby the movement thereof toward the front surface side being prevented.

Moreover, the cam pin 84 engaged with the cam groove 74c of the cam gear 74 is positioned at the outermost periphery portion of the cam groove 74c. Therefore, the eject lever 76 having the cam pin 84 at the tip end of the arm is located as shown in FIG. 19, and the pressing portion 76a provided the other tip end thereof is kept away from the pressure receiving portion 77b of the holder locking member 77 of the holder locking mechanism. The cartridge pressing pin 87 provided at the tip end of the eject arm 86 formed integrally with the eject lever 76 is positioned outside of and at the back of the disk cartridge 1.

(4-5) State During Operation of Loading Hard Disk Drive

Figure 20:
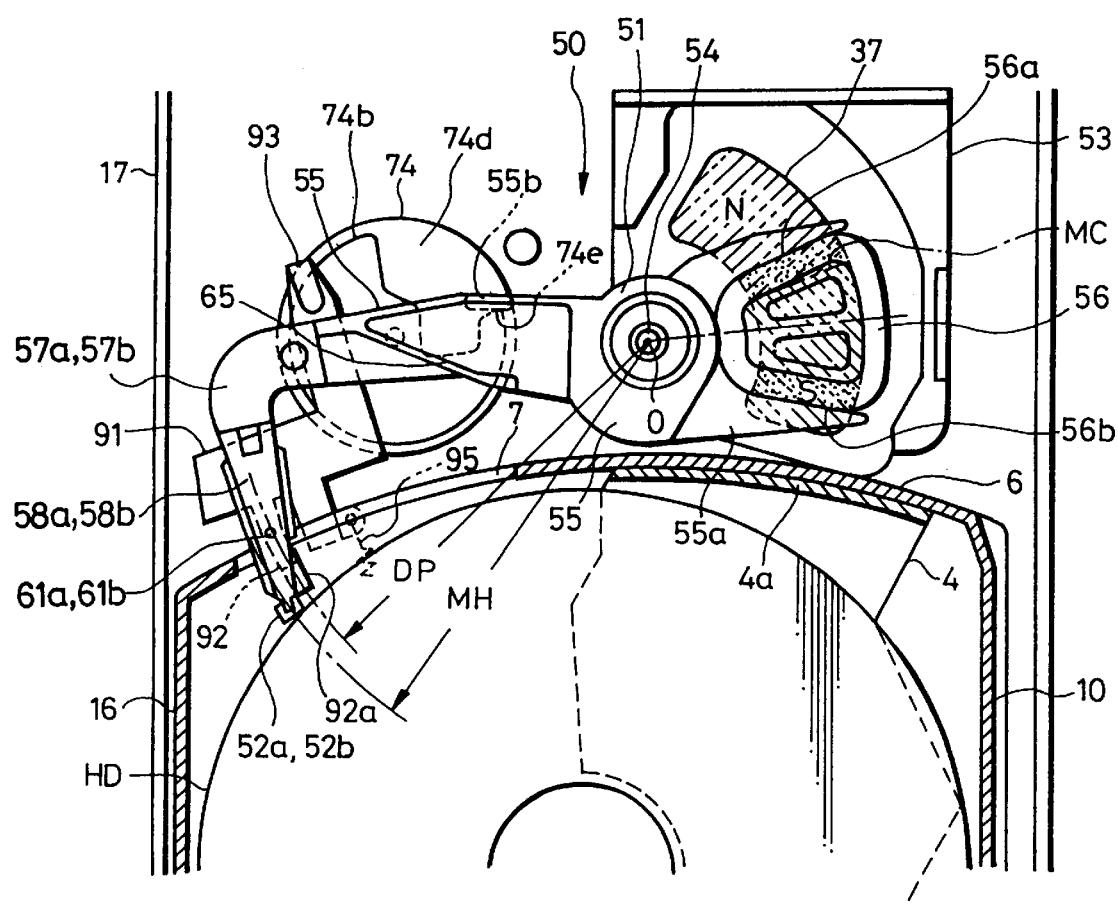
FIG. 20 is an explanatory, cross-sectional view showing a main part of the disk recording and reproducing apparatus shown in FIG. 1 while a recording/reproducing head is being loaded.

As shown in FIG. 20, when the cam gear 74 is slightly rotated in the clockwise direction by the driving of the drive motor 71, the rotation actuator 51 is constantly applied with the spring force of the coil spring 95 from the pressing portion 93 of the ramp 91 and hence this spring force of the coil spring 95 applies the counterclockwise biasing force to the rotation actuator 51. As a result, the cam projection 55b of the rotary arm 55 is slid along the cam operation end portion 74e provided at one end of the cam periphery surface 74b of the cam gear 74 and moved into the cam relief portion 74d, thereby the rotation actuator 51 being rotated counter-clockwise.

As a result, the upper and lower suspensions 58a, 58b provided at the rotation side tip end portion of the dogleg type rotation actuator 51 are brought into the head insertion slot 7 of the disk cartridge 1, and the upper and lower sliders 52a, 52b fitted to the tip end portion thereof are brought close to the outer periphery portion of the hard disk HD. At this time, since the cam pin 84 of the eject lever 76 is still positioned at the outermost periphery portion of the cam groove 74c of the cam gear 74, the eject lever 76 and the eject arm 86 are still kept at the same position and posture.

In this case, assuming that a length from a rotation center O of the rotary arm 55 to a center portion of the sliders 52a, 52b (hereinafter referred to as "slider rotation radius") is SR and a length from the rotation center O of the rotary arm 55 to a center portion of the projections 61a, 61b of the respective suspensions 58a, 58b (hereinafter referred to as "projection rotation radius") is PR, the slider rotation radius SR is set larger than the projection rotation radius PR so that the sliders 52a, 52b should be prevented from being brought in contact with the ramp arm 92 (SR>PR). Therefore, since the sliders 52a, 52b are prevented from interfering with the ramp arm 92 in the rotation range of the rotation actuator 51, it is possible to prevent the sliders 52a, 52b from being broken because of their contact with the ramp 91. Moreover, since the cut-back portions are provided at the upper and lower suspensions 58a, 58b by notching parts of the innerside ribs $58a_1$, $58b_1$, it is possible to reinforce the strengths of the respective suspensions 58a, 58b by forming the ribs to thereby set them proper without consideration of the ribs $58a_1$, $58a_2$ and $58b_1$, $58b_2$.

(4-6) State of Completion of Operation of Loading Hard Disk Drive

Figure 21:
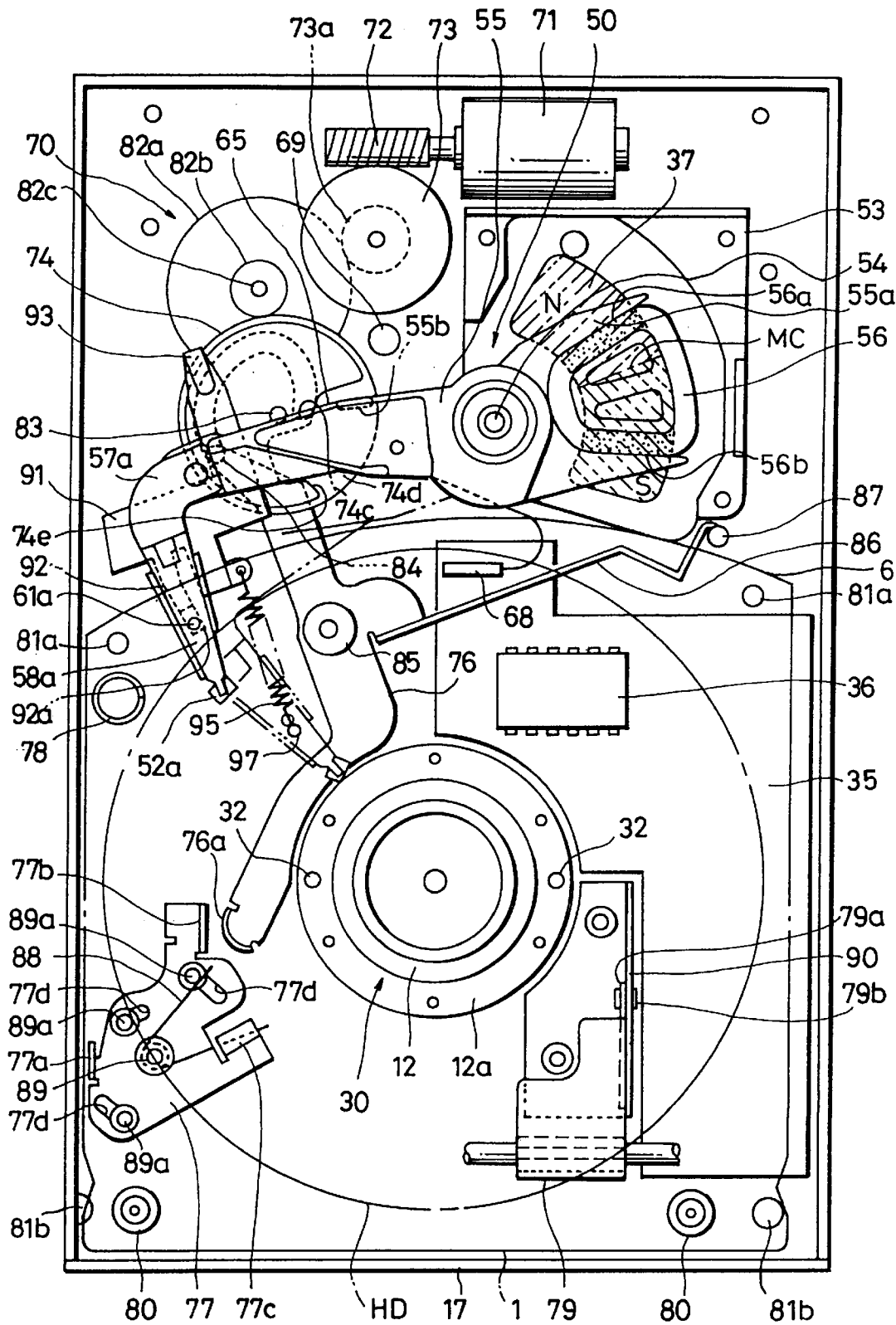
FIG. 21 is a plan view showing the disk recording and reproducing apparatus shown in FIG. 1 in a state that an operation of loading the recording/reproducing head is completed.

As shown in FIGS. 21, 22, when the cam projection 55b of the rotary arm 55 is completely brought into the cam relief portion 74d of the cam gear 74 by rotation of the cam gear 74, the operation of the cam gear 74 to control the rotation of the rotation actuator 51 is released, but the automatic control of the rotation actuator 51 carried out by the voice coil motor formed of the drive coil 56 and the magnet 37 is started. As a result, the operation of loading the magnetic heads 8, 8 onto the hard disk HD is completed, and hence the upper and lower sliders 52a, 52b are brought so as to be opposed to the upper and lower surfaces of the hard disk HD, respectively.

As a result, the upper and lower sliders 52a, 52b are slightly floated from the surfaces of the hard disk HD dues to the aerodynamic effects resulting from the rotation of the hard disk HD. In a state that the sliders 52a, 52b are floated, the sliders 52a, 52b can be moved in the radius direction of the hard disk HD. Therefore, the magnetic heads 8, 8 provided on the respective sliders 52a, 52b are moved on the information recording surfaces of the hard disk HD and the magnetic heads 8, 8 permit the information signal previously recorded on the information recording surfaces to be read out for reproduction thereof or permit the information signal to be newly written in the information recording surfaces for the recording.

In this case, since the rotation actuator 51 according to this embodiment is dogleg-shaped and the suspensions 58a, 58b and the mount plates 57a, 57b at the tip end side thereof are inserted into and drawn from the head insertion slot 7 of the disk cartridge 1 in the direction substantially perpendicular to the head insertion slot 7, it is possible to minimize the width of the head insertion slot 7. Therefore, it is possible to reliably prevent intrusion of dusts thereinto or to effectively suppress the intrusion by minimizing the width of the head insertion slot 7 where the dusts to enter the disk cartridge 1 most easily enter. Since the disk cartridge 1 has the offset arc portion 6 at its tip end side, it is possible to effectively utilize a space in the mechanical chassis 17 as compared with use of a rectangular disk cartridge.

(4-7) State of Operation of Unloading Hard Disk Drive (when disk cartridge is ejected)

When a command to eject the disk cartridge 1 is issued to the control apparatus by operating an eject button (not shown) upon completion of the operation of recording or reproducing informations or upon the recording or the reproduction, the tip end side of the rotary arm 55 is moved toward the outer periphery of the hard disk HD under the speed control of the voice coil motor of rotation actuator 51, and, as shown in FIGS. 9 and 23, the suspensions 58a, 58b are landed on the ramp arm 92, thereby being unloaded. Thereafter, the drive motor 71 is rotated reversely, thereby the cam gear 74 starting being rotated in the direction reverse to that employed upon the disk loading operation.

As a result, as shown in FIG. 24, when the cam gear 74 is rotated in the counterclockwise direction, the cam operation end portion 74c of the cam gear 74 is brought in contact with the cam projection 55 of the rotary arm 55 in the counterclockwise direction, thereby the rotation actuator 51 being rotated around the rotation shaft 54 in the counterclockwise direction. As a result, since the cam projection 55b is slidably brought onto the cam periphery surface 74b of the cam gear 74, the rotation actuator 51 is positionally changed to its initial posture shown in FIG. 24 (which is the same position as shown in FIG. 19). Simultaneously, the counterclockwise rotation of the rotation actuator 51 presses the pressing portion 93 of the ramp 91 toward rear surface side, and hence the ramp 91 is moved back toward the rear surface side against the biasing force of the coil spring 95, thereby the rotation actuator 51 being locked in its unloading state.

In this case, assuming that a length from the rotation center O of the rotary arm 55 to the tip ends of the sliders 52a, 52b (hereinafter referred to as "arm length") is SL and a length from the rotation center O of the rotary arm 55 to a contact portion between the cam operation end portion 74e and the cam projection 55b (hereinafter referred to as "pressing length") is PL, the pressing length PL from the rotation center o of the rotary arm to an operation position of the cam operation end portion 74e for pressing the cam projection 55b when the rotary arm 55 is moved backward and the sliders 52a, 52b are positioned at their retraction positions is longer than one-thirds of the arm length SL. Therefore, it is possible to press the rotary arm 55 at its position away from the rotation center O by a distance larger than one-thirds of the arm length SL to thereby rotate the rotary arm 55. Consequently, it is possible to accurately control the rotation of the rotary arm 55 by setting an enlargement ratio of a displacement amount of the rotary arm 55 displaced by the cam gear 74. A conventional disk storage apparatus of this kind has a pressing length which is ⅕ to ¹⁄₁₀ as long as its arm length, and hence a fine displacement of the cam side largely displaces the arm side. As a result, it is difficult to control the rotation of the rotary arm with a satisfactory accuracy.

The voice coil motor for controlling the rotation of the rotary arm 55 as described above produces a torque at positions, which are located above the magnet 37, of the drive coil 56, i.e., at left and right side edge portions 56a, 56b of the dive coil 56. As shown in FIG. 21, when the side edge portions 56a, 56b of the drive coil 56 are located at inner sides relative to the N and S poles of the magnet 37, respectively, a large torque is produced thereat, while when either of the side edge portions 56a, 56b is located over the center line MC (a magnetization boundary line between the N and S poles), the torque is drastically lowered, which gives harmful influence to performance of the rotation control.

According to this embodiment, as shown in FIG. 23, when the sliders 52a, 52b are located at the outer periphery portion of the hard disk HD, neither of the side edge portions 56a, 56b of the drive coil 56 is located over the center line MC of the magnet 37, and hence the torque produced at the side edge portions 56a, 56b can be reliably transmitted, which enables the rotary arm 55 to be rotated by only a predetermined amount. As shown in FIG. 22, when the sliders 52a, 52b are moved without crossing over the center line MC of the magnet 37 and then reach the innermost periphery portion of the hard disk HD, neither of the side edge portions 56a, 56b of the drive coil 56 is located over the center line MC of the magnet 37, which can prevent the torque from being lowered. Therefore, according to the rotation actuator 51, it is possible to control the rotation of the rotary arm 55 with a satisfactory accuracy without the torque being lowered in the whole area where the automatic control by the voice coil motor is required.

At this time, the rotation actuator 51 is returned to a state shown in FIG. 19 through a state shown in FIG. 20 or brought into a state shown in FIG. 23 through a state shown in FIG. 22, in either of the above cases, the one side edge portion 56a of the drive coil 56 is located over the center line MC and consequently the torque is lowered. In a state that the one side edge portion 56a is moved beyond the center line MC to a magnetic-pole where the other side edge portion 56b is located as shown in FIG. 25 and hence the rotary arm 55 and the ramp 91 are brought in their completely retracted states, the voice coil motor produces no torque. However, since the cam of the cam gear 74 moves the rotary arm 55 to the position shown in FIG. 25, this movement of the rotary arm 55 is prevented from receiving any influence from the lowering of the torque.

When the rotary arm 55 is retracted, the ramp 91 is retracted in accordance with the retraction of the rotary arm 55 and then the ramp arm 92 is ejected from the head insertion slot 7. In this case, since the two straight guide shafts 94a, 94b supported by the mechanical chassis 17 in parallel to each other are slidably inserted through the insertion apertures 91b, 91c of the ramp 91, the ramp 91 is retracted straight with being guided by the straight guide shafts 94a, 94b. When the ramp 91 is retracted, it may be moved with its locus being arc-shaped, by employing curved shafts as the two guide shafts.

Since the cam pin 84 of the eject lever 76 is moved from the outermost periphery portion of the cam groove 74c of the cam gear 74 to the innermost periphery portion thereof, the eject lever 76 is rotated clockwise around the fulcrum shaft 85. In accordance with this rotation, at one side of the eject lever 76, the pressing portion 76a thereof is brought in contact with the pressing receiving portion 77b of the holder locking member 77 of the holder locking mechanism and then rotates the holder locking member 77 counterclockwise against the spring force of the coil spring 88.

In accordance with the rotation, the engagement stopper click 77a of the holder locking member 77 is released from the engagement pin 24 of the cartridge holder 16, and then the lock state that the cartridge holder 16 is held horizontally relative to the mechanical chassis 17 is released. As a result, the front side of the cartridge holder 16 is lifted up by the spring force of the pop-up spring 78, but the lift-up amount of the cartridge holder 16 is restricted by the pop-up suppressing plate 79 whose hook portion 79c is engaged with the small diameter portion 20a of the holder reinforcement shaft 20 stretched at the cartridge holder 16. As shown in FIGS. 2 and 4, consequently, the pop-up operation of an amount exceeding the predetermined amount is prevented and then the cartridge holder 16 is brought in its original state. It is possible to optionally set an amount by which the cartridge holder 16 is inclined, by properly changing the length of the hook portion 79c of the pop-up suppressing plate 79.

Simultaneously with the above operation of the eject lever 76, the eject arm 86 is rotated in the same direction in an interlocking operation with the eject lever 76, thereby the cartridge pressing pin 87 provided at the tip end of the eject arm 86 is brought in contact with the offset arc portion 6 from its near side. The disk cartridge 1 biased by the pair of left and right pressing plate springs 25, 25 toward the supporting plates 16d, 16e of the cartridge holder 16 is pushed toward the front side by the pressing force of the eject arm 86. As shown in FIG. 25, this pressing operation of the eject arm 86 protrudes the grip groove portion 2h side of the disk cartridge 1 from the cartridge insertion slot 18 by a predetermined amount. Therefore, since the user grips the grip groove portion 2h and draws it from the cartridge insertion slot 18, the disk cartridge 1 can be easily be drawn from the cartridge holder 16.

At this time, if this disk cartridge ejecting operation is disabled because of a trouble of the apparatus or if the user interferes with this disk cartridge ejecting operation by pressing the disk cartridge with the hand, although a large resistance force is applied to the eject arm 86 pushing out the disk cartridge 1, the eject arm 86 is formed a plate-like spring member and hence its elasticity absorbs the above resistance force used to interfere with the disk cartridge ejecting operation. Therefore, it is possible to prevent a trouble of the disk recording and reproducing apparatus resulting from an unnatural ejecting operation of the disk cartridge 1 and hence to secure a smooth ejecting operation. Moreover, since the pop-up operation of the cartridge holder 16 and the ejecting operation of the disk cartridge 1 are carried out by the one ejecting member integrally formed of the eject lever 76 and the eject arm 86, it is possible to easily and reliably carry out this kind of operations and hence to improve the reliability of the operations.

A disk recording and reproducing apparatus according to a second embodiment as the disk storage apparatus according to the present invention will be described with reference to FIGS. 26 to 32. In the second embodiment, the present invention is applied to a disk recording and reproducing apparatus employing an elevator system in which a disk cartridge is inserted in accordance with a slot-in system and a cartridge holder for holding the inserted disk cartridge is lifted up and down, thereby the disk cartridge being loaded.

A disk recording and reproducing apparatus 200 according to the second embodiment has a disk drive mechanism 30, a shutter opening mechanism 40, an information recording and reproducing mechanism 50 and a disk cartridge loading mechanism similarly to that of the first embodiment. Since the disk drive mechanism 30, a shutter opening mechanism 40, and an information recording and reproducing mechanism 50 are similar to those of the disk recording and reproducing apparatus according to the first embodiment, main parts of these mechanisms 30, 40 and 50 are marked with the same reference numerals and hence the disk cartridge loading mechanism 201 will be described in detail.

As shown in FIGS. 27 to 32, the disk cartridge loading mechanism 201 of the disk recording and reproducing apparatus 200 has a cartridge holder 203 supported by a mechanical chassis 202 so as to be able to be being lifted up and down vertically, a sliding member 204 supported so as to be relatively movable in the forward and backward directions and in the upward and downward directions relative to the cartridge holder 203, a holder locking member 205 for locking the cartridge holder 203 upon the loading operation, and so on. The sliding member 204 is arranged so as to be movable straight in the forward and backward directions relative to the mechanical chassis 202.

Figure 26:
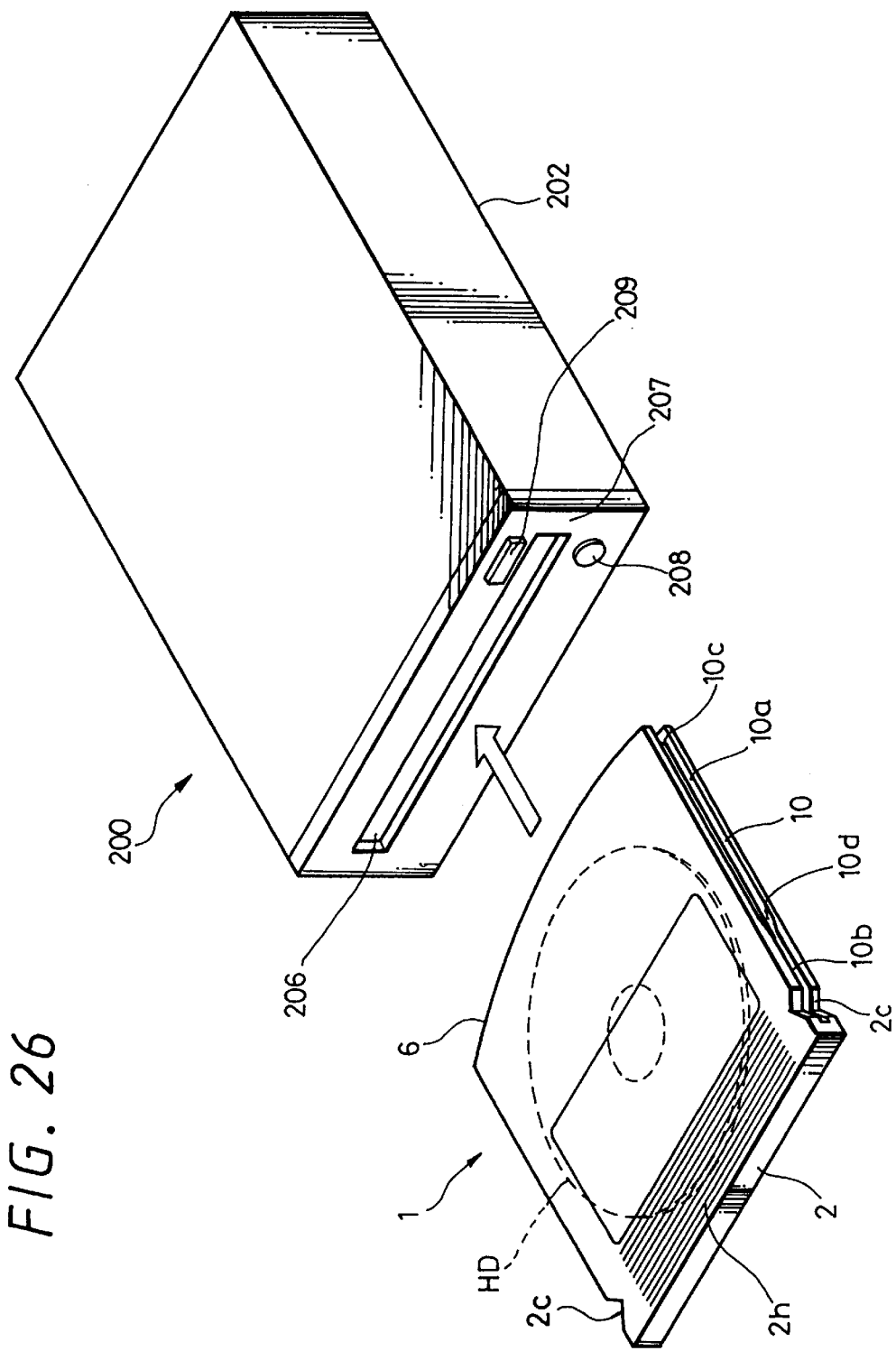
FIG. 26 is a perspective view showing an appearance of a slot-in type disk recording and reproducing apparatus which is a disk storage apparatus according to another or second embodiment of the present invention.

The mechanical chassis 202 is formed of a flat casing having openings at its upper, front and rear surfaces and its U-shaped cross section. A front panel 207 having a cartridge insertion slot 206 is fitted to the front surface thereof. As shown in FIG. 26, a power-source button 208 used for turning a power supply on or off, and an eject button 209 used for ejecting the disk cartridge 1 are provided on the front surface of the front panel 27. The mechanical chassis 202 thus arranged has the disk drive mechanism 30 and the information recording and reproducing mechanism 50 disposed substantially similarly to that of the first embodiment.

As shown in FIGS. 27 to 32, the cartridge holder 203 has an upper surface plate 203a having substantially the same size as that of a plane of the disk cartridge 1, side surface plates 203b, 203c continuously formed at left and right sides of the upper surface plate 203a, and hold plates 203d, 203d continuously formed at respective lower portions of the side surface plates 203b, 203c and bent inward. The disk cartridge 1 is held at a space surrounded by these plates 203a, 203b, 203c, and 203d. An insertion portion 203e is set at a front surface of the space of the cartridge holder 203. The cartridge holder 203 has the shutter opening mechanism 40 similarly to that of the first embodiment at the one side surface plate 203b.

Therefore, the one side surface plate 203b has opening portions 23a 23b formed therethrough at a predetermined interval in the forward and backward direction and has a pair of pin supporting pieces 43a, 43b formed by bending a part between both of the openings 23a, 23b upward and downward. A shutter opening lever 41 is located between both of the pin supporting pieces 43a, 43b, and a shaft pin 44 is pierced through the pin supporting pieces 43a, 43b and the shutter opening lever 41. Thus, the shutter opening lever 41 is swingingly supported by the cartridge holder 203.

Moreover, the cartridge holder 203 has a pair of left and right vertical guide pins 210, 210 respectively disposed at forward-and-backward-direction middle positions of the side surface plates 203b, 203c and two pairs of left and right cam pins 211, 211 and 211, 211 disposed at forward-and-backward-direction both end portions thereof, the left and right vertical guide pins 210, 210 and left and right cam pins 211, 211, 211, 211 being provided so as to be projected toward the outside. The pair of vertical guide pins 210, 210 are slidably engaged with vertical guide grooves 212, 212 provided on the mechanical chassis 202 and extended in the vertical direction, respectively. Stopper pieces 22a, 22b for preventing the disk cartridge 1 form being inserted by a length exceeding a predetermined length are provided at rear end portions of the both side surface plates 203b, 203c of the cartridge holder 203, respectively.

The sliding member 204 is fitted so as to cross over the cartridge holder 203 from above and to be relatively movable. This sliding member 204 has an upper frame portion 204a opposed to the upper surface of the cartridge holder 203 and side surface portions 204b, 204c continuously formed at both side portions of the upper frame porion 204a and opposed to side surfaces of the cartridge holder 203. The upper frame portion 204a has an eject button fitting portion 204d, to which the eject button 209 is fitted, provided at the front portion thereof. A horizontal guide pin 213 projected outward is provided on the one side surface portion 204b. The horizontal guide pin 213 is slidably engaged with a horizontal guide groove 214 provided on the mechanical chassis 202 and extended in the forward and backward direction. This slidable engagement permits the sliding member 204 to be moved straight in the forward and backward directions relative to the mechanical chassis 202.

The cartridge holder 203 and the sliding member 204 can relatively be moved though a holder lifting mechanism 220 in the directions perpendicular to each other. The holder lifting mechanism 220 has a lifting operation means for lifting the cartridge holder 203 up and down only in the vertical direction while restricting the horizontal-direction movement thereof, a horizontal movement means for moving the sliding member 204 only in the horizontal direction while restricting the vertical direction movement thereof, and a direction switching means for switching the horizontal movement of the sliding member 204 and the lifting operation of the cartridge holder 203.

The lifting operation means of the holder lifting mechanism 220 is formed of the vertical guide pins 210 and the vertical guide grooves 212. The horizontal operation means is formed of the horizontal guide pin 213 and the horizontal guide groove 214. The direction switching means of the holder lifting mechanism 220 is formed of cam pins 211, 211 provided on the cartridge holder 203 and cam portions 221, 221 with which the cam pins 211, 211 are slidably engaged. The cam portions 221, 221 are provided on the both side surface portions 204b, 204c of the sliding member 204 so as to be opposed to the cam pins 211, 211, and each of the cam portions 211, 211 has an inclined guide groove 221a formed at an inclination angle of about 45° and has a horizontal supporting groove 221b continuously formed at one end of the inclined guide groove 221a.

The horizontal supporting groove 221b of the cam portion 221 is formed so as to be extended in the forward and backward directions on the upper frame portion 204a sides of the side surface portions 204b, 204c of the sliding member 204, respectively. The inclined guide groove 221a is continuously formed as an opening at each of lower ends of side surface portions 204b, 204c at a position succeeding the rear end portion of the horizontal supporting groove 221b so as to be extended diagonally downward. The four direction switching means are provided at four positions of two positions at front sides of the side surface plates 203b, 203c of the cartridge holder 203 and two positions at rear sides thereof.

Moreover, long apertures 222, 222 are provided through both side portions of the upper frame portion 204a of the sliding member 20, and coils springs 223, 223 are disposed in the long apertures 222, 222. The coil spring 223 is engaged at its front end portion with a spring receiving piece 224 planted on the cartridge holder 203, and engaged at its rear end portion with a spring receiving aperture provided through the sliding member 204. A spring force of the coil spring 223 constantly biases the sliding member 204 to the front side, i.e., toward the cartridge insertion slot 206. A forward movement the sliding member 204 is restricted by a holder locking member rotatably fitted to a rear portion of the cartridge holder 203.

Figure 27:
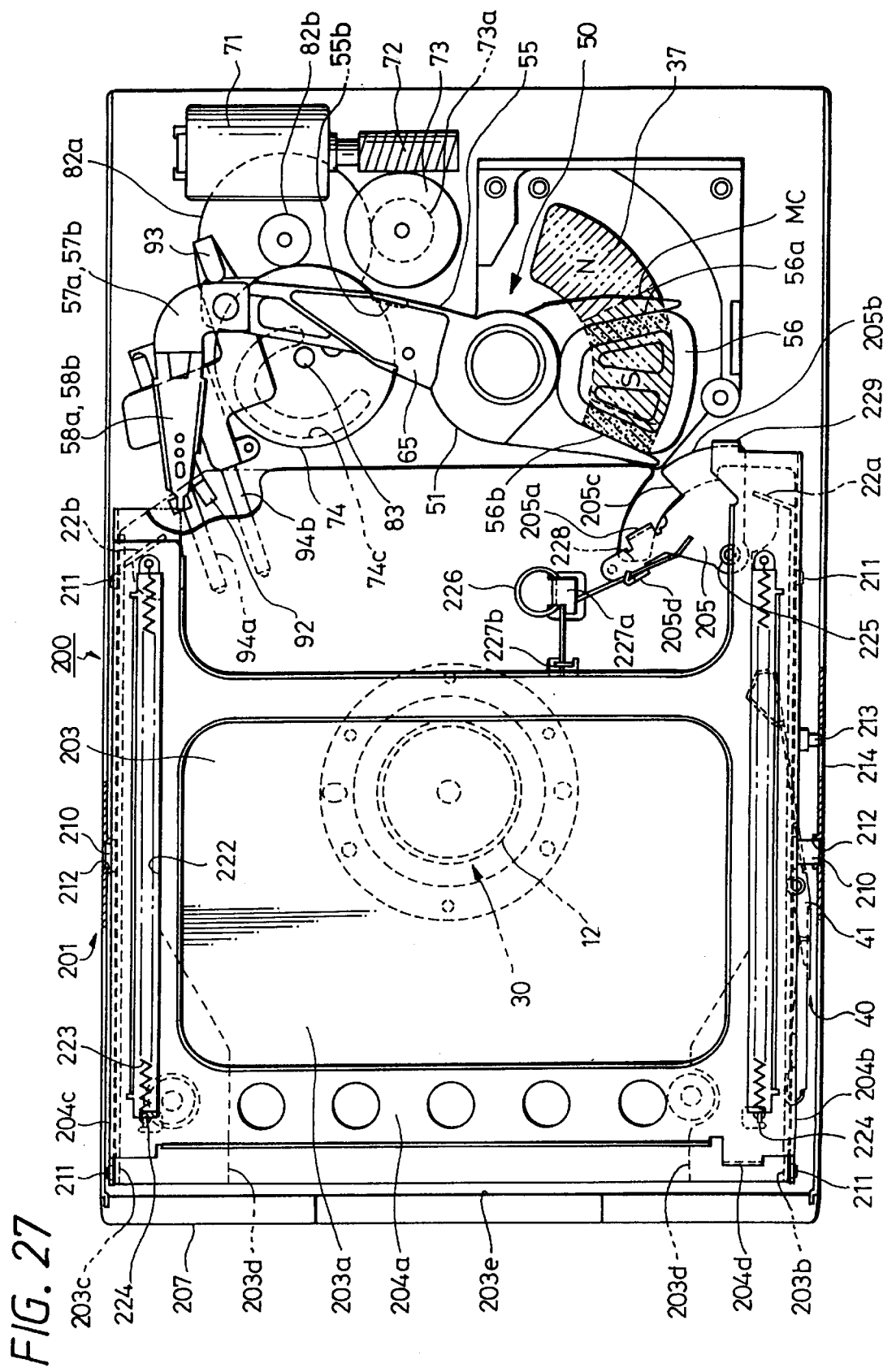
FIG. 27 is a plan view showing the disk recording and reproducing apparatus according to the second embodiment of the present invention before the disk cartridge is loaded.
Figure 29:
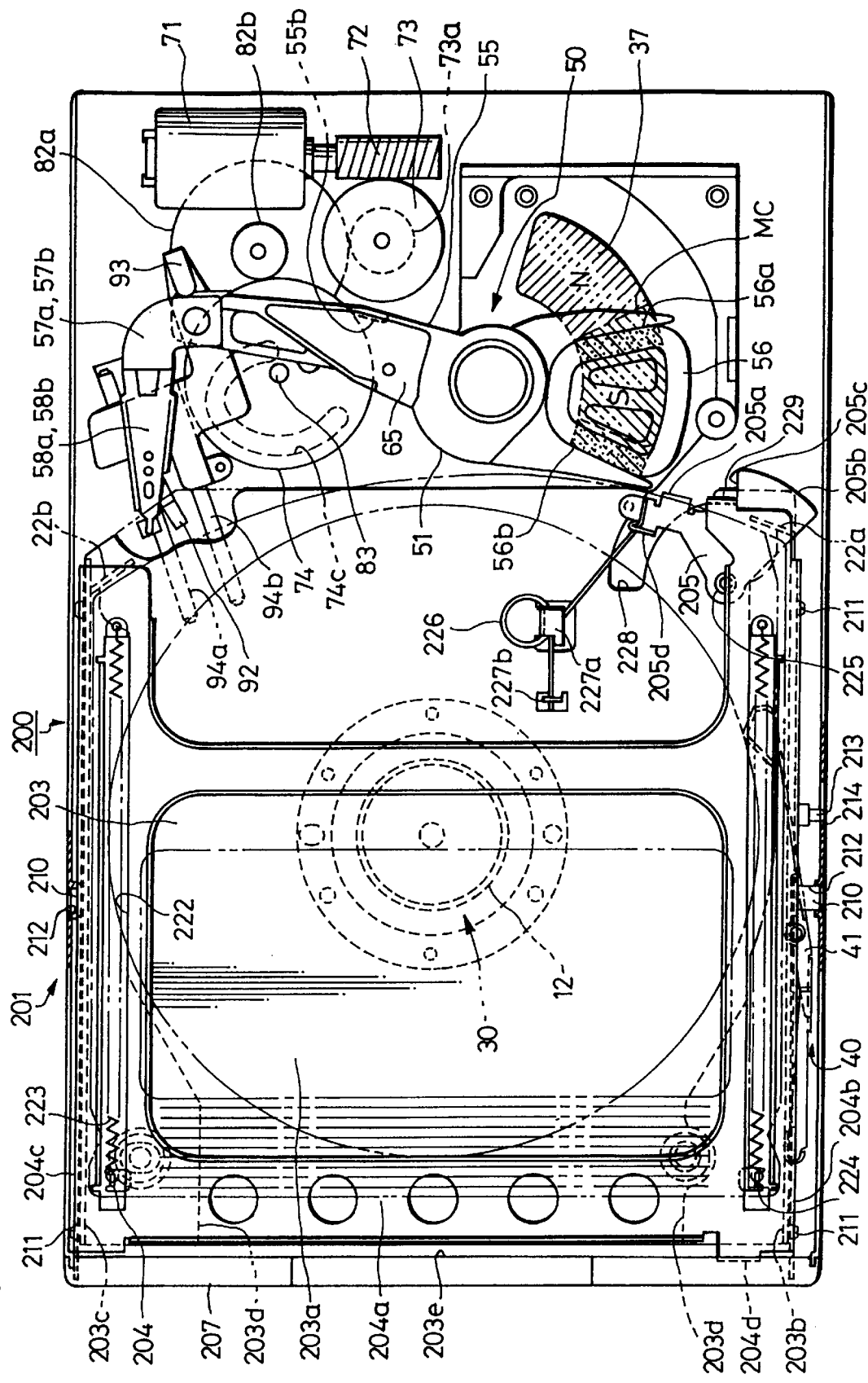
FIG. 29 is a plan view showing the disk recording and reproducing apparatus according to the second embodiment of the present invention after the disk cartridge is loaded.
Figure 30:
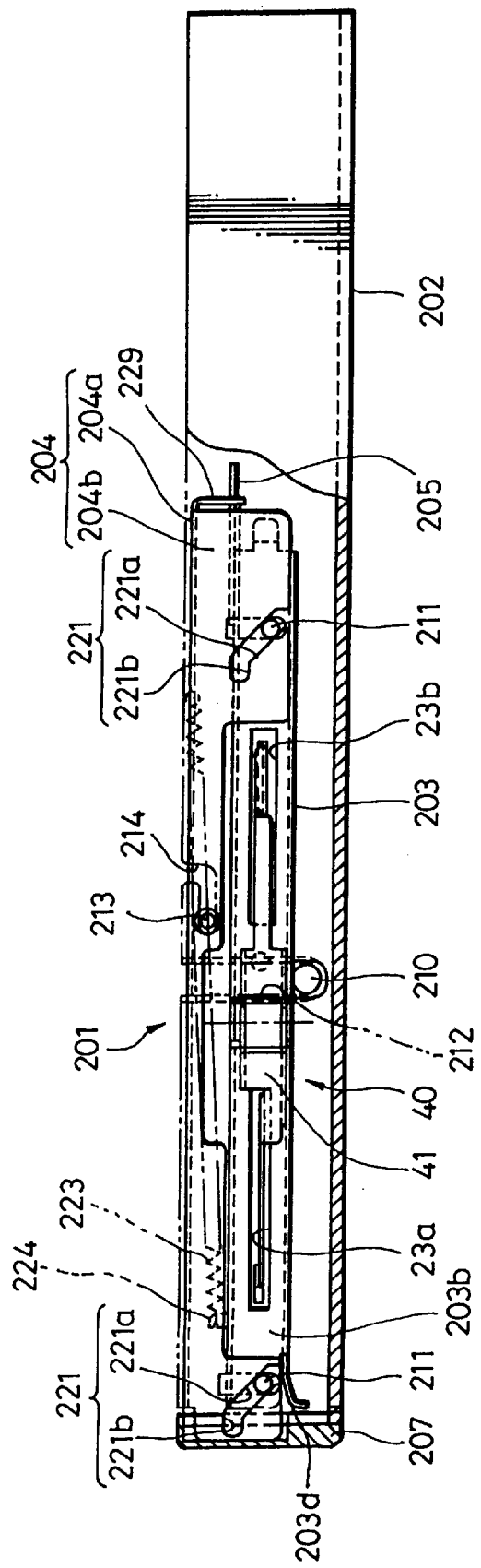
FIG. 30 is a partially cross-sectional, side view showing the disk recording and reproducing apparatus according to the second embodiment of the present invention after the disk cartridge is loaded.

As shown in FIGS. 27 and 29, the whole holder locking member 205 is fan-shaped. The holder locking member 205 is rotatably fitted to the upper surface plate 203a in a state that its portion corresponding to a rivet of a fan is pivotally supported by a rotation shaft 225 on the upper surface plate 203a of the cartridge holder 203 and a tip of the fan is faced backward. The fan portion of the holder locking member 205 has a pressure receiving portion 205a provided at its one side for detecting an insertion state of the disk cartridge 1, an engagement stopper portion 205b provided at the other side for holding the sliding member 204 in a state that it is moved backward by a predetermined amount, a locking portion 205c provided between the engagement stopper portion 205a and the pressing receiving portion 205b for holding the sliding member 204 in its locked state, and a spring receiving portion 205d engaged with one spring piece of a torsion coil 226 for biasing the holder locking member 205 inward. A coil portion of the torsion spring 226 is engaged with a supporting piece 227a planted on the upper surface plate 203a of the cartridge holder 203, and the other spring piece is engaged with a spring receiving piece 227b planted similarly on the upper surface plate 203a.

The pressure receiving portion 205a of the holder locking member 205 is arranged so as to be positioned on a movement locus of the disk cartridge 1 in the disk cartridge loading portion, and hence the upper surface plate 203a of the cartridge holder 203 has a notch 228 formed therethrough extended so as to be arc-shaped for permitting the pressure receiving portion 205a to be intruded. Specifically, in a state that the spring force of the torsion spring 226 brings the holder locking member 205 considerably inward, the pressure receiving portion 205a is brought considerably toward the inside of the notch 228 and brought in contact with the offset arc portion 6 immediately before the insertion of the disk cartridge 1 is completed.

A tip end edge of the engagement stopper portion 205b of the holder locking member 205 is formed so as to be arc-shaped, and the locking portion 205c is formed by setting an inside of the engagement stopper portion 205b one-step lower to thereby provide a step. The sliding member 204 has a stopper piece 229 provided so as to correspond to the engagement stopper portion 205b and the locking portion 205c. This stopper piece 229 serves to position the sliding member 204. When the stopper piece 229 is brought onto the engagement stopper portion 205b as shown in FIG. 27, the sliding member 204 is kept in a state that it is moved backward, and when the stopper piece 229 is moved beyond the engagement stopper portion 205b into the locking portion 205c as shown in FIG. 29, the sliding member 204 is kept in as state that it is moved forward.

Figure 28:
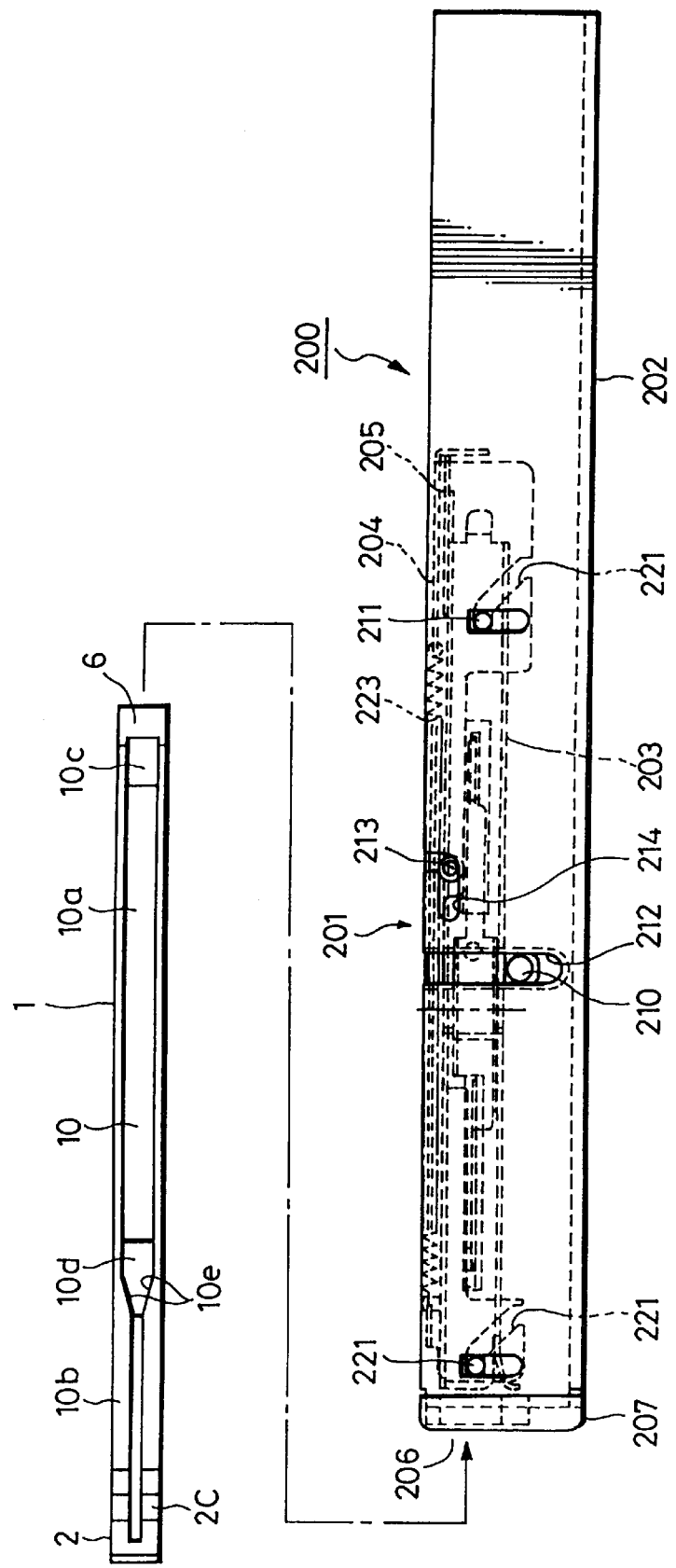
FIG. 28 is a side view showing the disk recording and reproducing apparatus according to the second embodiment of the present invention before the disk cartridge is loaded.

An operation of the disk recording and reproducing apparatus 200 having the above arrangement is, for example, as follows. Initially, as shown in FIGS. 26 to 28, the disk cartridge 1 is located with its offset arc portion 6 side being faced to the cartridge insertion slot 206 of the disk recording and reproducing apparatus 200. Then, the disk cartridge 1 in this state is pushed and inserted into the cartridge insertion slot 206. At this time, when the disk cartridge 1 is inserted to reach a predetermined position, the offset arc portion 6 of the disk cartridge 1 is brought in contact with the pressure receiving portion 205a of the holder locking member 205. If the disk cartridge 1 is further pushed inward against the spring force of the torsion spring 226 for biasing the pressure receiving portion 205a inward, then the holder locking member 205 is rotated around a rotation shaft 225 by a pressing force of the disk cartridge 1 in the clockwise direction shown in FIG. 27. Then, when the disk cartridge 1 is completely inserted into the disk recording and reproducing apparatus 200, the holder locking member 205 is brought in a state shown in FIG. 29.

In this case, the rotation of the holder locking member 205 brings an outer periphery edge of the engagement stopper portion 205b in slidable contact with an inner periphery edge of the stopper piece 229 of the sliding member 204. However, since a radius of curvature of the outer periphery of the engagement stopper portion 205b is constant, the sliding member 204 is prevented from being moved forward by a spring force of a coil spring 223 and hence kept at the present position. Thereafter, when the disk cartridge 1 is completely inserted to reach the predetermined position, the inner periphery edge of the engagement stopper portion 205b reaches an outer edge of the stopper piece 229, thereby a locked state of the sliding member 204 being released.

At this time, the cartridge holder 203 linked by the sliding member 204 by the coil spring 223 is supported by the mechanical chassis 202 so as to be movable only in the vertical direction, while the sliding member 204 is supported by the mechanical chassis 202 so as to be movable only in the forward and backward direction. Therefore, only the sliding member 204 is moved forward by the spring force of the coil spring 223, and the disk cartridge 1 held by is the cartridge holder 203 kept in a position where it is loaded. This loading position thereof is located immediately above the spindle motor 12 of the disk drive mechanism 30.

In this case, when the sliding member 204 is horizontally moved in the forward direction, the cam pins 211, 211, 211, 211 which have been located in the horizontal supporting grooves 221b, 221b, 221b, 221b of the cam portions 221, 221, 221, 221 are inserted into inclined guide grooves 221a, 221a, 221a, 221a, being guided along the inclined guide grooves 221a, 221a, 221a, 221a and pressed downward. At this time, the cartridge holder 203 is horizontally supported with being linked with the sliding member 204 by the four direction changing mechanisms (each formed of the cam pin 211 and the cam portion 221) provided thereat so as to be relatively moved. The four direction changing mechanisms are simultaneously operated similarly. On the other hand, the cartridge holder 203 is supported by the vertical guide groove 212 of the mechanical chassis 202 so as be movable only in the vertical direction. The vertical guide pins 210, 210 are guided by the vertical guide grooves 212, 212 and moved downward, and hence the cartridge holder 203 is lowered in the downward direction.

Figure 31:
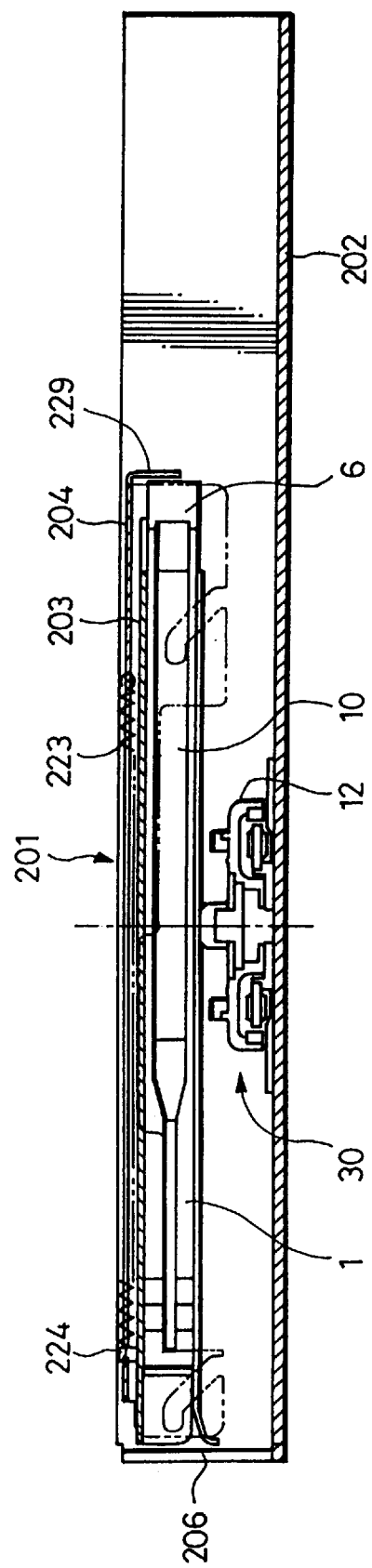
FIG. 31 is a cross-sectional view showing the disk recording and reproducing apparatus according to the second embodiment of the present invention in a state before the operation of loading the disk cartridge is completed.
Figure 32:
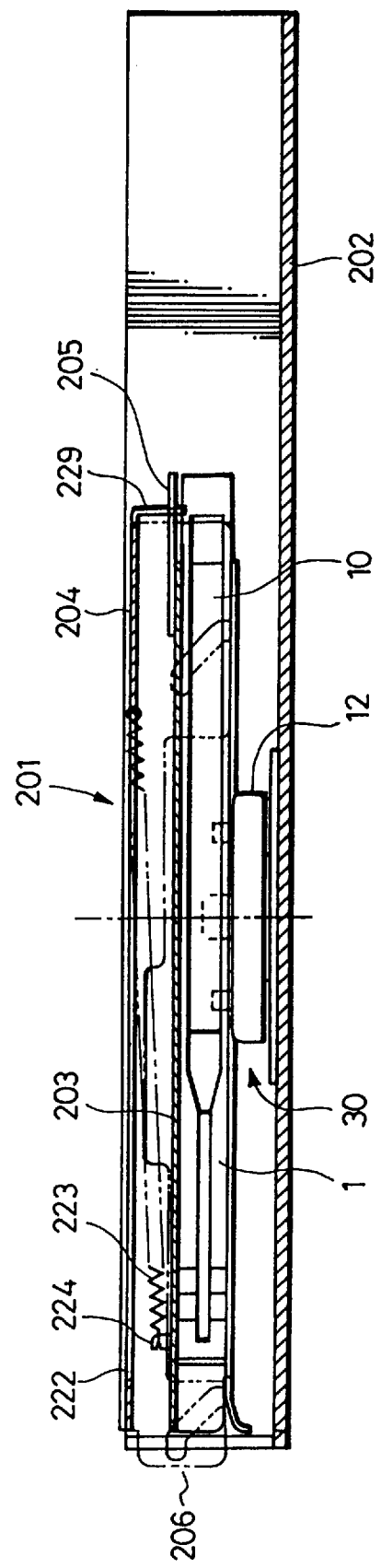
FIG. 32 is a cross-sectional view showing the disk recording and reproducing apparatus according to the second embodiment of the present invention in a state that the operation of loading the disk cartridge is completed.
Figure 33:
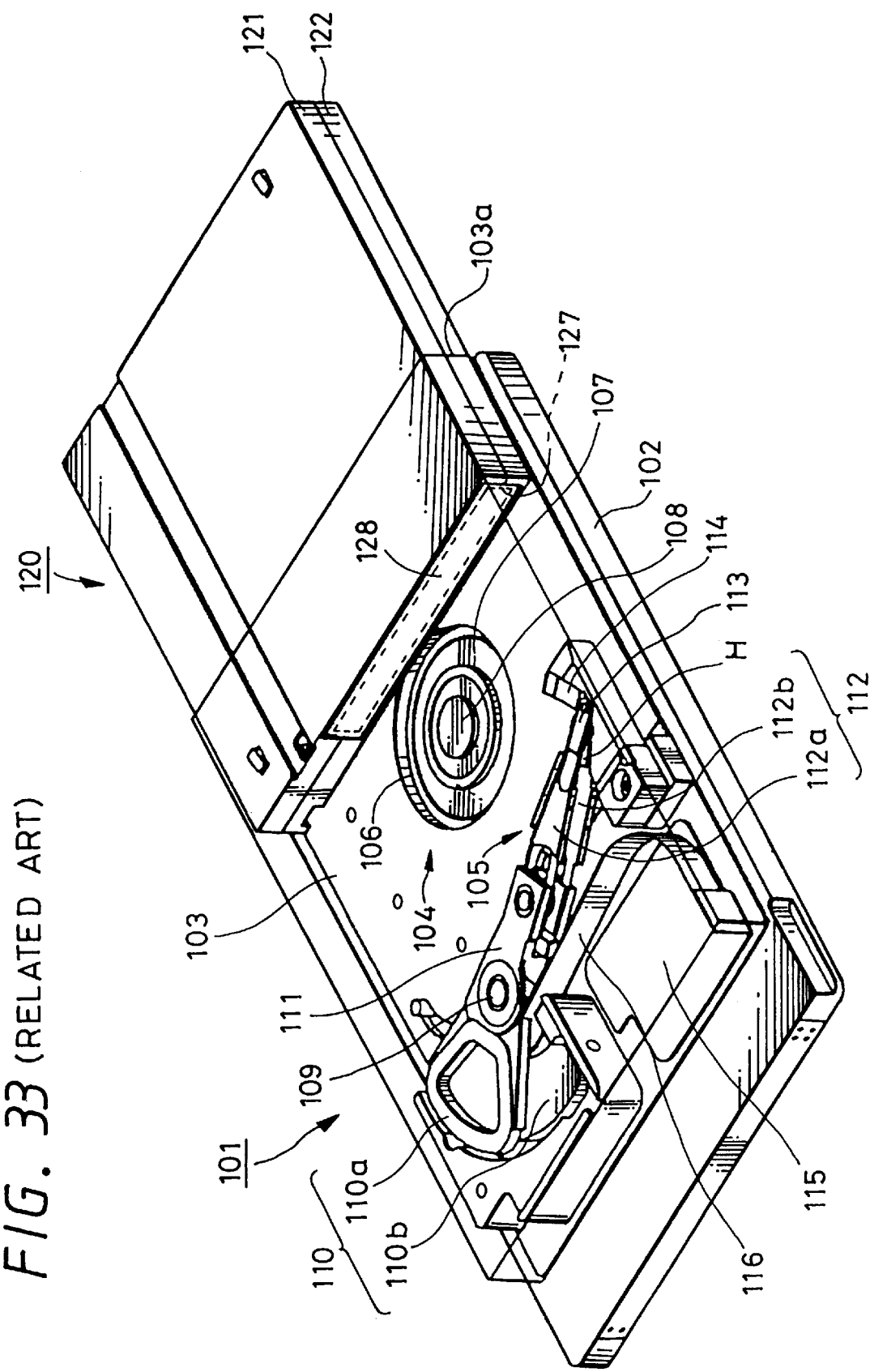
FIG. 33 is a perspective view showing an example of a disk recording and reproducing apparatus related to the present invention.
Figure 34:
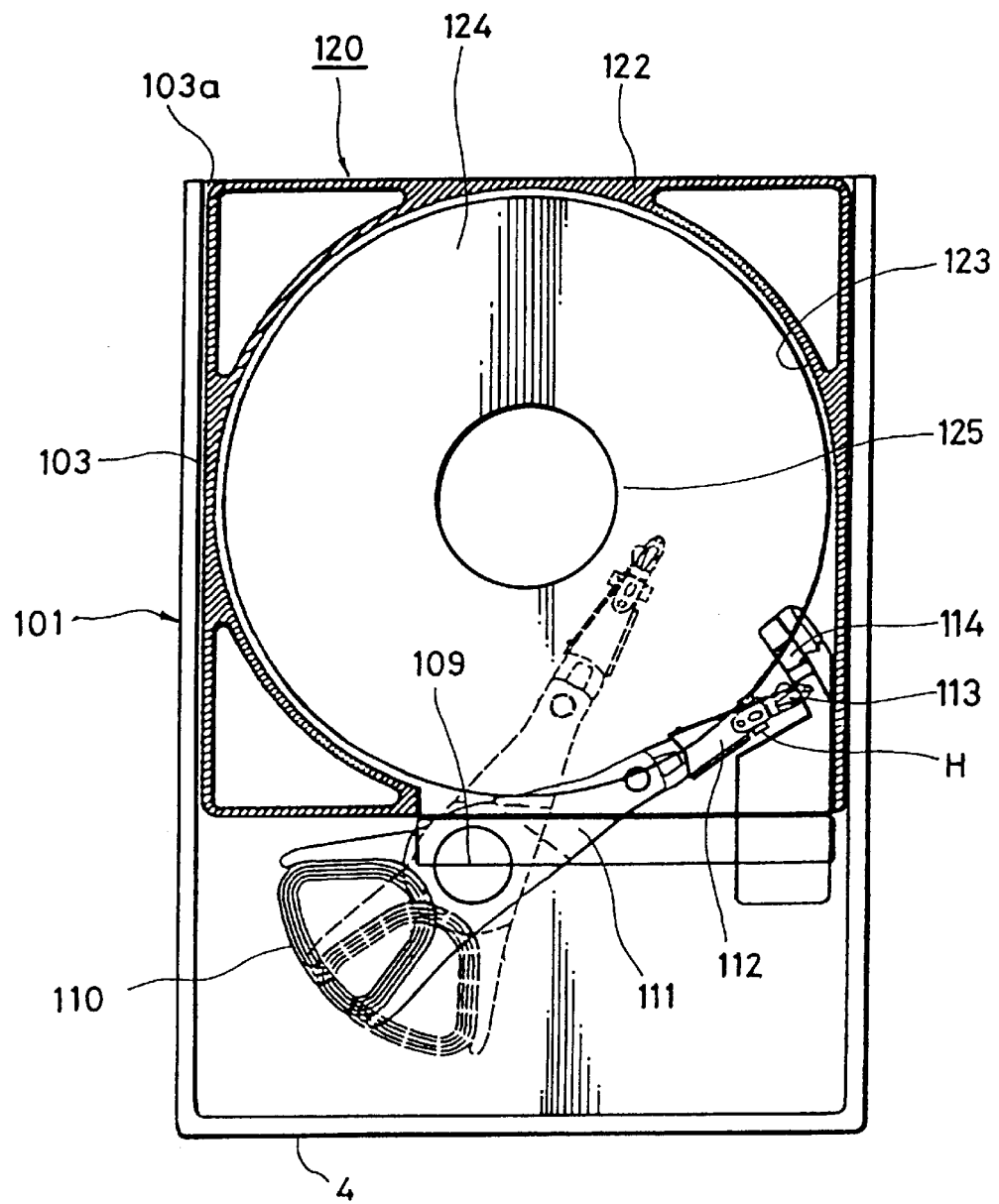
FIG. 34 is a plan view showing a state that a disk cartridge is inserted into an apparatus main body of the disk recording and reproducing apparatus related to the present invention.
Figure 35:
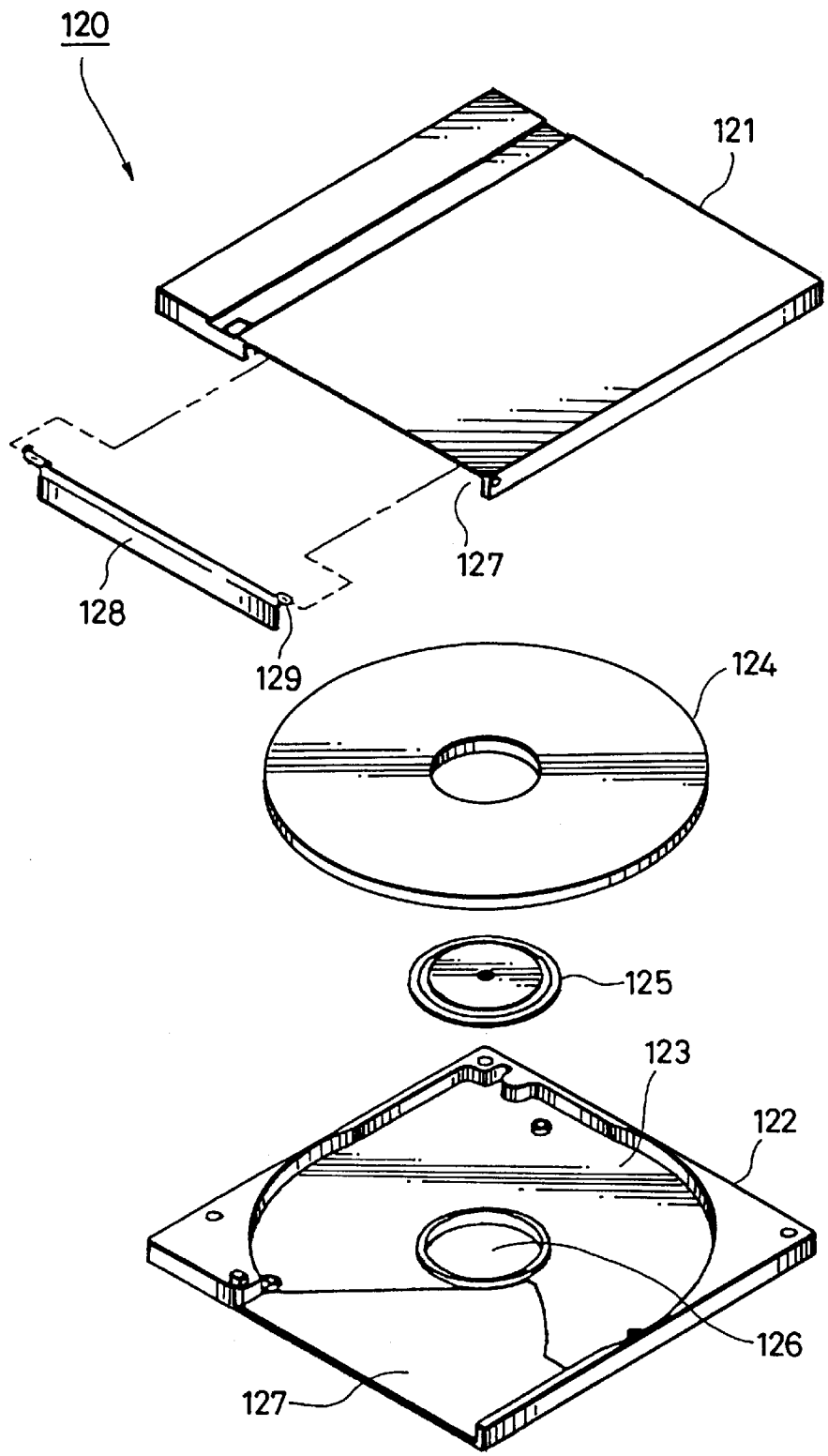
FIG. 35 is a an exploded, perspective view showing the disk cartridge related to the present invention.

The above operation allows the cartridge holder 203 to be moved from an upper position located at which the disk cartridge 1 is inserted into the disk recording and reproducing apparatus 200 as shown in FIG. 31 to a lower position located at which the disk cartridge 1 is in its loaded state as shown in FIG. 32. As a result, a center core aperture 9 of the disk cartridge 1 is opened by rotation of a shutter opening lever 41 of the shutter opening mechanism 40, and a turntable portion of the spindle motor 12 is inserted into the center core aperture 9. Then, a center core 11 is attracted by a magnet buried at the turntable portion, thereby the hard disk HD being loaded onto the spindle motor 12. Thus, the operation of loading the disk cartridge is finished.

Thereafter, the spindle motor 12 of the disk drive mechanism 30 is driven to rotate the hard disk HD, and a rotation actuator 51 of the information recording and reproducing mechanism 50 is driven to start a voice coil motor carrying out an automatic control. The magnetic heads 8, 8 of upper and lower sliders 52a, 52b respectively opposed to upper and lower information recording surfaces of the hard disk HD read or write an information signal therefrom or therein, thereby the information being capable of being recorded or reproduced similarly to the recording or reproducing operation of the first embodiment.

When the disk cartridge 1 is ejected after completion of the information recording or reproducing operation, the eject button 209 is pushed. In this case, when the user pushes the eject button 209 by a predetermined amount against the biasing force of the coil spring 223, since the eject button 209 is fitted to the eject-button fitting portion 204d and formed integrally with the sliding member 204, the sliding member 204 is moved backward. At this time, the stopper piece 229 of the sliding member 204 which is engaged with the locking portion 205c of the holder locking member 205 is guided by the inner side edge of the engagement stopper portion 205b and hence moved backward.

At this time, the cartridge holder 203 and the sliding member 204 are operated reversely to their operations carried out upon the loading. Specifically, the sliding member 204 is horizontally moved in the backward direction, and the cartridge holder 203 linked with the sliding member 204 by the holder lifting mechanism 220 is lifted up to the upper portion position while being guided by the vertical guide grooves 212 of the mechanical chassis 202, thereby being changed from a state shown in FIG. 32 to a state shown in FIG. 31. When the stopper piece 229 of the sliding member 204 reaches the tip end of the engagement stopper portion 205b, the locked state of the holder locking member 205 is released.

As a result of the above operation, the holder locking member 205 is rotated by the spring force of the torsion spring 226 inward, i.e., in the counterclockwise direction shown in FIG. 29, and then the pressure receiving portion 205a of the holder locking member 205 is inserted into the notch 228 of the cartridge holder 203, being brought in contact with the offset arc portion 6 of the disk cartridge 1. As a result, the disk cartridge 1 is applied with the spring force of the torsion spring 226 from the pressure receiving portion 205a, which permits the disk cartridge 1 to be pushed forward and hence permits a grip-side end portion of the disk cartridge 1 to be projected from the cartridge insertion slot 206. If the user grips the grip-side end portion of the disk cartridge 1 to pull it, then it is possible to draw the disk cartridge 1 from the disk recording and reproducing apparatus 200.

The disk recording and reproducing apparatus 200 according to the second embodiment having the above arrangement can also provide the same effects similar to those of the first embodiment.

Having described the disk recording and reproducing apparatus according to the first and second embodiments, the present invention is not limited thereto. For example, while the apparatus for recording and/or reproducing information on and/or from the hard disk with the upper and lower magnetic heads respectively opposed to the upper and lower surfaces of the hard disk has been described in each of the embodiments, the present invention can be applied to an apparatus for recording and/or reproducing information on and/or from either of the upper and lower surfaces of the hard disk. Moreover, while in each of the embodiments the present invention is applied to the disk recording and reproducing apparatus which can reproduce the information previously recorded on the hard disk HD and can record a new information thereon, the present invention can be applied to a disk storage apparatus which can record or reproduce the information.

As described above, according to the disk storage apparatus of the present invention, since the rotation actuator for supporting the reading/writing heads is formed of an rotary arm and elastic supporting bodies fitted to the tip end portions of the rotary arm for supporting the reading/writing heads and the rotation actuator is formed by bending the actuator so that it should be substantially L-shaped to fix the elastic supporting bodies thereon in the extension direction in which the rotation actuator is bent, the elastic supporting bodies for supporting the reading/writing heads are substantially linearly inserted in the disk cartridge loaded onto the disk cartridge loading portion from their tip ends being faced to the disk cartridge. THerefore, it is possible to form the small opening portion of the disk cartridge and hence the shape of the disk cartridge is free from any restriction, which increases freedom of a design thereof and allows a desired disk cartridge to be manufactured. Moreover, the elastic supporting bodies can be supported by the ramp over the substantially center line and can be stably moved without being twisted. As a result, it is possible for the reading/writing heads to precisely be located on positions on the information recording medium, and it is possible to reliably read and write information from and in the information recording medium, which improves the reliability. Moreover, since the rotary arm of the rotation actuator does not need to be rotated to a position where it interferes with the information recording medium, it is unnecessary for the rotary arm to be fork-shaped in order to prevent such interference. Therefore, it is possible to achieve an effect in which the rotary arm can have a sufficient strength.

Moreover, since the rotary arm is formed so as to be box-shaped, it is possible to achieve a lighter and thinner rotary arm and also to increase the strength thereof further. Since the flexible board for the signal line and the power supply line is fixed on the side surface of the rotary arm and then extended to the disk side and each of the elastic supporting bodies has the supporting projections brought in slidable contact with the ramp and the rib formed so as to be extended in the same direction, it is possible to downsize the disk storage apparatus and to make it thinner.

Since the solder surface is provided on the upper surface of the rotary arm, an operation for soldering the flexible board is simplified, which improves workability. Since a soldered portion is constantly located outside of the disk cartridge, it is possible to achieve an effect in which a solder on the soldered portion is prevented from being peeled off in the disk cartridge and the disk cartridge is prevented from being damaged.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disk apparatus comprising:

a chassis;

loading means provided on said chassis for detachably loading a disk cartridge in which a recording medium is rotatably accommodated;

rotating means for rotating said recording medium in said loaded disk cartridge;

head means for accessing said rotating recording medium;

head moving means supported by a rotating and supporting member provided on said chassis, wherein said head means is mounted proximate an end portion of said head moving means;

drive means for rotating said head moving means through said rotating and supporting member to move said head means to a desired position on said recording medium in said disk cartridge;

cam means;

cam drive means for driving said cam means;

contact means provided at said head moving means and brought in contact with said cam means;

an eject arm rotatably supported by said chassis for ejecting said disk cartridge from a cartridge holder; and an engagement means provided in said eject arm and engaged with said cam means, wherein said cam means engaged with said engagement means is driven by said cam drive means, thereby said eject arm is moved.

2. A disk apparatus according to claim 1, wherein said drive means comprises a voice coil motor formed of a magnet provided in a peripheral direction around a rotation center of said rotating and supporting member and a coil located at a substantial end portion of said head moving means and at a position opposed to said magnet.

3. A disk apparatus according to claim 2, wherein when a center of said coil of said head moving means is located over a center in the peripheral direction of said magnet, said head means is located at a substantial center of an accessible area of said recording medium, and wherein the center of said accessible area is displaced from a center of the movable area of said head moving means.

4. A disk apparatus according to claim 1, wherein said head moving means comprises a bent portion, a first straight portion projected from said bent portion in a first direction, and a second straight portion projected from said bent portion in a second direction, and wherein said first straight portion is supported at an end thereof by said rotating and supporting member and said head means is mounted proximate an end portion of said second straight portion.

5. A disk apparatus according to claim 4, wherein said head moving means comprises step portions provided on upper and lower sides, respectively, of the other end of said first straight portion, two mount plates fixed at base end portions thereof on said respective step portions and forming said bent portion, and two suspensions whose base end portions are fixed on respective insides of the other end portions of said two mount plates, wherein said two suspensions form said second straight portion.

6. A disk apparatus according to claim 5, wherein said two suspensions each have a rib formed by bending a side edge portion of each of said two suspensions.

7. A disk apparatus according to claim 5, wherein said two suspensions each have sliders provided at the other ends thereof at a predetermined angle, respectively.

8. A disk apparatus according to claim 7, wherein said two suspensions are biased so that an interval between the other end sides thereof where said sliders are fitted is shorter than an interval between the base end portions thereof.

9. A disk apparatus according to claim 7, wherein said sliders are transverse pressure contour sliders.

10. A disk apparatus according to claim 5, further comprising:

ramp means inserted between said two suspensions for temporarily extending an interval therebetween; and guide means provided on said chassis for guiding said ramp means to a predetermined position.

11. A disk apparatus according to claim 10, wherein said guide means guides said ramp means straight.

12. A disk apparatus according to claim 10, wherein a distance from a center of said rotating and supporting member supporting said head means to a slidable contact portion where said ramp means is brought in slidable contact with said suspensions is shorter than a distance from the center of said rotating and supporting member to said sliders.

13. A disk apparatus according to claim 10, wherein each of said two suspensions has a projection projected inward and said ramp means is brought in contact with said projections.

14. A disk apparatus according to claim 13, wherein said projections are formed by subjecting said suspensions to a drawing process.

15. A disk apparatus according to claim 13, wherein said projections are formed by outsert-molding said suspensions.

16. A disk apparatus according to claim 10, wherein after said disk cartridge is loaded by said loading means, said guide means inserts said ramp means inserted between said two suspensions into said disk cartridge in response to rotation of said head moving means.

17. A disk apparatus according to claim 16, further comprising:
biasing means for biasing said ramp means in the direction in which said ramp means is inserted into said disk cartridge, wherein said ramp means has a contact portion in contact with said head moving means in a biasing direction of said biasing means and said head moving means is rotated in said insertion direction and said ramp means is moved by said biasing means in accordance with the rotation, thereby consequently said ramp means is inserted into said disk cartridge.

18. A disk apparatus according to claim 17, further comprising:
engagement stopper means for stopping said ramp means at a predetermined position in the direction said biasing means biases said ramp means.

19. A disk apparatus according to claim 18, wherein the predetermined position of said engagement stopper means is located so that said ramp means is located on the outer side of said recording medium in said disk cartridge.

20. A disk apparatus according to claim 4, wherein said first straight portion of said head moving means is always located outside of an outer periphery of said recording medium.

21. A disk apparatus according to claim 4, wherein a concave portion is provided at least on an upper portion of said first straight portion of said head moving means.

22. A disk apparatus according to claim 21, wherein a wiring board is disposed on said head moving means so as to cover at least a part of said head moving means.

23. A disk apparatus according to claim 22, wherein said wiring board is disposed on a portion, which is not inserted into said disk cartridge, of said first straight portion.

24. A disk apparatus according to claim 4, further comprising a wiring board extended from said head moving means, wherein said wiring board is located on a plane different from a plane on which said recording means is located, and a part of said wiring board is fixed on a side surface of said head moving means.

25. A disk apparatus according to claim 24, wherein said wiring board is a flexible board for a signal line or for a line used for supplying power to said drive means.

26. A disk apparatus according to claim 1, wherein a distance from a rotation center of said rotating and supporting member to said contact means is longer than one-third of a length from said rotation center to said head means.

27. A disk apparatus according to claim 1, wherein when said disk cartridge is ejected from said loading means, said cam means is brought in contact with said contact means, thereby said head moving means is moved to a predetermined position.

28. A disk apparatus according to claim 1, further comprising:
locking means for locking said loading means at a position where said disk cartridge is loaded; and
releasing means for releasing said locking means, wherein said lock releasing means releases a locking operation of said locking means in an interlocking operation with said eject arm.

29. A disk apparatus comprising:
a chassis;
loading means provided on said chassis for detachably loading a disk cartridge in which a recording medium is rotatably accommodated;
rotating means for rotating said recording medium in said loaded disk cartridge;
head means for accessing said rotating recording medium;
head moving means supported by a rotating and supporting member provided on said chassis, said head moving means comprising:
a bent portion;
a first straight portion projected from said bent portion in a first direction and supported at an end thereof by said rotating and supporting member;
a second straight portion projected from said bent portion in a second direction, wherein said head means is mounted proximate an end portion of said second straight portion;
step portions provided on upper and lower sides, respectively, of the other end of said first straight portion;
two mount plates fixed at base end portions thereof on said respective step portions and forming said bent portion; and
two suspensions whose base end portions are fixed on respective insides of the other end portions of said two mount plates, wherein said two suspensions form said second straight portion;
drive means for rotating said head moving means through said rotating and supporting member to move said head means to a desired position on said recording medium in said disk cartridge;
cam means;
cam drive means for driving said cam means;
contact means provided at said head moving means and brought in contact with said cam means;
biasing means for biasing said head moving means in a direction in which said head moving means is inserted into said disk cartridge;
an eject arm rotatably supported by said chassis for ejecting said disk cartridge from a cartridge holder;
engagement means provided in said eject arm and engaged with said cam means, wherein said cam means engaged with said engagement means is driven by said cam drive means, thereby said eject arm is moved;

ramp means inserted between said two suspensions for temporarily extending an interval therebetween; and guide means provided on said chassis for guiding said ramp means to a predetermined position, wherein said guide means has two guide shafts provided on said chassis in parallel to each other which are slidably moved through two apertures of said ramp means to thereby guide said ramp means.

30. A disk apparatus according to claim 29, wherein said ramp means is integrally molded of polyacetal resin.

* * * * *